(12) United States Patent
Takai et al.

(10) Patent No.: US 6,440,354 B1
(45) Date of Patent: Aug. 27, 2002

(54) THERMOFORMING PROCESS

(75) Inventors: Toshihiro Takai; Kenichi Mizoguchi; Akio Yoshikoshi; Takashi Kikkawa; Tatsushi Maeda, all of Aichi-ken (JP)

(73) Assignee: Kabushiki Kaisha Asano Kenkyusho, Aichi-gun (JP)

( * ) Notice: Subject to any disclaimer, the term of this patent is extended or adjusted under 35 U.S.C. 154(b) by 0 days.

(21) Appl. No.: 09/452,469

(22) Filed: Dec. 2, 1999

(30) Foreign Application Priority Data

| Dec. 4, 1998 | (JP) | 10-345471 |
|---|---|---|
| Feb. 10, 1999 | (JP) | 11-033073 |
| Feb. 12, 1999 | (JP) | 11-034569 |

(51) Int. Cl.⁷ .......................... B29C 51/00; B29C 51/10
(52) U.S. Cl. ...................... 264/550; 264/553
(58) Field of Search ................. 264/554, 550, 264/553

(56) References Cited

U.S. PATENT DOCUMENTS 5,062,568 A * 11/1991 Hill et al. .................. 229/403
6,315,150 B1 * 11/2001 Takai et al. ................ 220/628

FOREIGN PATENT DOCUMENTS

| JP | 49-37579 B | 10/1974 |
|---|---|---|
| JP | 57-43807 A | 3/1982 |
| JP | 58-94416 A | 6/1983 |
| JP | 63172630 | 7/1988 |
| JP | 01208116 A | 8/1989 |
| JP | 02-141218 A | 5/1990 |
| JP | 04327129 A | 11/1992 |
| JP | 08-66729 A | 3/1996 |
| JP | 08-99352 A | 4/1996 |
| JP | 10155625 A | 6/1998 |
| JP | 10-291217 A | 11/1998 |

OTHER PUBLICATIONS

Japanese Office Action dated Mar. 21, 2000.
Japanese Office Action dated Mar. 21, 2001.

* cited by examiner

Primary Examiner—Leo B. Tentoni
(74) Attorney, Agent, or Firm—Armstrong, Westerman & Hattori, LLP

(57) ABSTRACT

A thermoforming apparatus includes a female die and a movable plug for thermoforming a softened thermoplastic resin sheet. The female die includes a rim forming recess in the shape of a bowl-shaped recess, communicating with a bottom opening and forming a bottom wall of the bowl, an outer wall, a bottom wall and an inner wall of a rim of the bottom, and a bottom plate movable forward and backward relative to the rim forming recess. The softened thermoplastic resin sheet is thrust by the plug while the bottom plate is held at a first stop position. The thermoplastic resin sheet is brought into contact with an inner circumferential surface o[0086] the bowl-shaped recess and then the bottom plate is moved to a second stop position so that a rim is formed.

6 Claims, 44 Drawing Sheets

THERMOFORMING PROCESS

BACKGROUND OF THE INVENTION

1. Field of the Invention

This invention relates to a thermoforming method and apparatus for making a bowl-shaped container out of a thermoplastic resin sheet, a thermoforming female die, a method of thermoforming a bowl-shaped container, a thermoforming plug, a method of thermoforming a product with undercut and a thermoforming female die.

2. Description of the Prior Art

When a bowl-shaped container having a rim of a bottom is made of a thermoplastic resin sheet, the melted resin sheet is conventionally folded at the rim of the bottom. FIG. 21 shows a section of the rim made in this conventional method. Also, when a body of the container is rendered rugged, the thermoplastic resin sheet is folded into folds. FIG. 22 shows a section of the rugged body.

Japanese Patent Publication Nos. 50-87162A and 50-67370A disclose adjustment of thickness in the thermoforming by a plug. In the former, the plug is formed to be circumferentially split and each of split pieces is pivotally supported on an outer circumferential side of a base so that the diameter of an upper outer circumferential end can be spread and reduced. The plug in the reduced state is caused to abut against the thermoplastic resin sheet so that the sheet is pushed into a female die. Thereafter, the diameter of the plug is spread. This changes the degree of preliminary extension of a bottom wall of the thermoformed product, whereby the thickness is adjusted.

In the latter, the plug is supported on an elastic member such as a coil spring. While abutted against a thermoplastic resin plate, the plug is caused to strike against the female die so that the spring is contracted. As a result, the preliminary extension is carried out by the stroke of the spring in addition to the length of the plug regarding the circumferential wall.

In the thermoforming, the thermoplastic resin plate is heated so as to be plastic and then sucked into a die for the forming. The thermoplastic resin plate is thereafter removed from the die. Since the thermoplastic resin plate, even when hardened, has flexibility, a certain undercut can be performed.

In the aforesaid conventional method, an annular opening is formed in the bottom of the folded container so as to correspond to the rim. Accordingly, when poured into the container, soup or the like enters the annular opening. This results in no problem when the container is non-returnable. However, when the container is cleaned for re-use, it is difficult to wash away the soup or the like remaining in the annular opening. It is also difficult to wash away the soup or the like remaining in openings of the folds formed in the body of the container.

Further, the aforesaid thermoforming plugs have the following problems. Since the plug is split and pivoted in the former, the construction thereof becomes complicated. In the latter, the plug is caused to abut against the inner face of the female die. At this time, the thickness is reduced and accordingly, the plug cannot actually be employed.

Further, in the conventional method of thermoforming the product with an undercut, an allowed undercut is small. For example, when a rim of a bottom is made as a bowl for cupped noodle, a satisfactory result cannot be achieved.

SUMMARY OF THE INVENTION

Therefore, an object of the present invention is to provide a thermoforming apparatus and method, a thermoforming femele die, and a method of thermoforming a bowl-shaped container, which form the bowl-shaped container by folding a part of the resin sheet and yet which can prevent soup or the like from entering the opening formed in the bottom or the body thereof, a thermoforming plug, termoforming apparatus and method, which can provide a flexible thickness adjustment with a simple construction, a method of thermoforming a molding with an undercut and a thermoforming female die therefore, which can allow a large undercut to be stably removed from the die.

To accomplish the object, a first embodiment of the invention provides a thermoforming apparatus compressing a thermoforming female die and a plug moved forward and backward so that a softening thermoplastic resin sheet is thrust into the thermoforming female die. In the apparatus, the thermoforming female die includes a rim forming recess formed generally into a shape of a bowl-shaped recess, communicating with a bottom opening and of the bowl, an outer wall, a bottom wall and an inner wall of a rim of the bottom, and a bottom plate formed into a columnar shape similar to the bottom opening and supported to be moved forward and backward relative to the rim forming recess, the bottom wall being driven between a first position where the bottom plate is retreated inside the rim forming recess and a second stop position where the bottom plate is in the vicinity of the bottom opening. Further, the thermoplastic resin sheet heated to be softened is thrust by the plug while the bottom plate is held at the first stop position. The thermoplastic resin sheet is brought into close contact with an inner circumferential surface of the bowl-shaped recess and immediately thereafter, the bottom plate is moved to the second stop position so that a rim is formed.

In the invention of the first embodiment thus constructed, the thermoforming apparatus the thermoforming female die and the plug moved forward and backward so as to thrust the thermoplastic resin sheet into the thermoforming female die. The thermoforming female die is formed into a generally bowl-shaped recess. The female die has the rim forming recess communicating with a bowl bottom opening of the bowl-shaped recess so as to form the bottom wall of the bowl-shape and an outer form wall, bottom wall and inner wall of the rim. The bottom plate formed into the columnar shape similar to the bottom opening is supported to be moved forward and backward relative to the rim forming recess. The bottom plate is driven between the first stop position where the bottom plate is retreated inside the rim forming recess and a second stop position where the bottom plate is in the vicinity of the bottom opening.

Accordingly, the thermoplastic resin sheet heated to be softened is thrust by the plug into the female die while the bottom plate is held at the first stop position. When brought into close contact with the inner circumferential surface of the bowl-shaped recess, the thermoplastic resin sheet is expanded along the top of the bottom plate located inside the rim forming recess. However, immediately thereafter, the bottom plate is moved to the second stop position. Accordingly, the thermoplastic resin sheet on the top of the bottom plate is pushed up from the rim forming recess side to the bottom opening of the bowl-shaped recess. Then, a peripheral edge of the thermoplastic resin sheet turned up by the bottom plate and a part of the sheet positioned in the vicinity of the opening of the rim forming recess are welded together. More specifically, although the part of the sheet in the rim forming recess is expanded, the bowl bottom is immediately moved upward toward the bottom opening so that the parts of the sheet are welded together.

According to the first embodiment of the invention, when the bowl-shaped container with a rim is made out of the thermoplastic resin sheet, no gaps are formed inside, and re-use by cleaning can be rendered easy.

A second embodiment of the invention is constructed so that in the thermoforming apparatus of the first embodiment, the rim forming recess includes a first portion spread outward so as to be continuous from the bowl bottom and a second portion continuous from the first portion and having a reduced inner diameter, the first and second portions forming the outer wall and the bottom wall.

In the invention of the second embodiment thus constructed, the rim forming recess is spread out from the bowl bottom opening and its inner diameter is then reduced. Accordingly, a spread rim outer side wall surface is formed by this inclined portion. Further, a bottom wall of the rim is formed by a flat portion where the inner diameter is reduced. Additionally, the rim inner wall surface turned up to be welded is welded in the bowl bottom opening such that the rim forming recess has a generally triangular section and a cavity is formed inside the rim.

According to the second embodiment of the invention, the outer form of the rim is spread out such that a high-quality bowl-shaped container having stability and voluminousness can be made. A third embodiment of the invention is constructed so that in the thermoforming apparatus of the first embodiment, the rim forming recess includes a first portion continuous from the bottom opening with a diameter thereof maintained substantially at the same value and a second portion continuous from the first portion and having a reduced inner diameter, the first and second portions forming the outer wall and the bottom wall.

In the third embodiment of the invention thus constructed, a vertical outer form of the rim is formed by a portion of the rim forming recess continuous from bowl bottom opening with the diameter being maintained at the same value. An inner circumferential surface of the rim is formed by turning up a portion of the sheet continuous from a portion with a slightly reduced inner diameter. The thermoplastic resin sheet is reversed at a portion where both portions are continuous. The reversed portion forms a bottom wall. In this case, a rim outer side wall surface and a rim inner side wall surface are welded together such that the rim becomes solid.

According to the third embodiment of the invention, a strong rim can be formed by superposing two thermoplastic resin sheets.

A fourth embodiment of the invention is constructed so that in the thermoforming apparatus of the third embodiment of the invention, the second portion of the rim forming recess has a thickness slightly smaller than a doubled thickness of the thermoplastic resin sheet such that the thermoplastic resin sheet is prevented from being turned up when folded back.

In the fourth embodiment of the invention thus constructed, the rim forming recess has a concentric cylindrical portion. The portion with the reduced inner diameter is pushed up by ascend of the bottom plate, so that the portion is revered to a side with a large inner diameter. Since the clearance in which the thermoplastic resin sheet is folded has a thickness substantially equal to a double of the thickness of the thermoplastic resin sheet, two sheets are superposed to be welded together, pushed against each other. Accordingly, the slightly narrow range is set so as to meet such conditions. Since the thermoplastic resin sheet is expanded by the plug, the sheet becomes thinner as compared with the original thickness. On the basis of this, the second and subsequent sheets are slightly narrowed.

According to the fourth embodiment of the invention, the sheet can accurately be folded back without turning up the outer wall when the rim is formed.

A fifth embodiment of the invention is constructed so that in the thermoforming apparatus of any of the first four embodiments, the rim forming recess extends inward substantially by a length of the rim from the first and second portions forming the outer wall and the bottom wall.

In the fifth embodiment of the invention thus constructed, the thermoplastic resin sheet is continuous inward substantially by the length of the rim. Accordingly, the thermoplastic resin sheet is once expanded more than the bottom wall and thereafter, this portion is folded to be formed into a rim inner side wall surface. That is, since the thermoplastic resin sheet is expanded by an amount corresponding to a folded portion, the rim outer side wall surface can be prevented from being turned up when the sheet is folded.

According to the fifth embodiment of the invention, since a folding portion is previously ensured, the inside wall face can accurately be folded back.

A sixth embodiment of the invention is constructed so that in the thermoforming apparatus of any one of the first five embodiments, the thermoforming female die has a heater disposed near the rim forming recess so that a temperature near the rim forming recess is higher than a temperature in the other portion.

In the sixth embodiment of the invention thus constructed, the heater is disposed near the rim forming recess in the thermoforming female die and accordingly, the temperature of this portion can be increased as compared with the other portion. Since the temperature is high, the thermoplastic resin sheet is not immediately hardened even when coming into contact with the inner circumferential surface of the rim forming recess. The thermoplastic resin sheet is turned up in the half-melted state at the time the bottom plate is driven. The ordinary hardening starts some time after the sheet has been turned up. That is, increasing the temperature retards hardening and accordingly, the temperature is not increased to such a value as to melt the sheet.

According to the sixth embodiment of the invention, the thermoplastic resin sheet can be prevented from hardening immediately at an initial stage of the forming.

The thermoforming apparatus of the present invention is mainly characterized by the female die and the invention may be constructed as the sole invention of the thermoforming female die. Thus, a seventh embodiment of the invention is a thermoforming female die including a rim forming recess formed generally into a shape of a bowl-shaped recess, communicating with a bottom opening and forming a bottom wall of the bowl, an outer wall, a bottom wall and an inner wall of a rim of the bottom, and a bottom plate formed into a columnar shape similar to the bottom opening and supported to be moved forward and backward relative to the rim forming recess, the bottom wall being driven between a first stop position where the bottom plate is retreated inside the rim forming recess and a second stop position where the bottom plate is in the vicinity of the bottom opening.

According to the seventh embodiment of the invention, when the bowl-shaped container with a rim is made out of the thermoplastic resin sheet, no gaps are formed inside, and re-use by cleaning can be rendered easy.

Further, the invention may be constructed as a method of forming the rim. Thus, an eighth embodiment of the invention is a method of thermoforming comprising the steps of communicating a rim forming recess formed generally into a shape of a bowl-shaped recess with a bottom opening and forming a bottom wall of the bowl, an outer wall, a bottom wall and an inner wall of a rim of the bottom, supporting a bottom plate inside the rim forming recess so that the bottom plate is moved forward and rear ward relative to the rim forming recess, the bottom plate being formed into a columnar shape similar to the bottom opening so that the bottom plate is moved forward and backward relative to the rim forming recess, bringing the thermoplastic resin sheet heated to be softened into close contact with an inner circumferential surface of the bowl-shaped recess and immediately thereafter, moving the bottom plate to the second stop position so that a rim is formed, and retreating the bottom plate to the first stop position.

According to the eighth embodiment of the invention, when the bowl-shaped container with a rim is made out of the thermoplastic resin sheet, no gaps are formed inside, and re-use by cleaning can be rendered easy.

Further, the invention may be constructed as a method of making a bowl-shaped container with a rim. Thus, a ninth embodiment of the invention is a method of thermoforming a bowl-shaped container in which a thermoplastic resin sheet heated to be softened is brought into close contact with an inner circumferential surface of thermoforming female die formed generally into a bowl shaped recess, the method comprising the steps of communicating a rim forming recess formed generally into a shape of a bowl-shaped recess with a bottom opening and forming a bottom wall of the bowl, an outer wall, a bottom wall and an inner wall of a rim of the bottom, supporting a bottom plate inside the rim forming recess so that the bottom plate is moved forward and rear ward relative to the rim forming recess, the bottom plate being formed into a columnar shape similar to the bottom opening so that the bottom plate is moved forward and backward relative to the rim forming recess, bringing the thermoplastic resin sheet heated to be softened into close contact with an inner circumferential surface of the bowl-shaped recess and immediately thereafter, moving the bottom plate to the second stop position so that a rim is formed, and retreating the bottom plate to the first stop position.

According to the ninth embodiment of the invention, when the bowl-shaped container with a rim is made out of the thermoplastic resin sheet, no gaps are formed inside, and re-use by cleaning can be rendered easy.

A tenth embodiment of the invention is a thermoforming apparatus which includes a thermoforming female die unit and a plug unit, wherein the thermoforming female die unit includes a main die formed generally into a bowl-shaped recess and having a body formed with a number of grooves, the plug unit includes a plug thrusting a softening thermoplastic resin sheet into the main die in a primary forming, a male die pressed against a portion of an inner circumferential surface corresponding to positions of the grooves after the primary forming while a primary product is held in the main die, and a switching mechanism for switching the plug and the male die.

In the tenth embodiment of the invention thus constructed, a number of grooves are formed in the body of the main die formed generally into a bowl-shaped recess. When the softening thermoplastic resin sheet is pushed into the grooves by the plug of the plug unit in a primary forming to be brought into contact with the inner circumferential surface, the sheet enters the grooves such that the sheet assumes such a state as to be folded back. At this time, however, the resin sheet is only folded and gaps are formed. Accordingly, the plug is switched to the male die by the switching mechanism to be pushed into the main die in the state where the primary molding is held in the main die after the primary forming. The male die has such a form as to be pressed against locations of the grooves in the main die, whereby the same effect is achieved as a part of the sheet out of the grooves in the main die is pressurized to be forced into the grooves. As a result, present gaps are closed.

According to the tenth embodiment of the invention, when the bowl-shaped container with a number of ribs on the body thereof is made out of the thermoplastic resin sheet, no gaps are formed inside, and re-use by cleaning can be rendered easy.

The thermoplastic resin sheet is pushed into the grooves with the male die. However, it is effective that the thermoplastic resin sheet is rendered easy to be pushed into the grooves. For this purpose, an eleventh embodiment of the invention is constructed so that in the thermoforming apparatus of the tenth embodiment of the invention, the main die has a heater for heating the body formed with the grooves.

In the eleventh embodiment of the invention thus constructed, the temperature of the body formed with the grooves can be increased. Accordingly, the thermoplastic resin sheet can be prevented from being hardened before being pushed into the grooves and can easily be pushed into the grooves.

According to the eleventh embodiment of the invention, the ribs can be prevented from hardening immediately at an initial stage of the thermoforming.

When a heater is provided, it is worthwhile to use a cooling male die for cooling so that the sheet becomes easy to be hardened. In order that a part of the main die may be heated, a twelfth embodiment of the invention is constructed so that in the thermoforming apparatus of the eleventh embodiment, the main die includes an independent die constituting a portion thereof in which the heater is provided.

In the twelfth embodiment of the invention thus constructed, the portion of the main die having the heater is formed as an independent die. Accordingly, heat is difficult to transfer to the other portion and a suitable temperature control can be provided.

According to the twelfth embodiment of the invention, the temperature of a necessary portion can efficiently be controlled.

The thermoforming apparatus of the present invention is mainly characterized by the female die and the invention may be constructed as the sole invention of the thermoforming female die. Thus, a thirteenth embodiment of the invention is a thermoforming female die formed generally into a shape of a bowl-shaped recess and including one portion which forms a body and is constituted by another die independent of the other portion thereof, wherein said one portion is provided with a heater and has a number of grooves formed in an inner circumferential surface thereof, wherein a softening thermoplastic resin sheet is thrust by a plug into the die in a primary forming, and wherein while a primary product is held in the die, the plug is switched to a cooling male die after the primary forming so that the cooling male die is pressed against a portion of the inner circumferential surface of the die where the grooves are formed so that ribs are formed on the grooves.

According to the thirteenth embodiment of the invention, when the bowl-shaped container with a number of ribs on the body thereof is made out of the thermoplastic resin sheet, no gaps are formed inside, and re-use by cleaning can be rendered easy.

Further, the invention may be constructed as a making a rib. Thus, a fourteenth embodiment of the invention is a thermoforming method comprising the steps of forming a number of grooves in a body of a main die of a thermoforming female die unit, the main die being formed generally into a shape of a bowl-shaped recess, thrusting a softening thermoplastic resin sheet into the main die by a plug in a primary forming, and switching the plug to a male die after the primary forming while a primary product is held in the main die, thereby pressing the mail die against a portion of the inner circumferential surface of the die where the grooves are formed so that ribs are formed on the grooves.

According to the fourteenth embodiment of the invention, when the bowl-shaped container with a number of ribs on the body thereof is made out of the thermoplastic resin sheet, no gaps are formed inside, and re-use by cleaning can be rendered easy.

Further, the invention may be constructed as a making a bowl-shaped container with such a rib. Thus, a fifteenth embodiment of the invention is a method of thermoforming a bowl-shaped container in which a softening thermoplastic resin sheet is interposed between a thermoforming female unit and a plug unit and a bowl-shaped container is made out of the sheet by thermoforming, the method comprising the steps of forming a number of grooves in a body of a main die of the thermoforming female die unit, the main die being formed generally into a shape of a bowl-shaped recess, thrusting a softening thermoplastic resin sheet into the main die by a plug in a primary forming, and switching the plug to a male die after the primary forming while a primary product is held in the main die, thereby pressing the mail die against a portion of the inner circumferential surface of the die where the grooves are formed so that a bowl-shaped container with ribs at locations corresponding to the body.

According to the fifteenth embodiment of the invention, when the bowl-shaped container with a number of ribs on the body thereof is made out of the thermoplastic resin sheet, no gaps are formed inside, and re-use by cleaning can be rendered easy.

Further, in order that a flexible thickness adjustment may be carried out by a simple construction, the sixteenth embodiment of the invention is a thermoforming plug comprising a plug body and a sub plug accommodated in the plug body and moved forward and backward to and from a female die to thereby assist a thickness adjustment.

In the sixteenth embodiment of the invention thus constructed, the sub plug is accommodated in the plug body so as to be moved forward and backward to the interior of the female die. Generally, the thickness of the molding is increased as the gap between the inner circumferential surface of the female die and the plug comes near, whereas the thickness is reduced as the gap is departed away. Accordingly, the sub plug is caused to protrude in a portion whose thickness is to be increased.

According to the sixteenth embodiment of the invention, partial thickness adjustment can easily be assisted by the construction in which the sub plug is moved forward and backward from the plug body.

In what part of the plug body the sub plug should be accommodated is determined according to the requirement of the thickness adjustment. As one example, a seventeenth embodiment of the invention is constructed so that in the thermoforming plug of the sixteenth embodiment of the intention, the plug body and the sub plug are substantially concentric.

In the seventeenth embodiment of the invention thus constructed, an area of the top of the plug is variable as the sub plug is moved forward and backward when the plug body and the sub plug are concentric. More specifically, the area of the top is equal to an area of the plug body when the sub plug does not project. The area of the top is equal to an area of the sub plug when the latter projects. Further, the distance to the circumferential surface of the female die changes depending upon whether the sub plug projects. These elements work as a whole so that a partial adjustment of the thickness is carried out.

According to the seventeenth embodiment of the invention, the thickness can be adjusted by the changes in the bottom area and distance.

Of course, both of them need not be accurately concentric. Roughly the sub plug may only be moved forward and backward from the inside of the top of the plug body.

Various conventional constructions for moving the sub plug forward and backward may be employed. As one suitable example, an eighteenth embodiment of the invention is constructed so that in the thermoforming plug of the sixteenth or seventeenth embodiment of the invention, the sub plug is accommodated and supported in the plug body and communicates with an airtight chamber inside the plug body so as to be moved forward and backward according to a pressure difference between the airtight chamber and an exterior.

In the eighteenth embodiment of the invention thus constructed, the airtight chamber is formed inside the plug body, and the sub plug is accommodated in the plug body so as to communicate with the airtight chamber. Accordingly, the pressure adjustment is carried out between the airtight chamber and the exterior so that the sub plug is moved forward and backward. For example, when the negative pressure is applied to the sub plug while the exterior is maintained at a predetermined pressure, the sub plug is accommodated into the plug body. The sub plug projects when compressed air is supplied into the airtight chamber. As well known, the pressure outside the plug body is controlled and the pressure difference is adjusted to the extent required for the driving control of the sub plug. More specifically, the sub plug projects when the pressure higher than in the exterior is supplied to the airtight chamber. The sub plug is accommodated into the plug body when the airtight chamber is opened to the atmosphere in the above-described state.

According to the eighteenth embodiment of the invention, the drive of the sub plug is controlled only by the pressure difference. As a result, the construction of the plug and the forming timing can be simplified.

Thus, when the forward and backward movement of the sub plug is controlled by the pressure difference, various structures for supporting the sub plug can be proposed. As one example, a nineteenth embodiment of the invention is constructed so that in the thermoforming plug of the eighteenth embodiment of the invention, the plug body and the sub plug are formed into shapes of a cylinder and a piston respectively.

In the nineteenth embodiment of the invention thus constructed, the sub plug and the plug body have a structure of a piston and a cylinder. Since the sub plug is accommodated and supported in the cylindrical portion formed in the plug body, the pressure is adjusted between the airtight chamber inside the plug body and the exterior so that the sub plug can be moved forward and backward in the form of a piston.

According to the nineteenth embodiment of the invention, the sub plug and the plug body has a simplified construction as that of the cylinder and piston.

The aforesaid thermoforming plug is not used independently but used as a part of the thermoforming apparatus. The thickness adjustment can be desirably carried out in the thermoforming apparatus. In this meaning, a twentieth embodiment of the invention is a method of thermoforming a product in which a plug is moved forward and backward into and out of a thermoforming female die so that a softening thermoplastic resin plate is preliminary extended, thereby thermoforming a product, wherein the plug includes a plug body and a sub plug accommodated in the plug body and moved forward and backward to and from the female die, the method comprising the steps of putting the plug body and the sub plug into the thermoforming female die with the sub plug projecting, and retreating the sub plug thereafter so that a thickness adjustment is carried out.

In the twentieth embodiment of the invention thus constructed, the plug body and the sub plug are caused to enter the thermoforming female die with the sub plug projecting. Accordingly, the distance to the inner circumferential surface of the female die is small and the thickness is increased in the vicinity of the inner circumferential surface. Further, since the sub plug is thereafter moved backward, drawbacks due to the shortened gap between the inner circumferential surface of the female die and the plug can be avoided.

According to the twentieth embodiment of the invention, the thickness adjustment can easily be carried out.

Of course, the thickness adjustment has merits even if such drawbacks do not occur. However, the above-described method is suitable for a case where the drawbacks need to be solved. As one example, a twenty-first embodiment of the invention is a thermoforming apparatus comprising a thermoforming female die and a plug moved forward and backward so that a softening thermoplastic resin plate is thrust into the thermoforming female die, wherein the thermoforming female die includes a rim outer shape recess formed into a shape of a bowl-shaped recess and forming a rim outer peripheral shape spread outward so as to be continuous from the bowl bottom, and a rim inside forming die formed into a columnar shape similar to an open edge of the rim outer shape recess continuous to the bowl-shaped recess and supported to be moved forward and backward relative to the bowl-shaped recess, the rim inside forming die being driven between a first stop position where the bottom plate is retreated inside the rim forming recess and a second stop position where the bottom plate is in the vicinity of the open edge, and the plug includes a plug body allowed to enter the bowl-shaped recess and a sub plug formed into such a columnar shaped as to enter an opening of the rim outer shape recess and supported so as to be moved forward and backward relative to the bowl-shaped recess, the sub plug being reciprocated without abutting against rim inside forming die when the rim inside forming die is reciprocated between the first and second stop positions.

In the twenty-first embodiment of the invention thus constructed, a spread-out rim is formed by the bowl bottom of the thermoforming female die formed into the bowl-shaped recess. Accordingly, the spread-out rim outer form recess is formed which is continuous from the bowl bottom of the bowl-shaped recess. The columnar rim inside forming die, which is similar to an open edge to the bowl-shaped recess, is accommodated in the bowl bottom of the bowl-shaped recess so as to be moved forward and backward. The rim inside forming die is moved between the first stop position where the bottom plate is retreated inside the rim forming recess and the second stop position where the bottom plate is in the vicinity of the open edge. The rim inside forming die is on standby at the first stop position at the time of start of the forming. Accordingly, the softened thermoplastic resin plate needs to be drawn from the bowl bottom of the bowl-shaped recess through the rim outside recess to the rim inside forming die.

According to the twenty-first embodiment of the invention, a rim having an increased thickness can be formed.

In this case, the conventional plug cannot push the thermoplastic resin plate inside the bowl bottom of the female die. This results in an increase in the distance from the plug to the rim outside forming recess or the rim inside forming die. However, the above-described plug includes the plug body moved into the bowl-shaped recess and the columnar sub plug moved into the opening of the rim outside forming recess. The sub plug projects so that the thermoplastic resin plate is thrust into the position near the rim outside forming recess or the rim inside forming die. The rim inside forming die is supported to be moved forward and backward in order that the thermoplastic resin plate drawn inside the bowl bottom may be returned to the opening side so that the rim is formed by the rim outside forming recess spread-out from the opening edge and the bowl bottom continuous from the bowl-shaped recess without any large stepped portion. Since the rim inside forming die is moved from the first stop position to the second stop position, the sub plug interferes with the molding when the sub plug projects. Further, the thickness cannot be increased when such a distance as not to result in interference is provided.

Consequently, the rim inside forming die can be reciprocated between first and second stop positions such that the sub plug can be reciprocated without contact, whereby the thickness can be increased to the maximum. Further, in order that even a large undercut can stably be released from a die and made, a twenty-second embodiment of the invention is a method of thermoforming a product with an undercut wherein vacuum and die-releasing holes are concentrically provided in an undercut forming portion of a thermoforming die, comprising the step of supplying compressed air through the vacuum and die-releasing holes during die-release so that an undercut portion of the product is flexed, thereby assisting the die-release from the undercut forming portion.

In the twenty-second embodiment of the invention thus constructed, the thermoforming die includes an undercut forming portion, and the vacuum and die-releasing holes are formed concentrically in the vicinity of the undercut forming portion. Accordingly, when compressed air is supplied from the vacuum and die-releasing holes during the die-releasing, the undercut-shaped portion of the molding is flexed, whereupon a superposed portion with respect to the undercut forming portion is increased such that the undercut-shaped portion is easy to be removed. According to the twenty-second embodiment of the invention, a larger undercut can stably be removed from the die.

The thermoforming die may basically comprise either male die or female die. As one example, a twenty-third embodiment of the invention is constructed so that in the method of the twenty-third embodiment of the invention, the thermoforming die comprises a female die having a shape of a bowl-shaped recess, wherein the undercut forming portion is spread out from a bowl bottom of the bowl-shaped recess inward, and wherein the compressed air is supplied through the vacuum and die-releasing holes so that the bottom of the product is flexed, thereby assisting the die-release from the undercut forming portion.

In the twenty-third embodiment of the invention thus constructed, the thermoforming die is a female die having the bowl-shaped recess and is formed so as to be spread out inward from the bowl bottom of the recess. Accordingly, when the molding is drawn out of the female die, the spread-out portion becomes an undercut. Since the vacuum and die-releasing holes are formed concentrically in the vicinity of the undercut forming portion, pressure is applied from the outside to the inside of the bowl bottom when compressed air is supplied by the vacuum and die-releasing holes during the die-releasing. When the pressure is applied from the bowl bottom side, the bowl bottom is flexed inward about the portion farthest from the opening end. Then, a projecting portion spread out from the bowl bottom is inclined relative to the undercut forming recess provided in the female die and can easily pass through the recess. According to the twenty-third embodiment of the invention, a form spread out inward from the bowl bottom can be obtained.

When the undercut is formed on the bowl bottom and the vacuum and die-releasing holes are concentrated onto the portion near the undercut, no holes are disposed in the side near the opening end. As a result, the thermoplastic resin plate tends to be brought into contact with the inner circumferential wall surface of the die in a portion at the opening end side. In view of this, a twenty-fourth embodiment of the invention is constructed so that in the method of the twenty-third embodiment of the invention, the vacuum and die-releasing holes are formed in the female die, wherein a hole communicating with atmosphere is formed in a portion of the bowl-shaped recess in the vicinity of an open end, and wherein compressed air is supplied through the inside of the product during the forming.

In the twenty-fourth embodiment of the invention thus constructed, the hole communicating with the atmosphere is formed in the portion in the vicinity of the open end. Compressed air is supplied through the inside of the bowl during the forming. The vacuum and die-releasing holes are formed in the bowl bottom side. When the negative pressure is applied to the holes during the forming, air is sucked along the inner circumferential surface of the forming die. On the other hand, since compressed air is supplied from the bowl inside of the molding during the forming a portion near the opening end is pressed against the inner circumferential surface of the forming die as well as the bowl bottom. Air between both of them is sucked through a suction hole at the bowl bottom side and is exhausted through the hole communicating with the atmosphere at the opening end side.

According to the twenty-fourth embodiment of the invention, the portion near the opening end of the bowl-shaped recess can be formed into a desired shape even if the vacuum and die releasing holes are formed concentrically in the bowl bottom.

Synchronizing the supply of compressed air with another operation is effective. As one example, a twenty-fifth embodiment of the invention is constructed so that in the method of any one of the twenty-second to twenty-fourth embodiments, supply of compressed air through the vacuum and die-releasing holes is initiated before knock-out.

In the twenty-fifth embodiment of the invention thus constructed, since the compressed air is supplied prior to the knockout, the supply of compressed air starts when a portion near the opening end is adherent on the die, whereupon the bowl bottom tends to be flexed. The reason for this is that even when compressed air is supplied after the knockout starts and a gap is formed between the portion near the opening end and the die, the compressed air leaks out such that the bowl bottom cannot be flexed.

According to the twenty-fifth embodiment of the invention, since the supply of compressed air is initiated prior to the knockout, the undercut form portion can reliably be flexed.

Either female die or male die may be used. In the case of the male die forming the bowl, the softened thermoplastic resin plate is sucked to the outer surface of the die. When compressed air is supplied during the die-releasing, the bowl bottom is expanded outward to be flexed, so that the bowl bottom can easily be removed from the undercut forming portion.

Thus, the technique for assisting the die-releasing by flexing the molding immediately before the die-releasing is realized by a solid apparatus and in this sense, it can readily be understood that the invention may be applied to a solid apparatus. From the viewpoint that flexing by the supply of compressed air enhances the die-releasing, the twenty-sixth embodiment of the invention is a thermoforming female die formed into a bowl-shaped recess, and having vacuum and die-releasing holes concentrically formed in a bowl bottom and a hole communicating with atmosphere and formed in the vicinity of an open end.

In the twenty-sixth embodiment of the invention thus constructed, the vacuum and die releasing holes are disposed concentrically in the bowl bottom formed in the bowl-shaped recess. When the compressed air is supplied through the vacuum and die-releasing holes, the bowl bottom is flexed. Further, since the hole communicating with the atmosphere is disposed in the portion near the opening end, air present between the bowl bottom and the inner circumferential surface of the die is discharged into the atmosphere outside the die even if the air cannot be exhausted from the vacuum and die-releasing holes.

Of course, the invention may include the arrangement for control of air supply and exhaust. As one example, a twenty-seventh embodiment of the invention is constructed so that in the thermoforming female die of the twenty-sixth embodiment of the invention, the die further comprises a die-releasing compressed air supplying mechanism supplying compressed air through the vacuum and die-releasing holes so that a bowl bottom of the product is inwardly flexed in the die.

According to the invention of the twenty-sixth or twenty-seventh embodiment of the invention, the thermoforming female die wherein the die can easily be held can be provided.

The bowl bottom is flexed when the die-releasing compressed air supplying mechanism supplies compressed air from the vacuum and die-releasing holes. Flexing the bowl bottom assists the die-releasing irrespective of the presence of the undercut. The flexing is most effective when the undercut is formed. In view of this, a twenty-eighth embodiment of the invention is constructed so that in the thermoforming female die of the twenty-sixth or twenty-seventh embodiment of the invention, the die further comprises an undercut forming portion formed to spread out from the bowl bottom of the bowl-shaped recess, wherein compressed air is supplied through the vacuum and die releasing holes so that the bowl bottom of the product is flexed to be released from the undercut forming portion.

In the twenty-eighth embodiment of the invention thus constructed, the undercut forming portion is formed to be spread out from the bowl bottom of the bowl-shaped recess. When the molding is drawn in an ordinary manner, the undercut forming portion and the undercut of the molding interfere with each other. However, if the bowl bottom is inwardly flexed, the undercut of the molding becomes easy to pass through the undercut forming portion to thereby be removed therefrom.

According to the twenty-eighth embodiment of the invention, the spread-out undercut can be formed on the bowl bottom.

A sequence of operation is controlled by a sequencer when a molding with an undercut forming portion is thermoformed using the aforesaid thermoforming female die. In this case, the sequencer controls supply and exhaust of air through the vacuum and die-releasing holes, die releasing and knockout. Accordingly, the present invention may be applied to a control program for the above-described sequencer. Further, the invention may be applied to a medium on which the control program is recorded.

Of course, the recording medium may be a magnetic recording medium or photo magnetic recording medium. Further, the same idea may be adapted to any recording medium which is to be developed in the future. Moreover, it goes without saying that the same idea is adapted to a reproducing stage such as a primary reproduced product or secondary reproduced product. Besides, the present invention is also used in a case where the communication line is utilized as a supplying method.

Moreover, there is no difference in the concept of the invention in case where the invention is realized by partly a software and partly a hardware. It may be a type wherein a portion is stored on the recording medium to be suitably read as the need arises.

BRIEF DESCRIPTION OF THE DRAWINGS

Other objects, features and advantages of the present invention will become clear upon reviewing the following description of the preferred embodiment, made with reference to the accompanying drawings, in which.

DETAILED DESCRIPTION OF THE PREFERRED EMBODIMENTS

Figure 1:
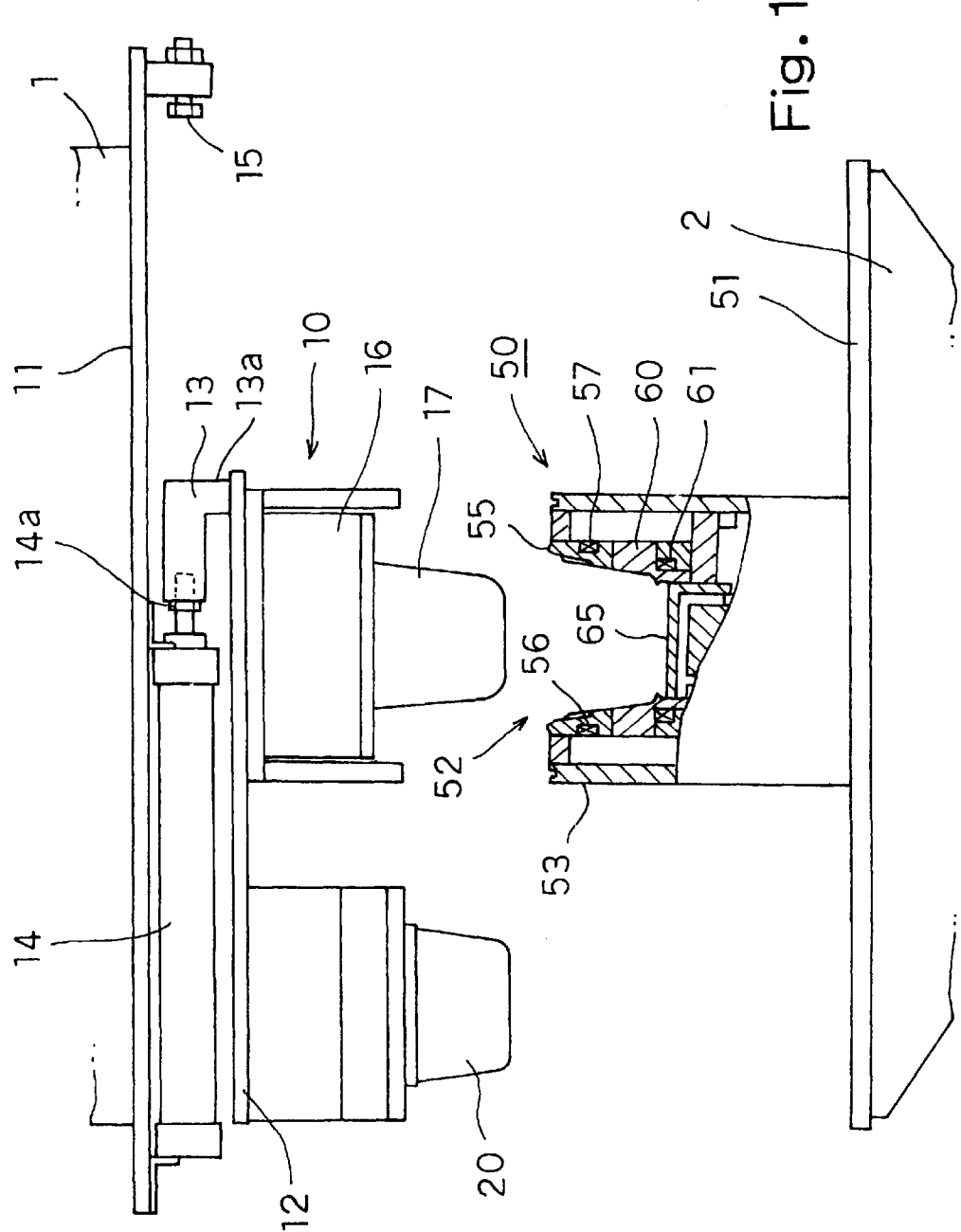
FIG. 1 is a partially broken side view of a thermoforming apparatus of an embodiment in accordance with the present invention.
Figure 2:
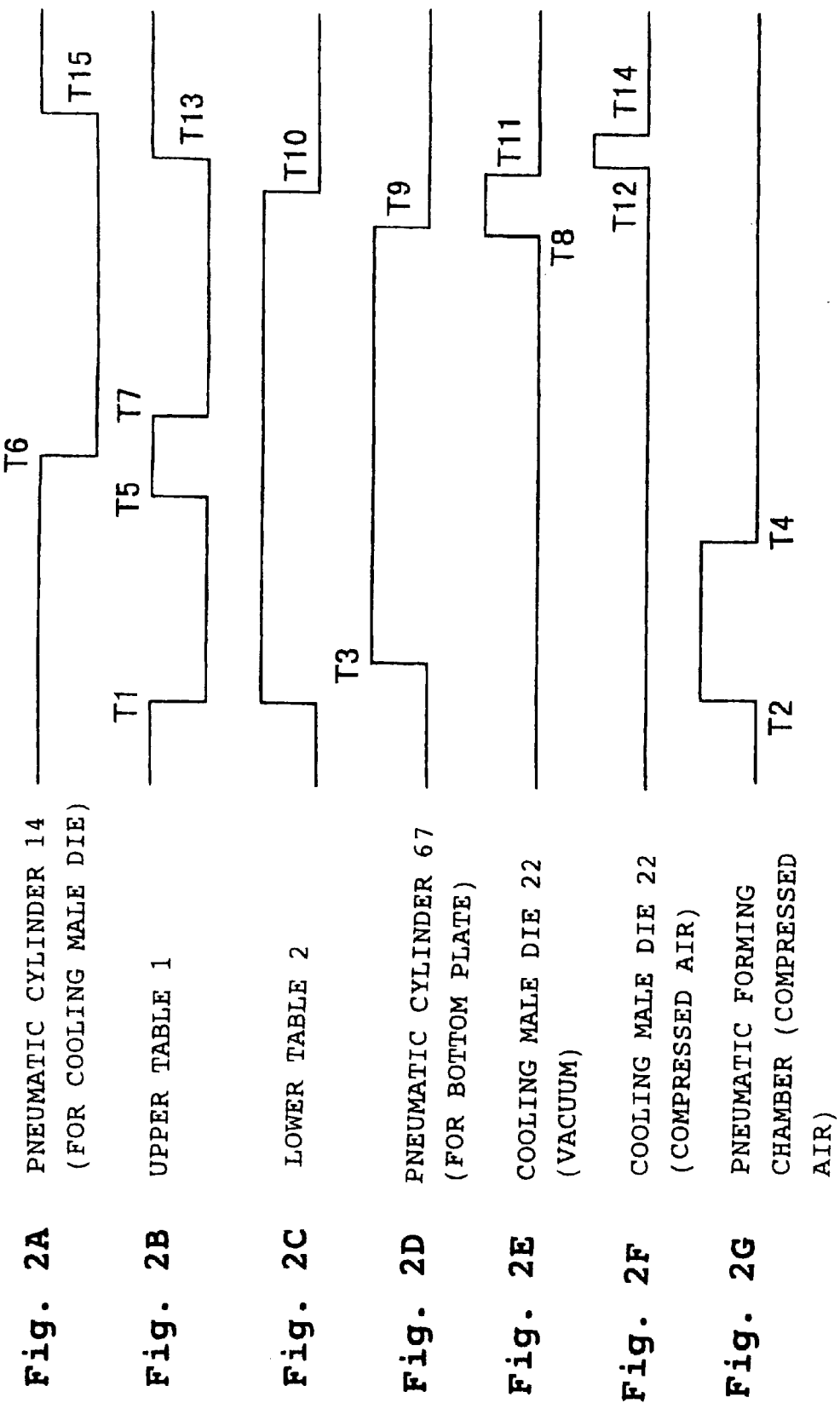
FIGS. 2A to 2G are timing charts showing the operation sequence of the thermoforming apparatus.

A first embodiment of the present invention will now be described with reference to FIGS. 1 to 14. Referring to FIG. 1, the bowl-shaped container of one embodiment in accordance with the invention is shown. The bowl-shaped container 80 has a rim 84 of the bottom, and the rim is hollow. The container 80 includes a body 82 having a plurality of ribs 83 each of which protrudes outward from an outer surface thereof and has no slit-like recess in an inner circumferential face thereof.

Referring to FIG. 1, a thermoforming apparatus for forming the bowl-shaped container 80 is shown. The thermoforming apparatus includes an upper table 1 and a lower table 2 fixed to driving mechanisms (not shown) respectively. The upper and lower tables 1 and 2 are moved vertically by a predetermined stroke by the respective driving mechanisms. An upper table assembly 10 is mounted on the upper table 1, whereas a lower table assembly 50 is mounted on the lower table 2. A mounting plate 11 is fixed to the upper plate 1. The upper table 1 is further provided with a base 12 guided by a guide bar (not shown) so that base is moved horizontally. A block 13 projects from an upper face of the base 12. A pneumatic cylinder 14 serving as a driving element fixed to the mounting plate 11 has a rod 14a with a distal end connected to the block 13.

More specifically, the base 12 is mounted on the pneumatic cylinder 14 further mounted on the mounting plate 11 so as to be moved horizontally by a predetermined stroke. For adjustment of the moving range, a stopper 15 is provided on the mounting plate 11. The block 13 has an outer end face 13a which is caused to abut against the stopper 15 so as to be positioned. The base 12 has a backside on which a pneumatic forming chamber 16 having an open lower end is mounted. The chamber 16 includes a centrally disposed pneumatic forming plug 17. A cooling male die 20 is mounted on the base 12 so as to be spaced away from the plug 17. When the rod 14a is extended and contracted by the pneumatic cylinder 14, the cooling male die 20 and the pneumatic forming plug 17 can be switched therebetween. Thus, the upper table assembly 10 switches the plug 17 and the cooling male die 20 alternately.

Figure 3:
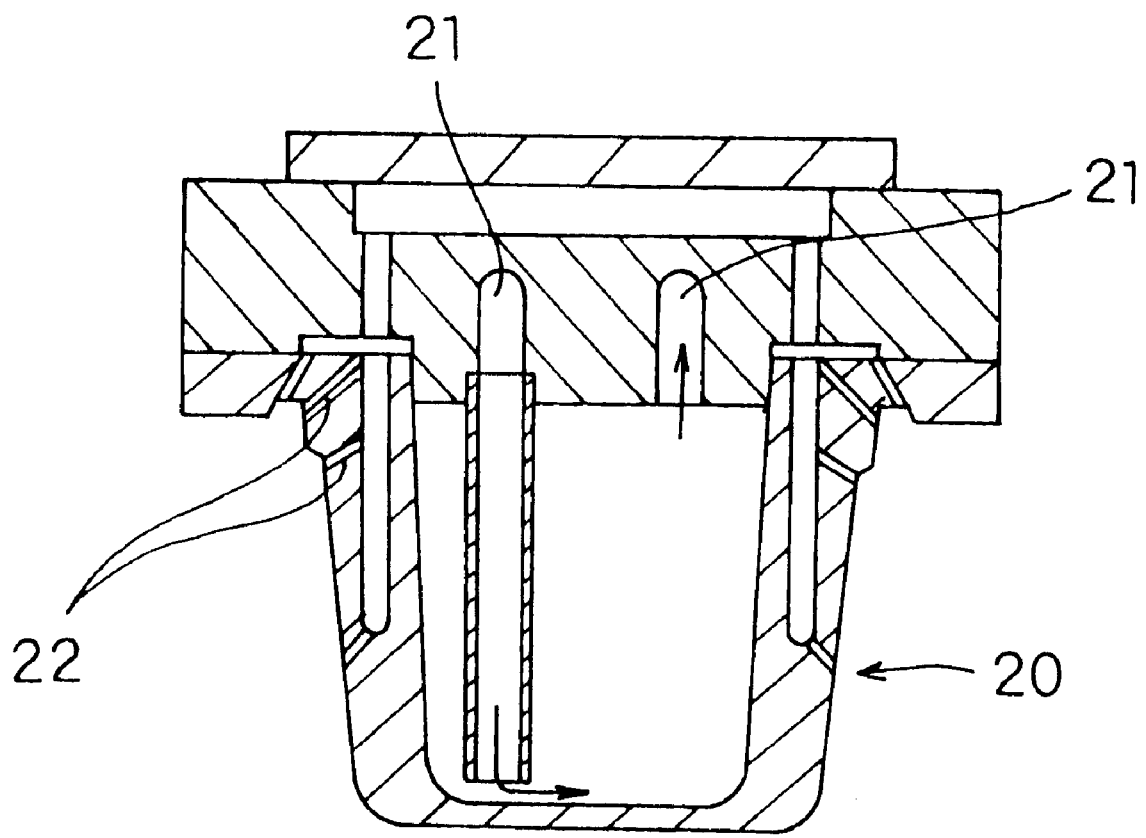
FIG. 3 is an enlarged sectional view of a cooling male die used in the thermoforming apparatus.
Figure 4:
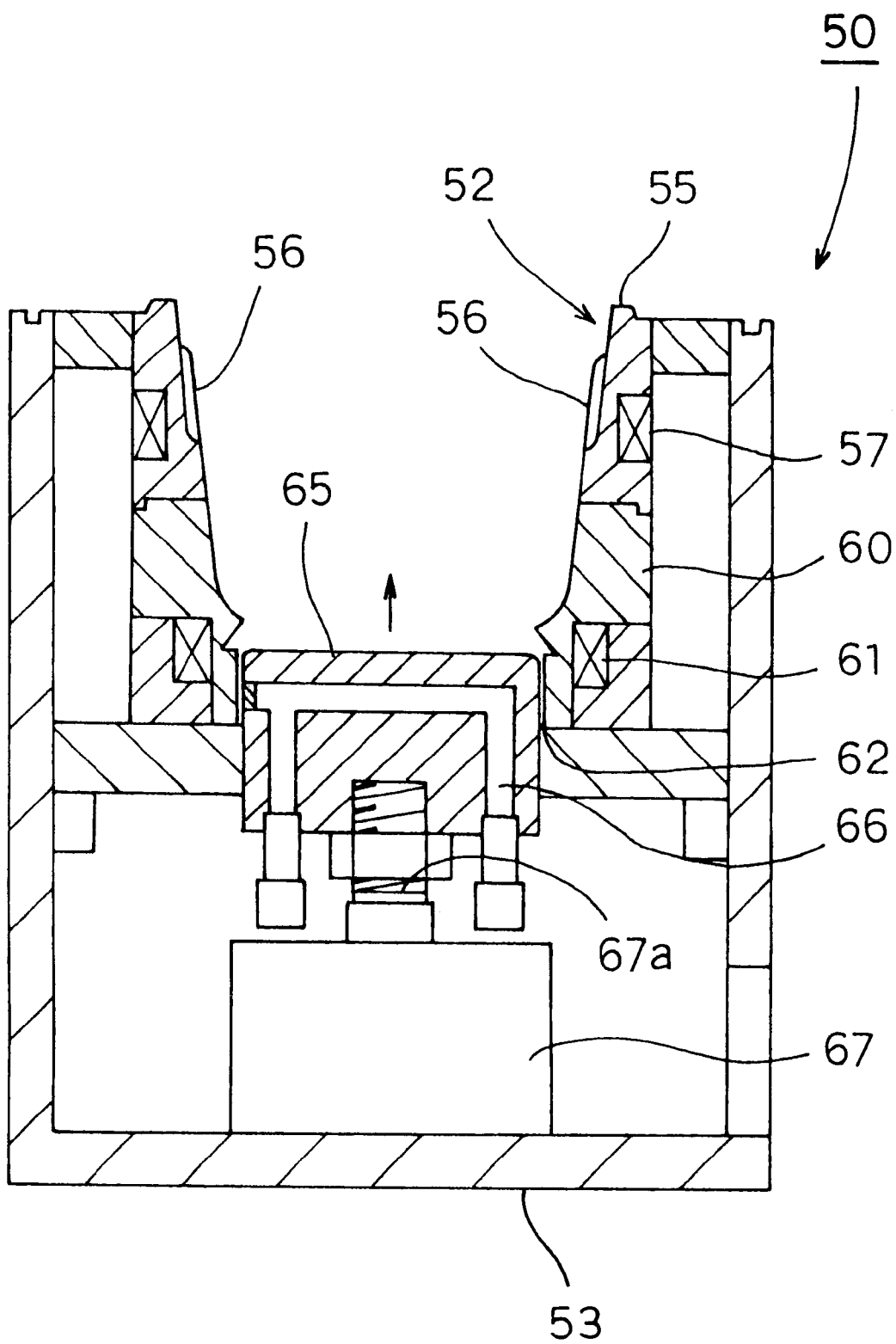
FIG. 4 is an enlarged sectional view of a female die used in the thermoforming apparatus.
Figure 5:
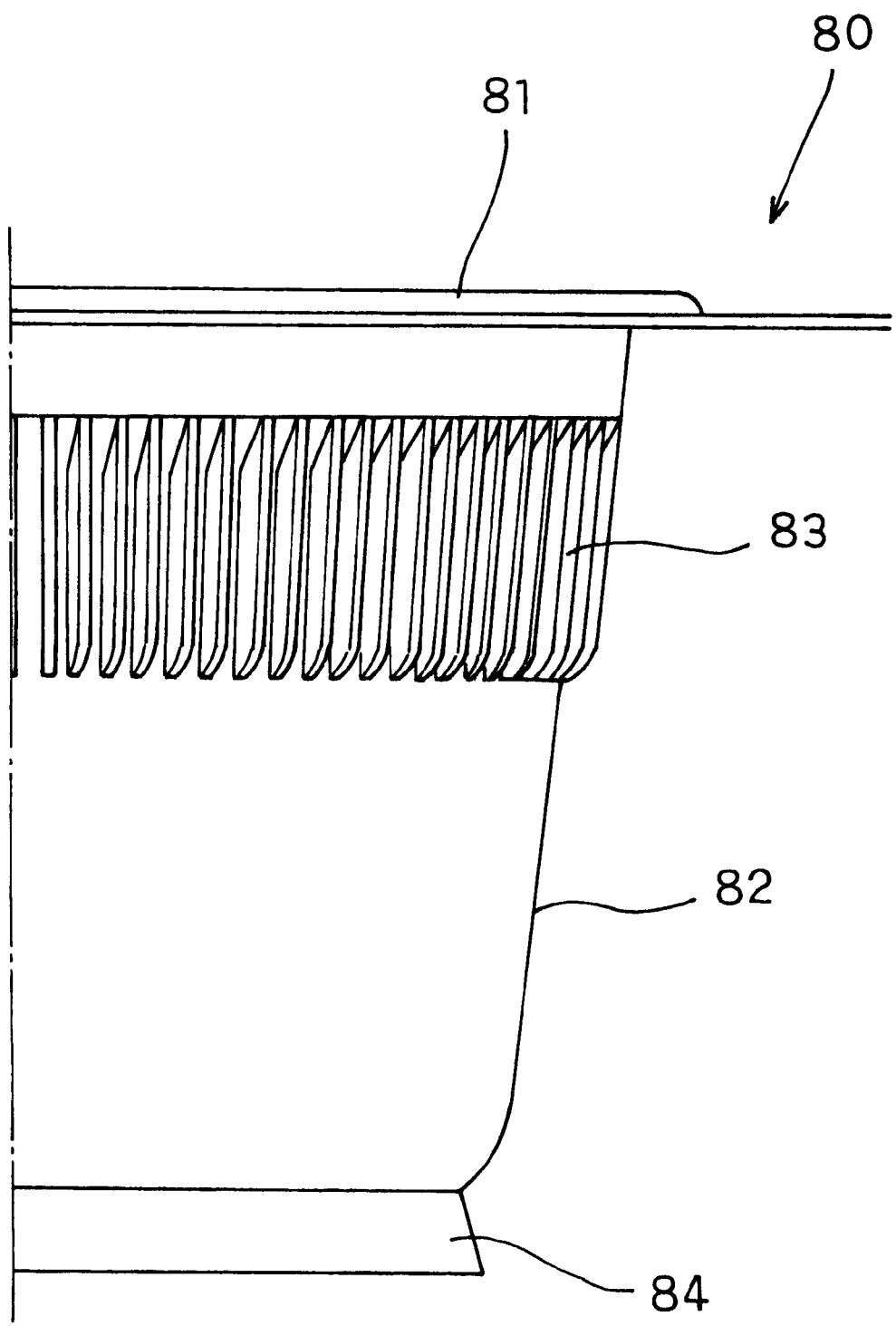
FIG. 5 is a side view of a bowl-shaped container formed by the thermoforming apparatus.

The cooling male die 20 is provided for shaping the inner surface of the container 80. The die 20 has a cooling passage 21 through which a cooling liquid is circulated so that the temperature of the die is maintained in a predetermined range as shown in FIG. 3. The die 20 further has suction holes 22 formed to correspond to an opening of the container 80 and the body 82. On the other hand, the lower table assembly 50 includes a base 51 provided with a female die 52 as shown in FIG. 4. The female die 52 is disposed in a frame 53 forming a gas tight space together with the chamber 16. The female die 52 has an inner surface conforming to the bowl shape of the container 80.

The female die assembly 52 includes an upper die 55, a middle die 60 and a bottom plate 65. The upper die 55 is used to form a part of the container 80 from the opening 81 to an upper portion of the body 82. The upper die 55 has vertical grooves 56 formed in a portion of its inner circumferential face corresponding to the upper body portion. The grooves 56 are provided for forming ribs 83 each of which has a thickness of about 0.7 mm and a length of about 2.5 mm, for example so that the ribs 83 have the same depth and shape. The middle die 60 is provided for forming a lower portion of the body 82 and a part of an outwardly spread rim 84. The middle die 60 has an opening in the bottom. The bottom plate 65 is inserted in the opening of the middle die 60 so as to be vertically moved. The bottom plate 65 is driven by the pneumatic cylinder 67 as will be described later.

The middle die 60 is spread outward and then narrowed so that an opening is formed in the bottom of the container and a outwardly spread rim 84 is continuous from the bottom opening. The narrowed portion of the middle die 60 forms a hole 62 having a slightly larger diameter than the bottom opening of the container. The bottom plate 65 is disposed in the hole 62 with a predetermined clearance therebetween. The bottom plate 65 has a generally flat top and a rounded circumferential edge. The bottom plate 65 has a slightly larger diameter than the bottom opening of the container. The top of the bottom plate 65 agrees substantially with the narrowed portion of the middle die 60 when the bottom plate assumes a lower end position. The rounded face of the bottom plate 65 is spaced away slightly from the inclined face for forming the rim 84 when the bottom plate assumes an upper end position. Such a clearance that two thermoplastic resin sheets are welded together is provided at the slightly spaced position. A portion of the middle die 60 lower than the bottom opening and forming the rim is referred to as "rim forming recess."

A heater 57 is embedded in the outer circumferential side of the upper die 55 around the grooves 56 to set the temperature of the die relatively high. As the result of provision of the heater 57, the thermoplastic resin sheet is not hardened at once even when coming into contact with the grooves 56. Further, a heater 61 is embedded around the rim forming portion in the middle die 60 to set the temperature of the die relatively low. The heater 61 slightly delays the hardening of the thermoplastic resin sheet. Further, the bottom plate 65 has a cooling passage 66 through which a cooling liquid is circulated, so that the thermoplastic resin sheet is cooled so as to be rapidly hardened.

The operation of the thermoforming apparatus will be described with reference to FIGS. 2A to 2G. A heater and a feeder are provided in the previous stage of the thermoforming apparatus. Since they are well known in the art, the description of them will be eliminated. The rod 14a of the pneumatic cylinder 14 is contracted at the time of start of the forming. As a result, the chamber 16 and the plug 17 are positioned right over the frame 53.

In the aforesaid state, the upper and lower tables 1 and 2 are moved downward and upward respectively at time T1 with the thermoplastic resin sheet S such as polypropylene disposed therebetween. The thermoplastic resin sheet S is previously heated by a heater unit (not shown) so that a surface temperature thereof is about 180° C. As a result, the pneumatic forming chamber 16 and the pneumatic forming plug 17 are moved downward with the mounting plate 11 fixed to the upper table 1. The frame 53 and the female die 52 both fixed to the lower table 2 are moved upward.

Figure 6:
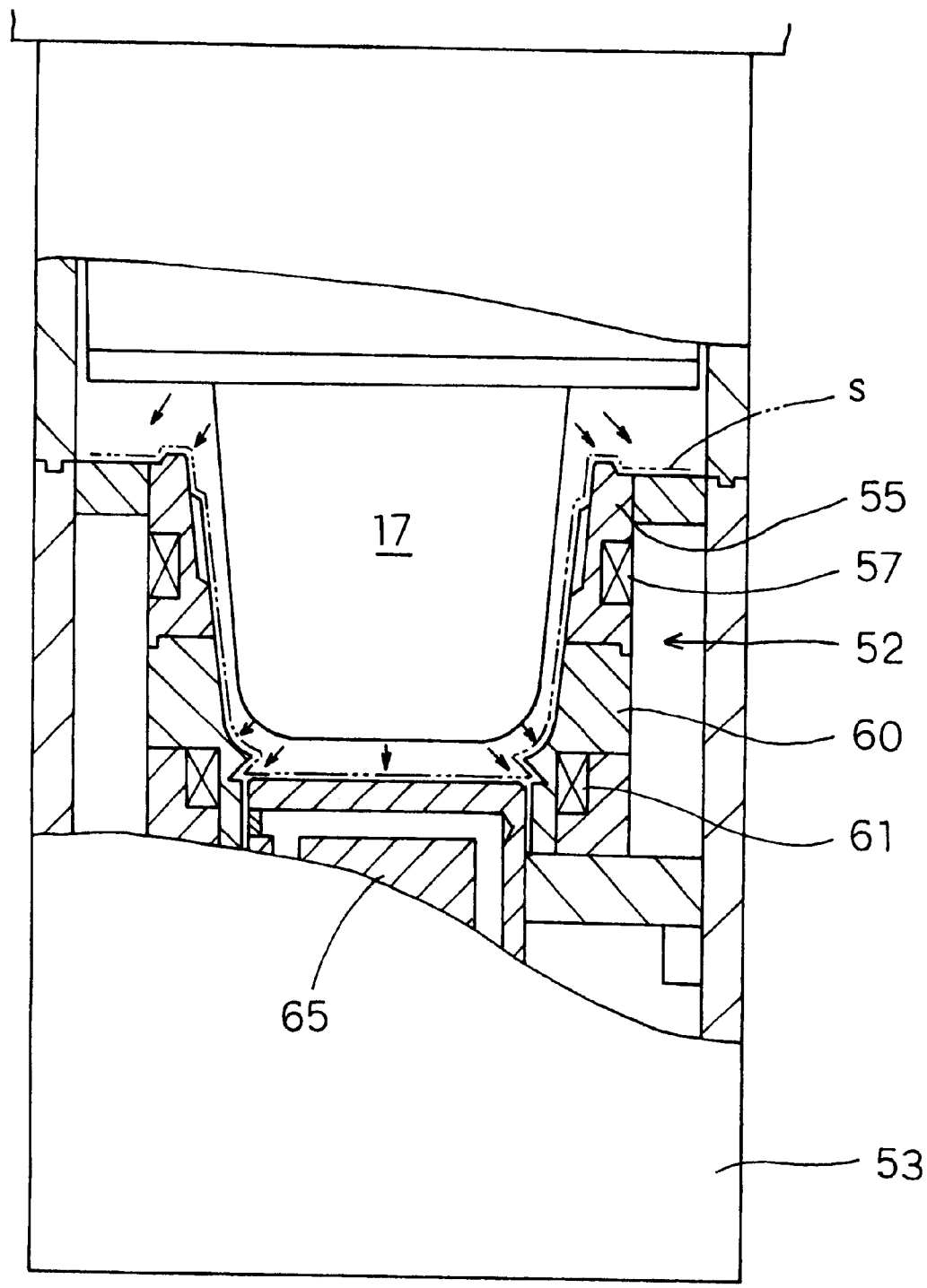
FIG. 6 is a partial sectional view of the thermoforming apparatus in the closed state.
Figure 7:
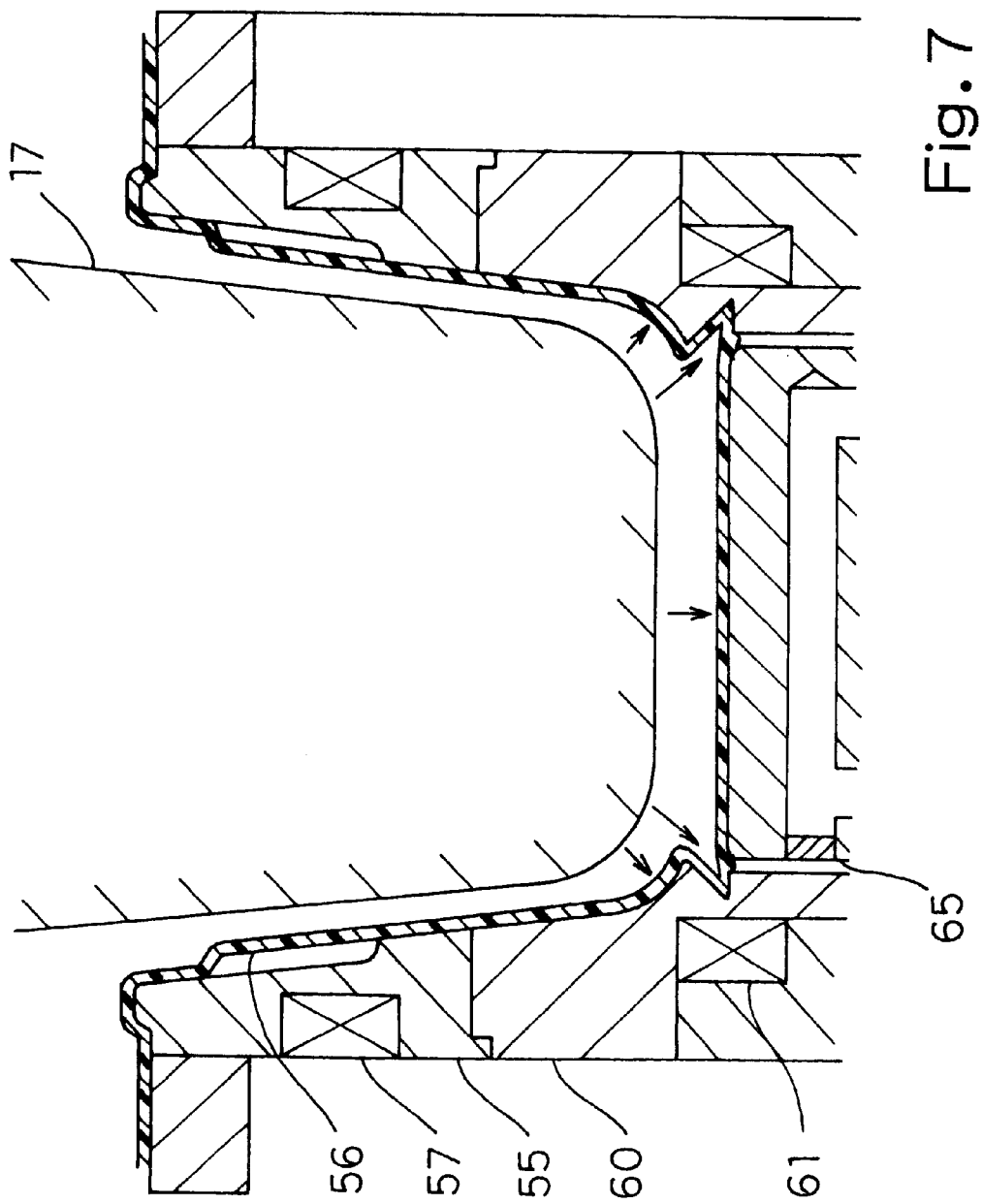
FIG. 7 is a schematic sectional view showing the state immediately after start of the forming by the thermoforming apparatus.
Figure 8:
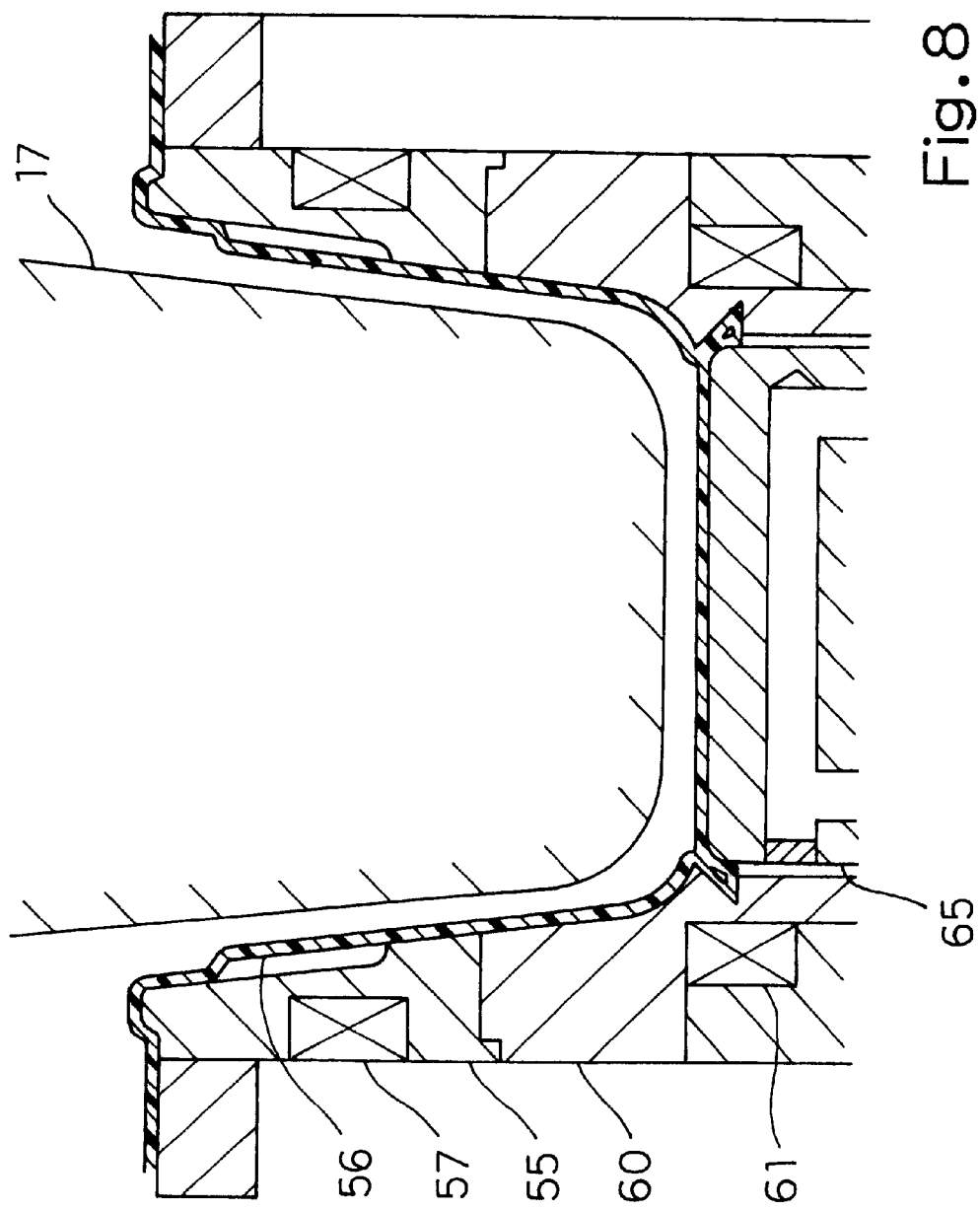
FIG. 8 is a schematic sectional view showing the state where the bottom plate of the thermoforming apparatus has been moved up.
Figure 9:
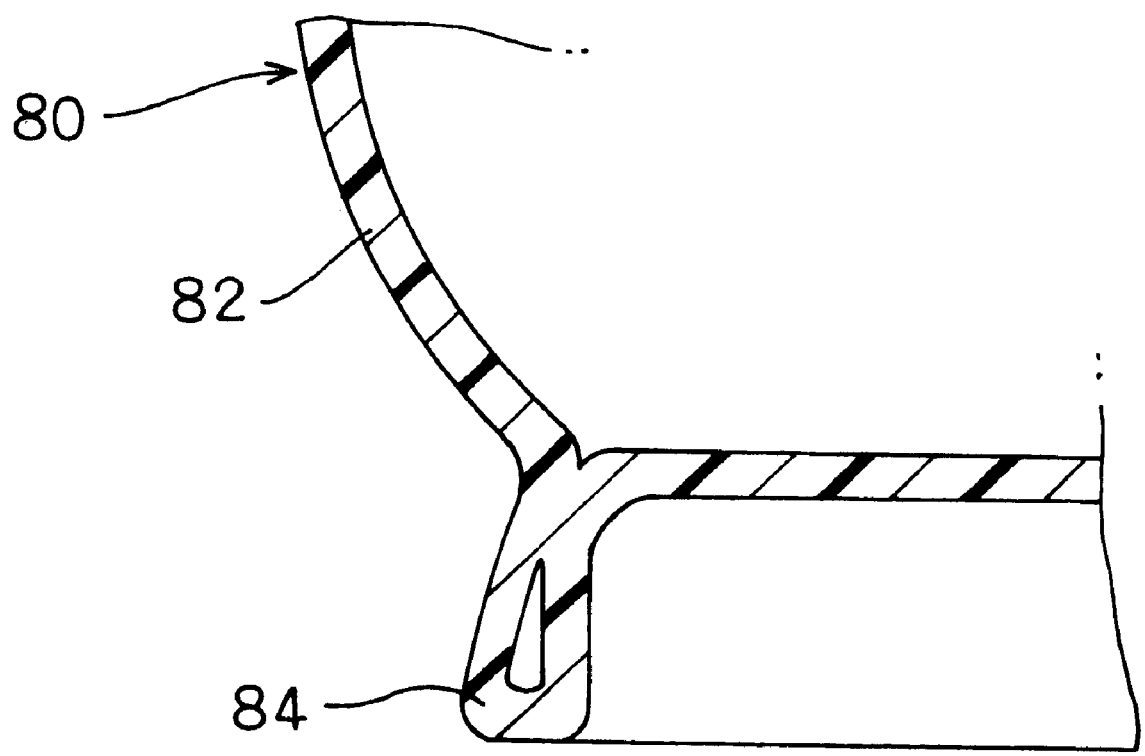
FIG. 9 is a sectional view of the rim in the state where the bottom plate has been moved up.

The plug 17 is pressed against the thermoplastic resin sheet so that the sheet is thrust into the female die 52 coming near to the plug. The thermoplastic resin sheet is held between the chamber 16 and the frame 53 and the die clamping is completed. Compressed air is then supplied into the chamber 16 at time T2. The pneumatic cylinder 67 is actuated at time T3 slightly after time T2 so that the bottom plate 65 is moved upward. FIGS. 6 to 8 show processes of deformation of the thermoplastic resin sheet in this while. As shown in FIGS. 6 and 7, when the chamber 16 is pressurized, the thermoplastic resin sheet expands toward the female die 52 to come close to the inner circumferential face of the female die. Since the temperature of the upper die 55 is relatively high in this state, the thermoplastic resin sheet in touch with the grooves 56 is not hardened immediately. On the other hand, although the temperature of the middle die 60 is lower than that of the upper die 55, the part of the thermoplastic resin sheet positioned in the rim forming recess maintains semi-melted state. The part of the thermoplastic resin sheet positioned on the top of the bottom plate 65 is hardened relatively early. When the bottom plate 65 is moved upward, this part of the sheet is raised as shown in FIG. 8 such that a portion of the sheet in contact with the rounded circumferential edge is pressed against a portion of the sheet in contact with the inclined face. Since this while is relatively short, these portions of the sheet opposed to each other are semi-melted and welded together such that gaps are eliminated. FIG. 9 shows the section of the rim 84 welded as described above. The position of the bottom plate 65 as shown in FIG. 8 is referred to as "second stop position," whereas the initial stand by position is referred to as "first stop position."

The compressed air in the chamber 16 is discharged into the atmosphere at time T4 with the bottom plate 65 remaining at the second stop position. Only the upper table 1 is moved upward at time T5. At this time, the primary forming is completed and the primary molding is held in the female die 52. When the rod 14a of the pneumatic cylinder 14 is then extended, the cooling male die 20 is moved to the position of the plug 17. The upper table 1 is moved downward again at time T7.

Figure 10:
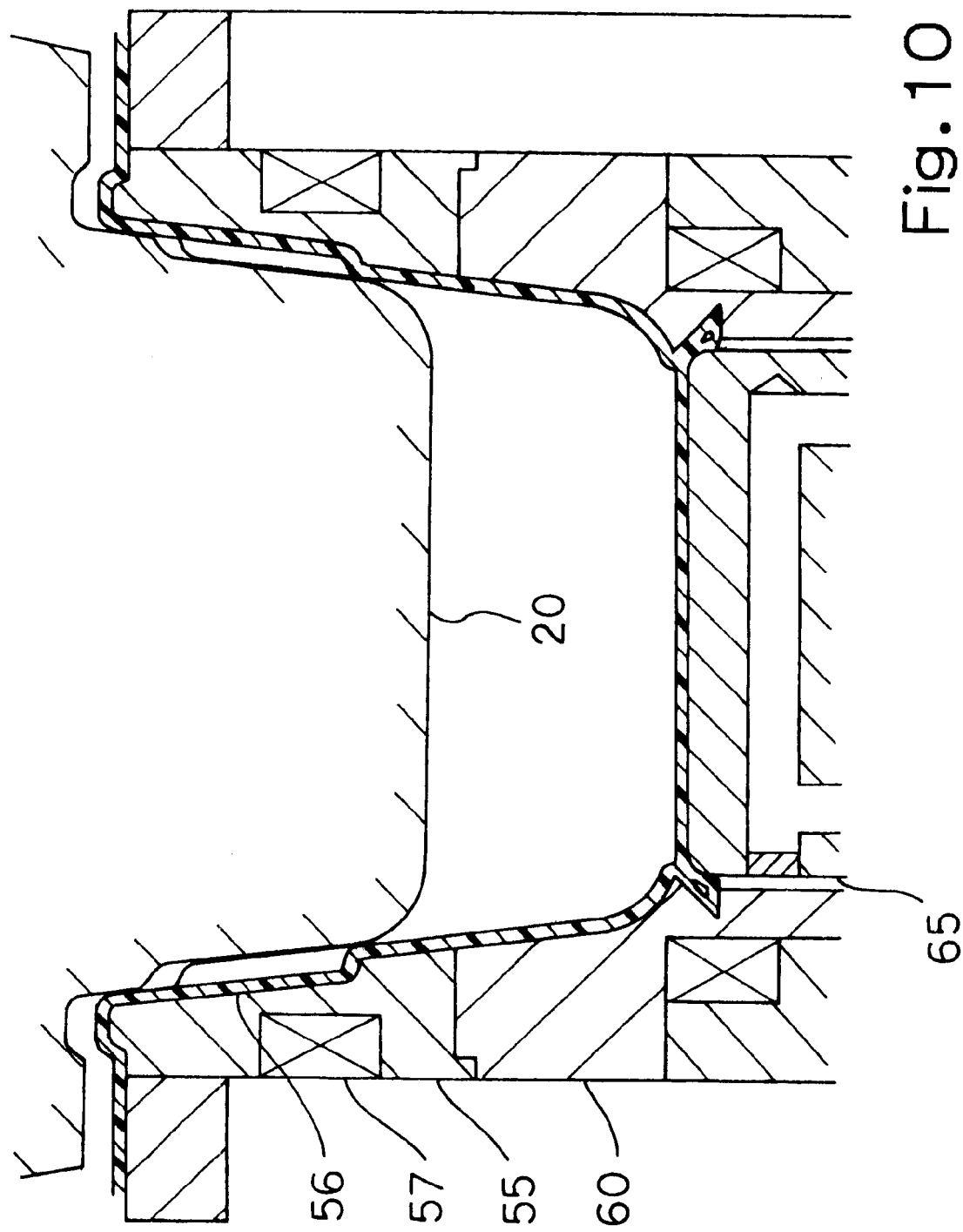
FIG. 10 is a partial sectional view of the thermoforming apparatus immediately after start of secondary forming.
Figure 11:
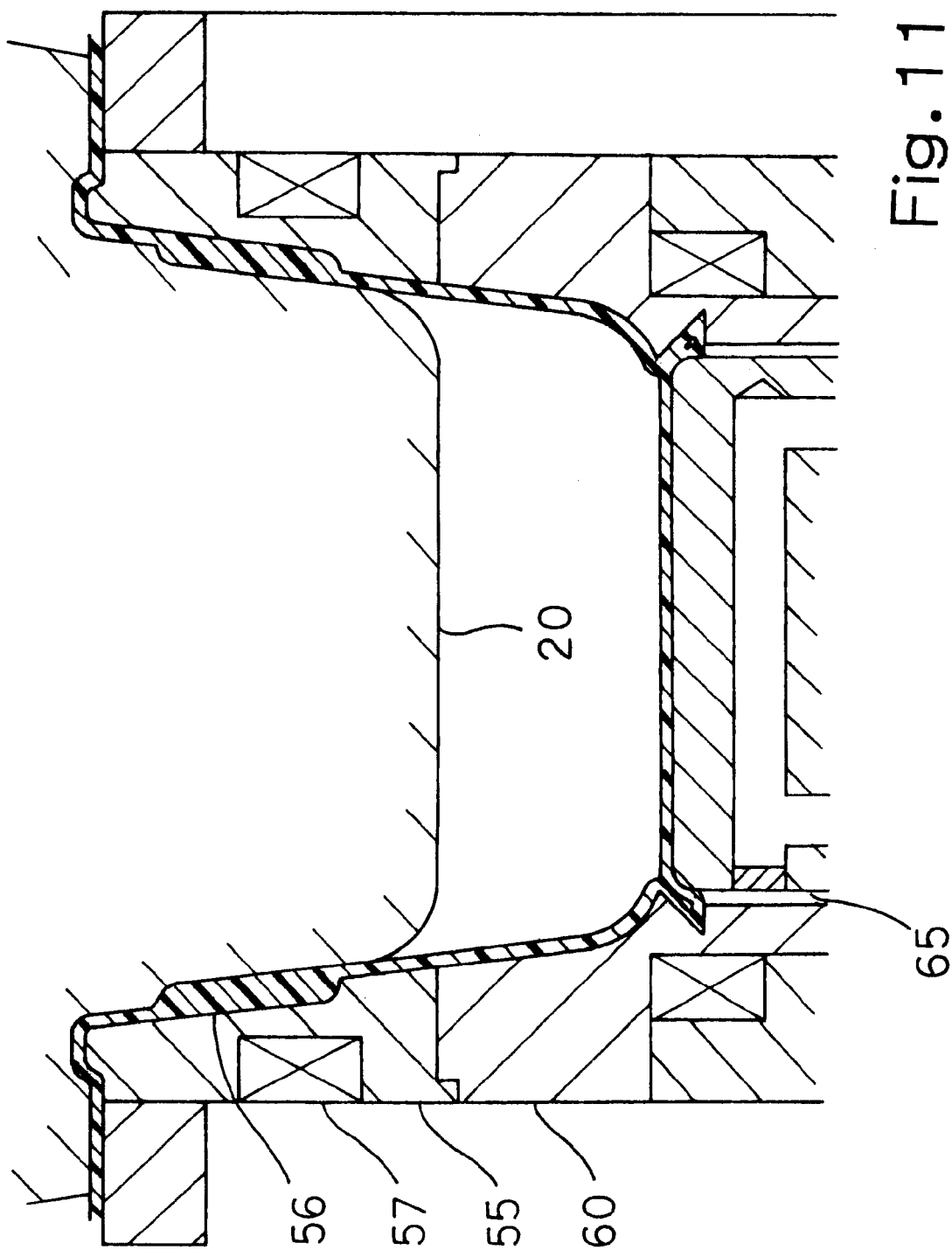
FIG. 11 is a partial sectional view o the thermoforming apparatus upon completion of the secondary forming.
Figure 12:
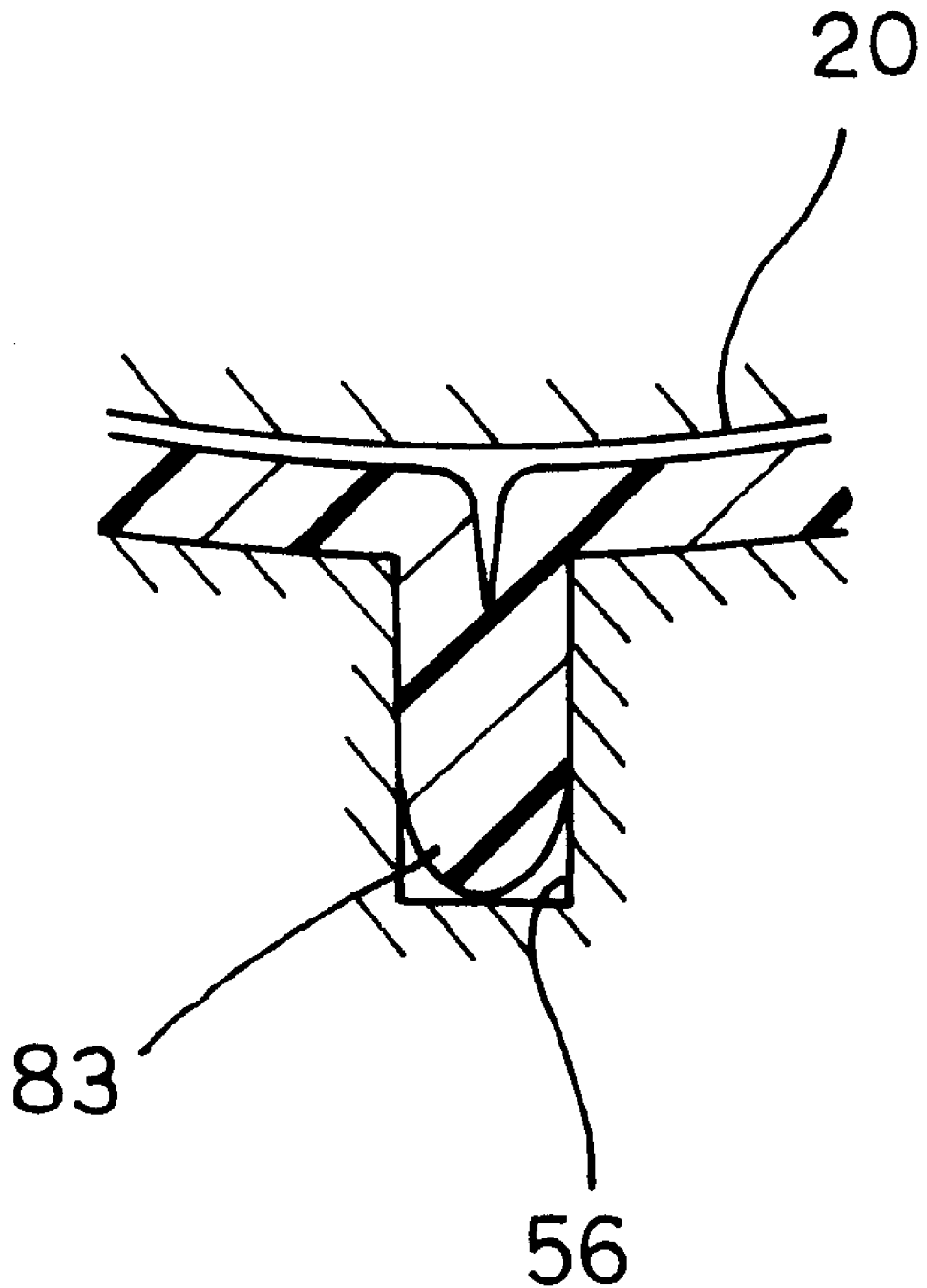
FIG. 12 is a sectional view of a rib immediately after start of secondary forming.
Figure 13:
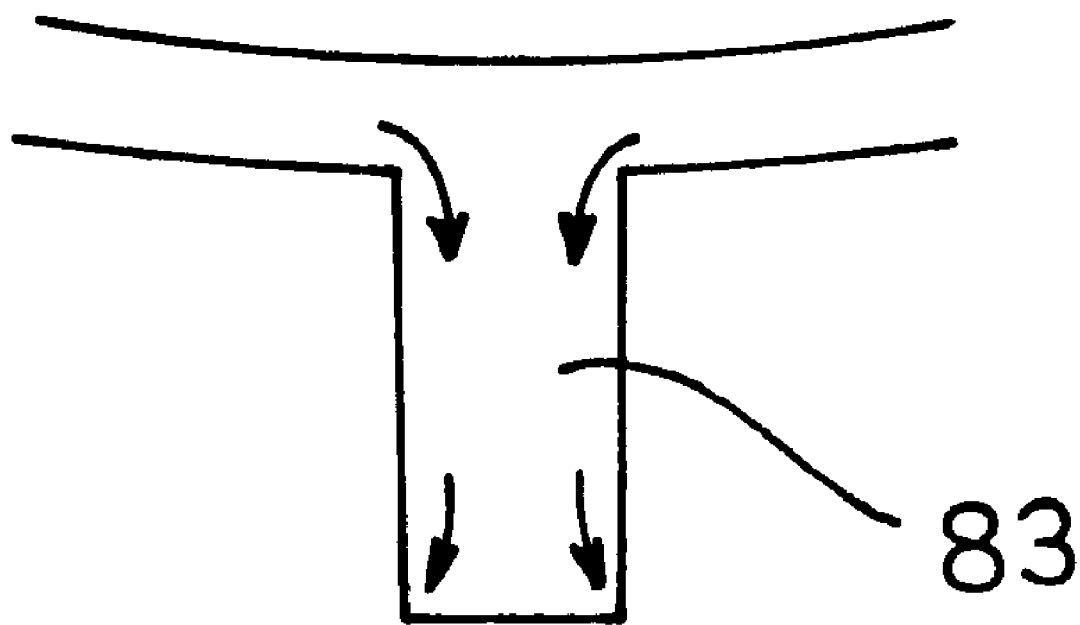
FIG. 13 typically shows a process in which the thermoplastic resin sheet flows in the secondary forming.
Figure 14:
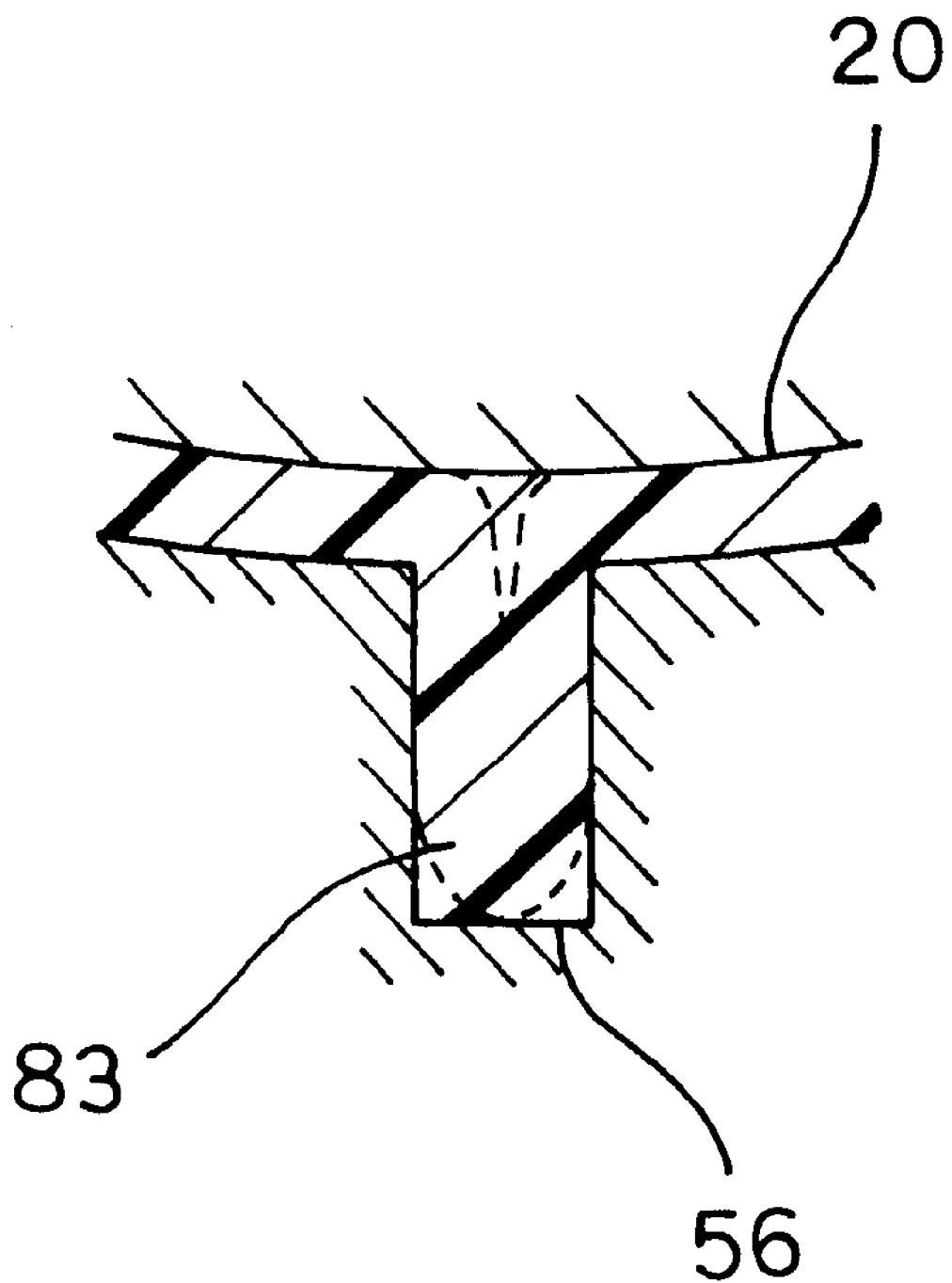
FIG. 14 is a sectional view of the rib upon completion of the secondary forming.

Upon descent of the upper table 1, the cooling male die 20 enters the female die 52. FIGS. 10 and 11 show final stages of the entrance of the male die 20 into the female die 52. The thermoplastic resin sheet S does not completely enter the grooves 56 when the compressed air is just supplied into the chamber 16. Even while the sheet S is being heated by the heater 57, it enters the grooves 56 to such an extent as shown in FIG. 12. However, when completely assuming the position in the female die 52, the cooling male die 20 presses the thermoplastic resin sheet against the female die 52 such that the unhardened sheet is thrust into the grooves 56 as shown in FIG. 13. Finally, no gaps are formed in the inner face of the container 80 as shown in FIG. 14. More specifically, the cooling male die 20 presses the primary molding against the inner circumferential face of the female die 52 so that the aforesaid ribs 83 and the upper body of the container 80 are formed. As a result, a secondary molding or finished product is formed.

Lastly, vacuum is applied to the hole 22 of the cooling male die 20 at time T8 so that the bottom plate 65 assuming the second stop position is moved downward to the first stop position at time T9. When the lower table 2 is moved downward with the hole 22 subjected to vacuum at time T10, the bowl-shaped container 80 adherent to the cooling male die 20 is exposed. Supply of vacuum is stopped at time T11 and compressed air is supplied at time T12. Then, the bowl-shaped container 80 made of the thermoplastic resin sheet S is removed from the cooling male die 20, and the upper table 1 is moved upward at time T13. Supply of compressed air is stopped at time T14.

The upper and lower tables 1 and 2 are departed away from each other with the remainder of the sheet S being left therebetween, and the rod 14a of the pneumatic cylinder 14 is contracted for the subsequent forming.

According to the foregoing embodiment, the thermoplastic resin sheet is expanded in the rim forming recess continuous with bottom opening of the female die 52. However, the bottom plate 65 is immediately moved upward toward the bottom opening so that the thermoplastic resin sheets are caused to come close to each other and welded together. Consequently, the rim of the container 80 has no openings. Further, when the thermoplastic resin sheet is expanded in the female die 52 to come into contact with the inner circumferential face of the die, the sheet enters the grooves 56. Further, when the cooling male die 20 is pushed into the main die instead of the plug 17, a part of the sheet outside the grooves 56 is pressurized to enter the grooves. Consequently, the openings formed in the inner circumferential face of the container 80 are closed while the ribs 83 is formed. Since the bowl-shaped container 80 has no openings in the rim and the inner circumferential face of each rib 83, it can easily be re-used when cleaned.

FIGS. 15 to 20 illustrate a second embodiment of the invention. In the second embodiment, a pneumatic forming plug 71 is provided instead of the integral plug 17. The plug 71 includes a head 71a and a body 71b discrete from each other. The rim forming recess of the female die 72 is not spread outward but cylindrical. The female die 72 includes another cylindrical portion which has a slightly reduced diameter and is continuous with the rim forming recess. A bottom plate 73 is in close contact with the cylindrical portion with a smaller diameter and supported to be vertically moved. The bottom plate 73 is moved by the pneumatic cylinder 14. The cooling male die 20 and the switching cylinder 14 are eliminated in the second embodiment.

The head 71a and the body 71b of the plug 71 are discrete from each other for the following reason. The rim forming recess has a depth approximately equal to the length of the rim. An outer wall of the rim is formed by a first portion of the sheet corresponding to the rim, and an inner wall of the rim is formed by the subsequent portion of the sheet corresponding to the rim. The sheet is folded when the bottom plate 73 is moved upward, so that the inner wall is formed. Since the rim forming recess is deep, compressed air needs to be supplied so that the sheet is extended deep into the rim when the plug 71 enters the bowl-shaped recess of the female die 72. As a result, a thickness providing a predetermined strength cannot be obtained. On the other hand, when the distal end of the plug 71 is caused to enter the inside of the rim forming recess, the problem of thickness can be solved. However, the bottom plate 73 interferes with the plug 71 when moved upward.

Figure 15:
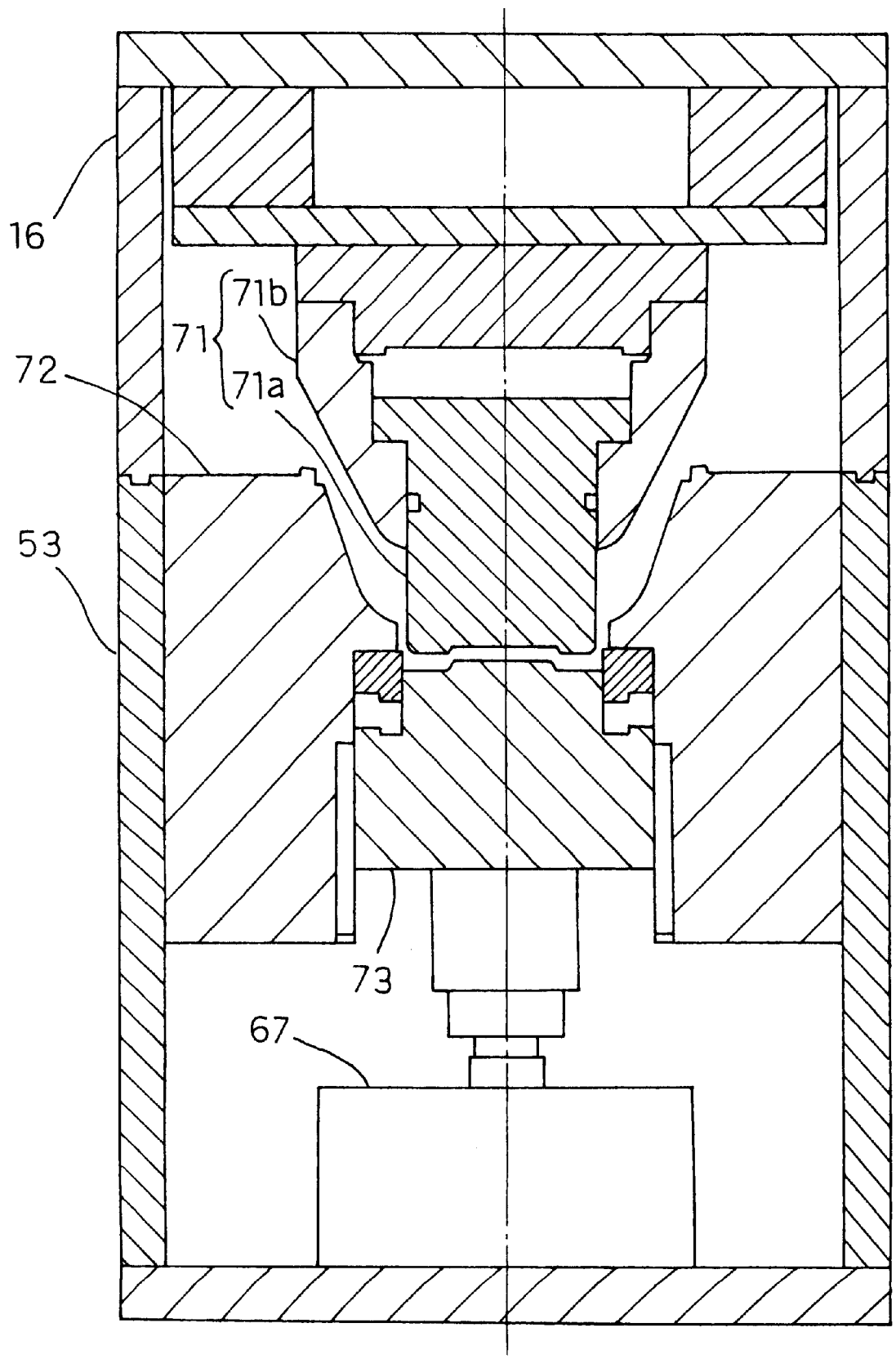
FIG. 15 is a sectional view of the thermoforming apparatus of a second embodiment in accordance with the invention, showing the state where the bottom plate assumes a lowest position.
Figure 16:
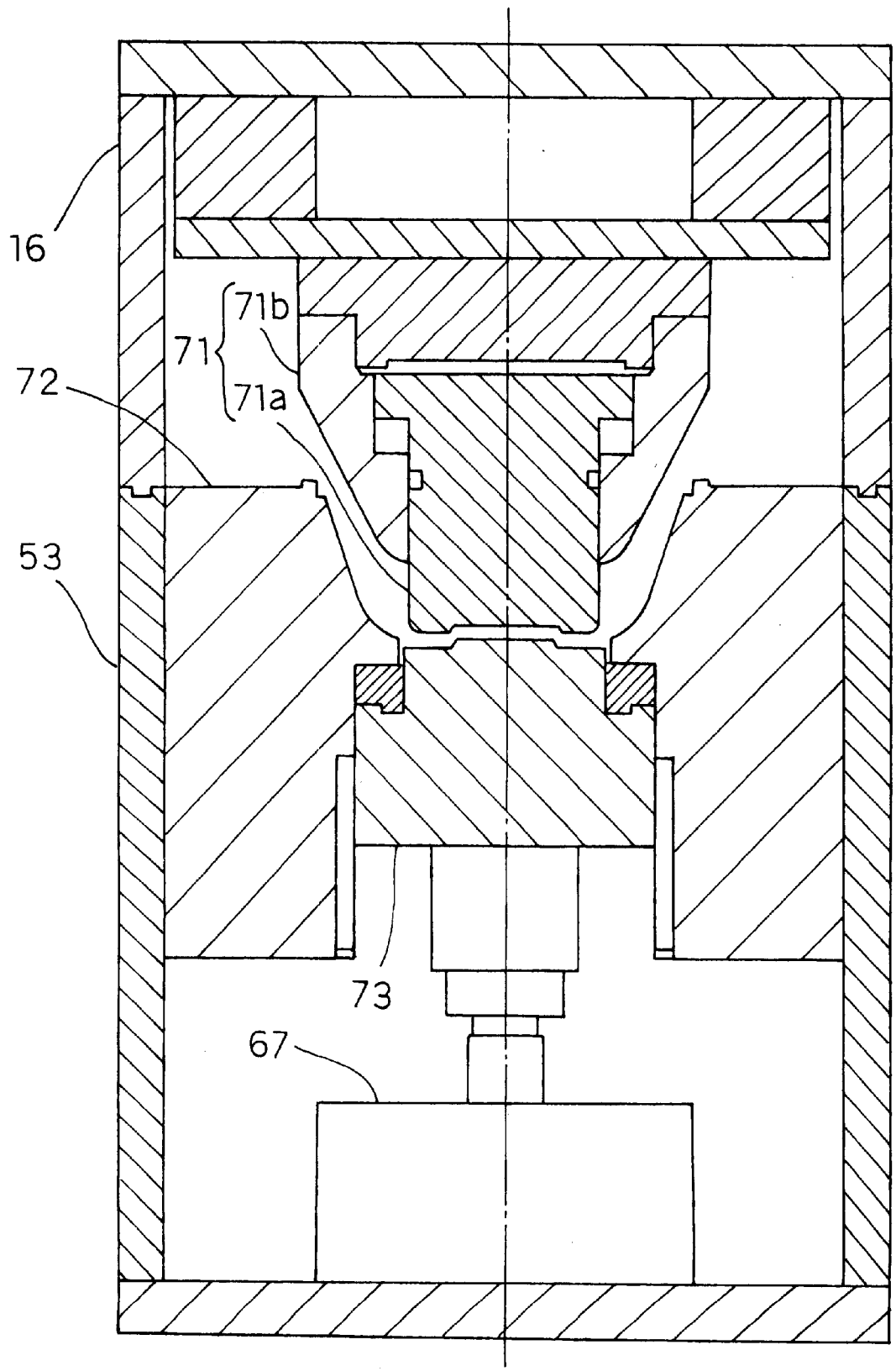
FIG. 16 is a sectional view of the thermoforming apparatus in the state where the bottom plate has been moved up.

In view of the above-described drawback, the head 71a and the body 71b are discrete from each other. As a result, when the bottom plate 73 is moved downward to the first stop position, the head 71a of the plug 71 enters the rim forming recess as shown in FIG. 15. However, the head 71a and the body 71b are discrete from each other so that the head 71a is retreated from the rim forming recess into the female die 72 when the bottom plate 73 is moved upward to the second stop position. The interior of the body 71b is compressed and decompressed so that the head 71a projects and is retreated.

Figure 17:
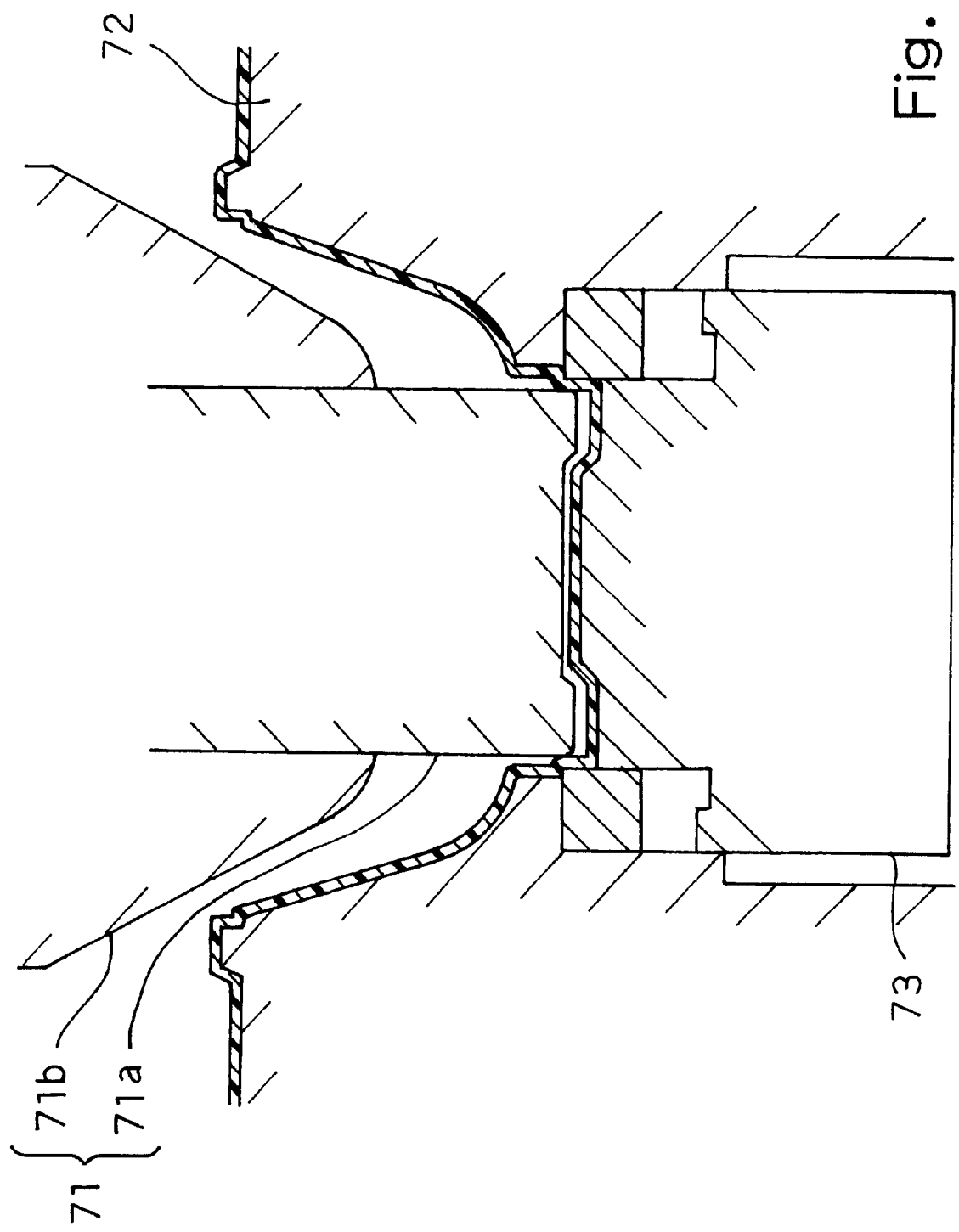
FIG. 17 is a sectional view of the thermoforming apparatus immediately after start of forming.
Figure 18:
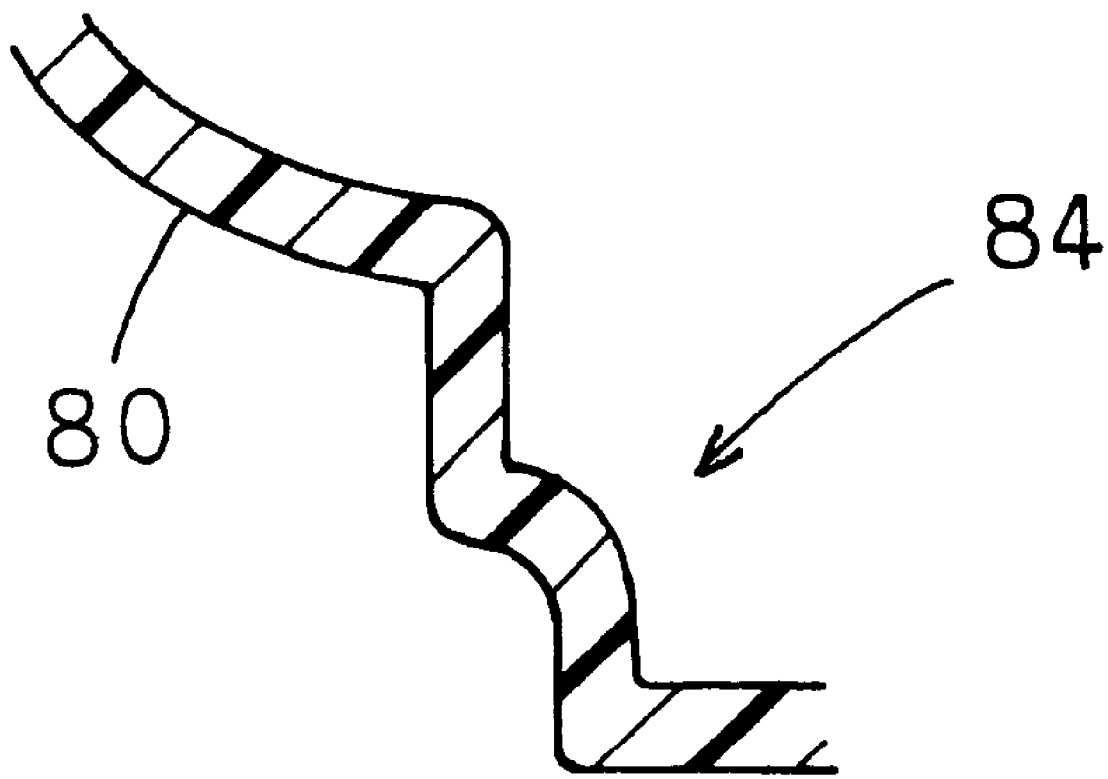
FIG. 18 is a sectional view of the rim immediately after start of forming.

At the initial stage of the forming, the head 71a is caused to project and the upper and lower tables 1 and 2 are moved downward and upward respectively with the thermoplastic resin sheet disposed therebetween. The distal end of the head 71a of the plug 71 extends the thermoplastic resin sheet to the inside of the rim forming recess. When compressed air is supplied into the chamber 16 upon completion of die clamping by the chamber and the frame 53, the thermoplastic resin sheet comes into close contact with the inner circumferential face of the female die 72 as shown in FIG. 17. The female die 72 is provided with no heater. Accordingly, the part of the sheet in close contact with the inner circumferential face of the female die 52 starts to harden earlier than in the foregoing embodiment.

On the other hand, vacuum is applied to the inside of the plug 71 immediately after supply of compressed air into the chamber 16 so that the head 71a is retreated, and compressed air is supplied into the pneumatic cylinder 67 so that the bottom plate 73 is moved upward. When the thermoplastic resin sheet is expanded, the rim portion extends downward in two stages. Thus, the rim portion does not assume an ordinary configuration of the rim. However, outer circumferential faces of the two stage portions is in close contact with the female die 72 such that the hardening has already been initiated.

Figure 19:
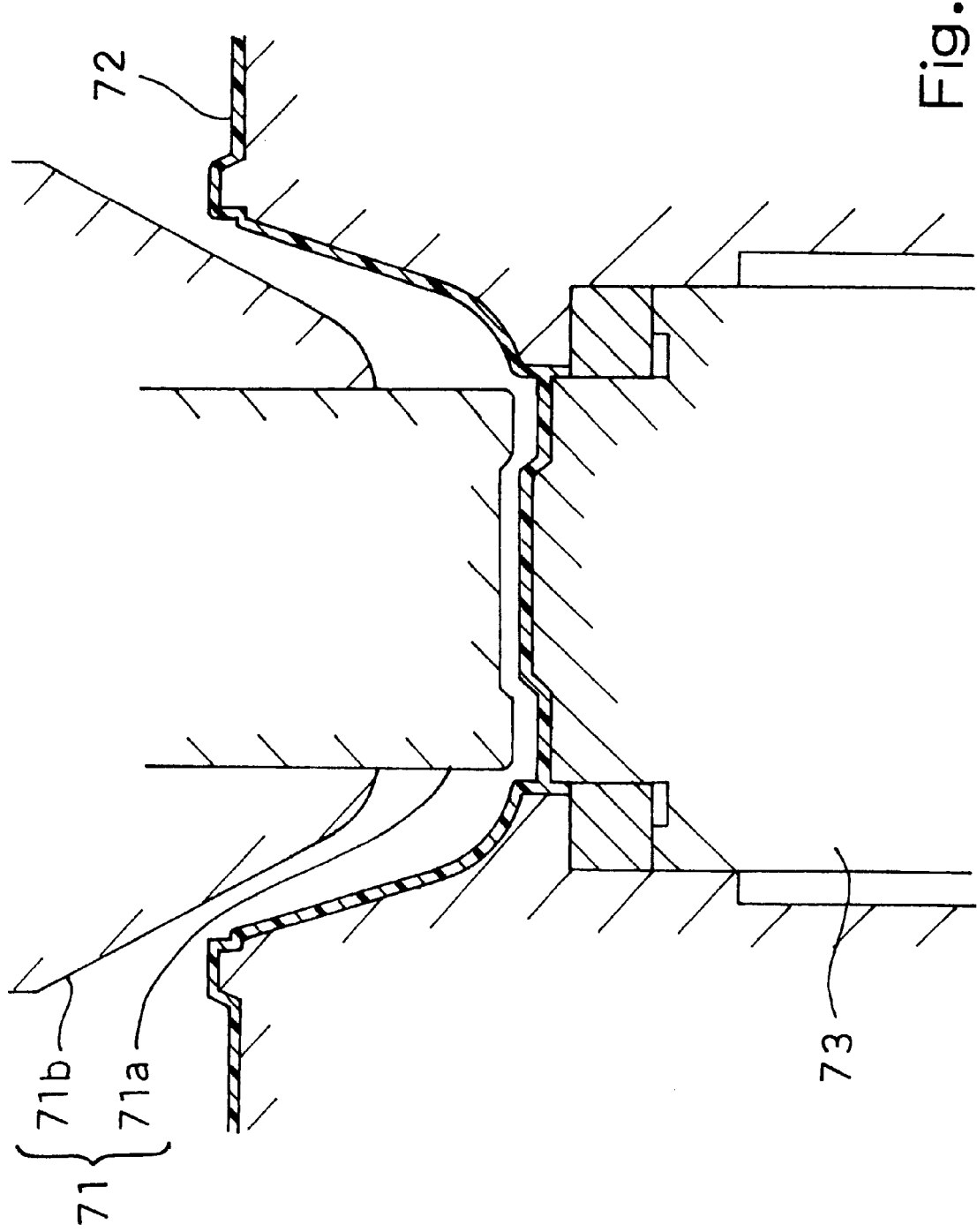
FIG. 19 is a sectional view of the thermoforming apparatus in the state where the bottom plate has been moved up.
Figure 20:
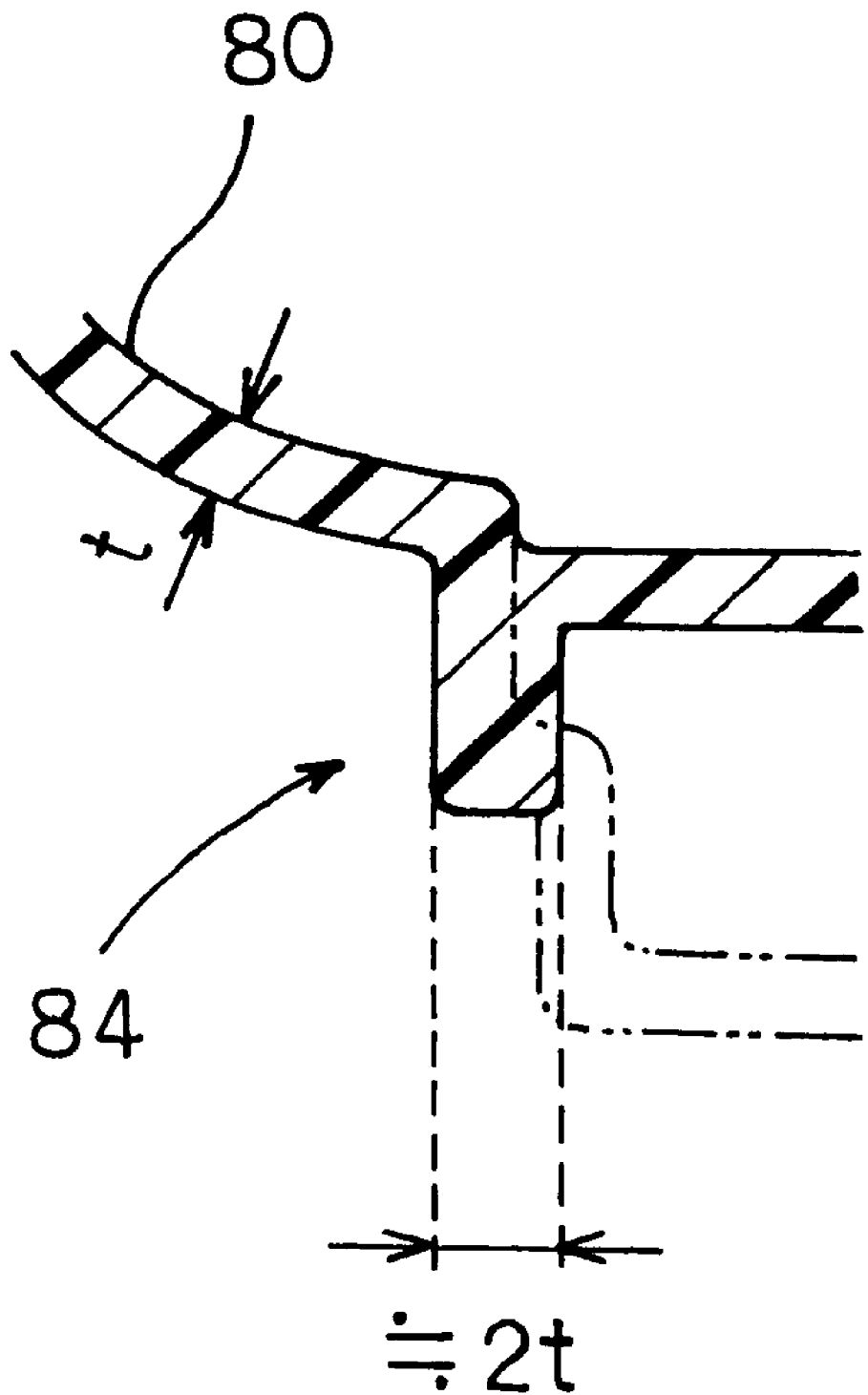
FIG. 20 is a sectional view of the rim in the state where the bottom plate has been moved up.
Figure 21:
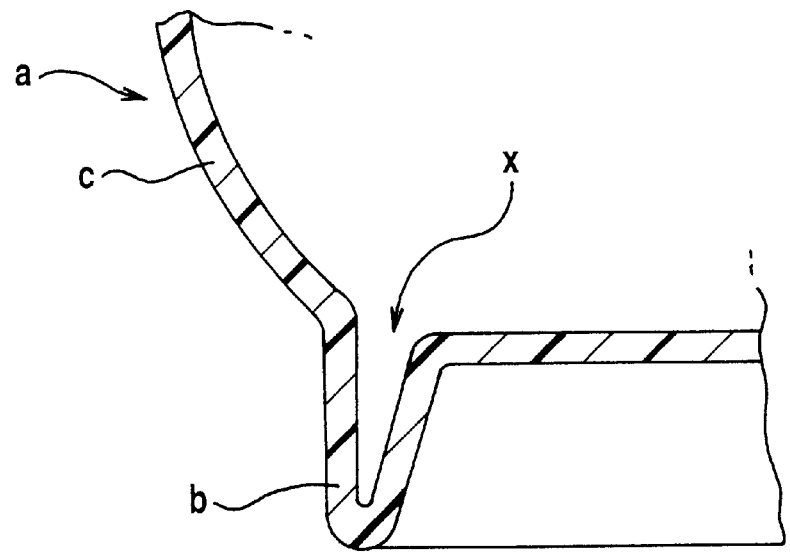
FIG. 21 is a schematic sectional view of a rim of a conventional bowl-shaped container.
Figure 22:
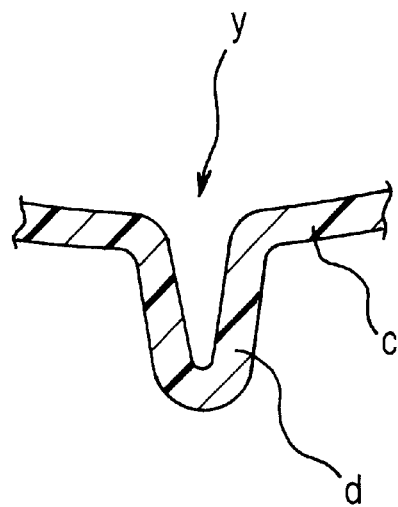
FIG. 22 is a schematic sectional view of a rib of the conventional bowl-shaped container.

However, when the bottom plate 73 is moved upward immediately as shown in FIG. 19, the portion in contact with the inner face of the reduced-diameter portion of the rim forming recess is folded back. The sides which have not been in contact with the female die 72 are caused to come close to each other. Since these sides are semi-melted, they are welded together when coming close to each other. Since the portion in contact with the female die 72 has already been hardened, this portion forms the outer and inner circumferential walls of the rim without getting out of shape. FIG. 20 shows the folded sheet.

The sheet needs to be pressed so that the inner circumferential sides are welded together. For this purpose, the thickness of the reduced-diameter portion of the rim forming recess needs to be slightly smaller than a double (2t) of the thickness t of the thermoplastic resin sheet. More specifically, in a case where the thickness of the reduced-diameter portion is equal to or larger than the double of the thickness t, the inner sides do not come close to each other even when the sheet is folded back. In this case, the sheet is hardened with gaps. On the other hand, the thickness of the reduced-diameter portion is much smaller than the double of the thickness t, the sheet cannot be folded back desirably, whereupon the whole rim would be moved into the female die 72 when the bottom plate 73 is moved upward. In view of the foregoing, the two-stage configuration of the rim forming recess needs to be adjusted.

In the above-described bowl-shaped container, the rim is formed by superposing two thermoplastic resin sheets. Consequently, the strength of the container can be improved and its utility can be improved. Further, since a sufficient thickness increases the profoundness and grade of the container, the container has a good quality.

FIGS. 23 to 35 illustrate a third embodiment of the invention. The thermoforming apparatus will first be described. The thermoforming apparatus comprises an upper base plate 111 and a lower base plate 131 fixed to the upper and lower tables (not shown) so as to be vertically moved at a predetermined stroke by driving units M101 and M102, respectively. A cavity base 112 is fixed to the upper base plate by bolts so as to be spaced from the latter. A cavity holder 113 is fixed to the cavity base 112 by bolts. Further, a plurality of main cavity 121 is attached to the cavity holder 113.

Figure 26:
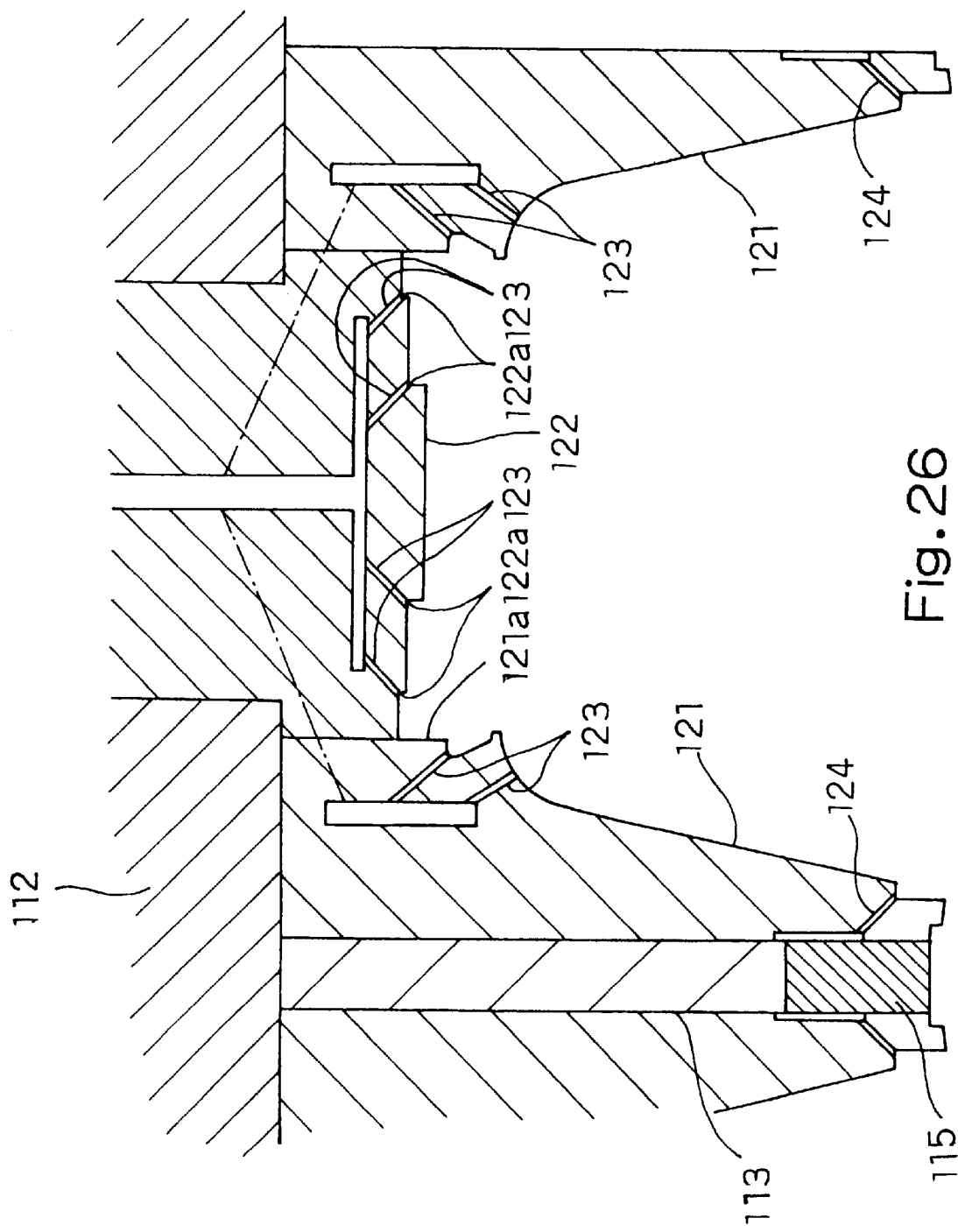
FIG. 26 is an enlarged sectional view of a cooling male die used in the thermoforming apparatus.

The thermoforming female die 120 includes the main cavity 121 and the bottom plate 122 as shown in FIG. 26. The main cavity 121 is formed generally into a bowl-shaped recess and has a bottom with a through hole 121a. The generally cylindrical bottom plate 122 is vertically movably supported so as to close the hole 121a.

Regarding the shape of the bowl, an open edge is continuous through a circumferential wall surface to a bottom wall surface. The hole 121a is formed in the bottom wall. The diameter of the hole 121a is first reduced and then spread inward. The diameter of the hole 121a is thereafter reduced again to be the same as the first one. The diameter of the hole 121a is thereafter constant. The spreading portion corresponds to a portion forming an outer configuration of a rim formed on the bottom of the bowl. An undercut is formed in this portion relative to a direction in which the die is removed.

Figure 24:
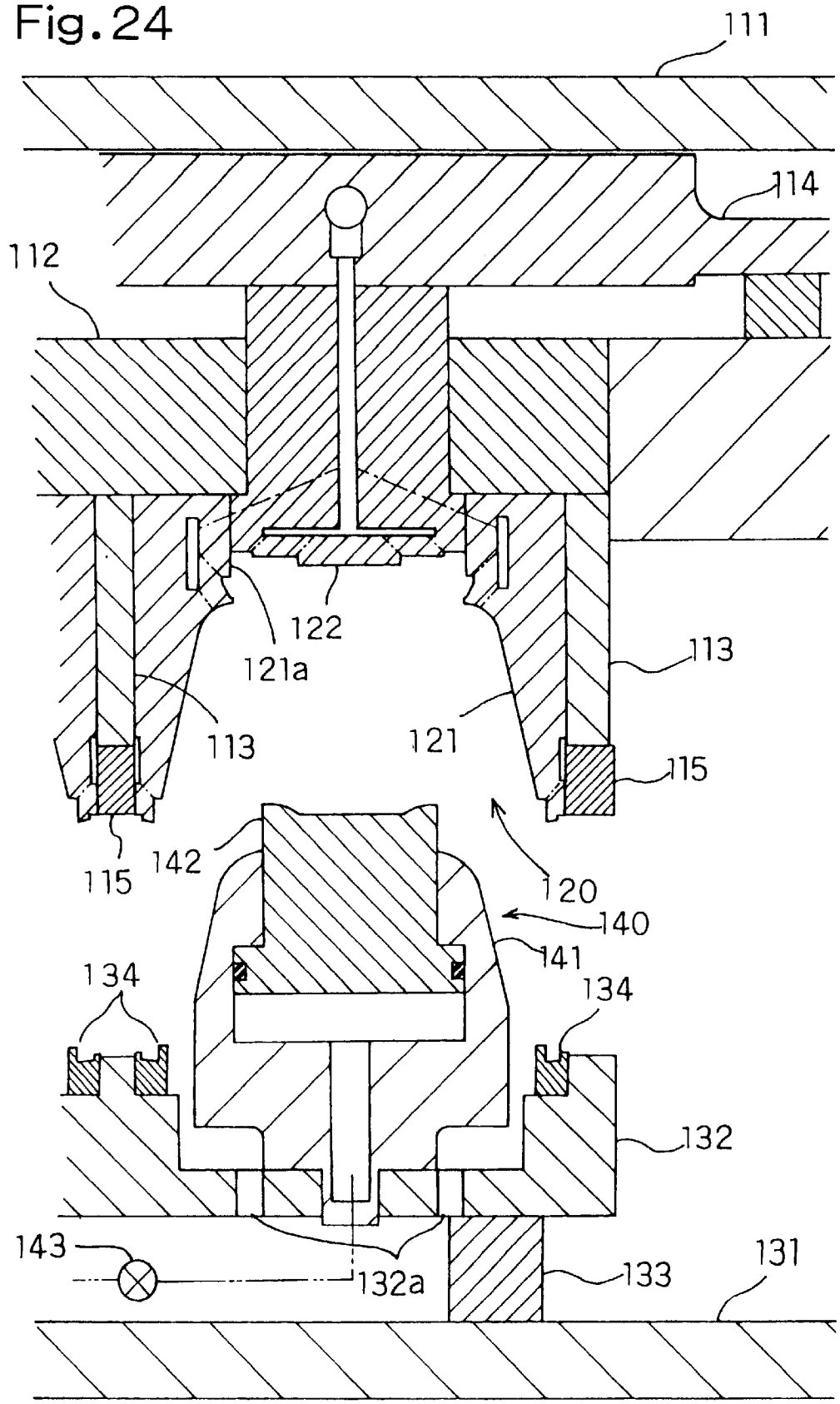
FIG. 24 is a partial sectional view of the thermoforming apparatus to which the thermoforming plug is applied.
Figure 25:
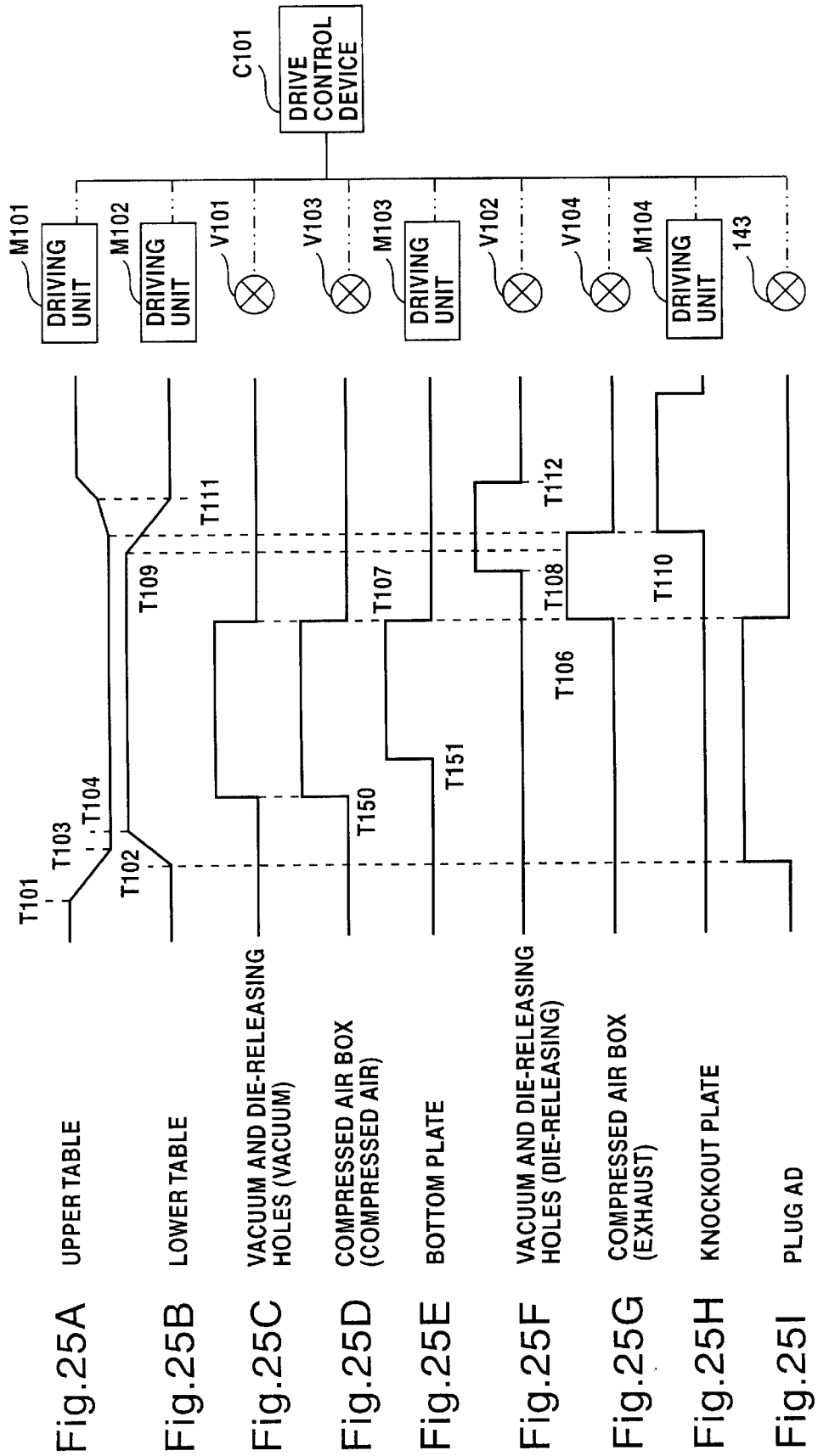
FIGS. 25A to 25I are timing charts showing the operation sequence of the thermoforming apparatus.

The bottom plate 122 forms the bottom of the aforesaid recess. The bottom has concentric two-stage stepped portions 122a. The outer configuration of the bottom plate 122 agrees substantially with that of the constant diameter portion of the hole 121a. The hole 121a has a diameter of an open end thereof slightly smaller than the constant diameter portion. The bottom plate 122 extends through the cavity base 112 and is supported on a bottom plate base 114 held between the cavity base 112 and the upper base plate 111. The bottom plate base 114 is vertically moved at a predetermined stroke by a driving unit M103. The stroke is equal to a distance by which the bottom face of the bottom plate 122 reciprocates from a position retreated from an upper end of the rim by a height of the rim to a lower end of the rim as shown in FIG. 24.

A large number of vacuum and die-releasing holes 123 are provided in the inner circumferential surface of the female die 120. The holes 123 are concentrated particularly on the bowl bottom where the aforesaid undercut is formed. The holes 123 are formed in a portion continuous from the circumferential wall surface to the bowl bottom, a portion of outermost circumferential end of the rim, and the two-stage stepped portions 122a. The number and the locations of the holes 123 are determined on such a condition that the bowl bottom of the molding can be flexed inward when compressed air is supplied through the holes 123 as will be described later, in addition to a minimum condition that the sheet is brought into close contact along the inner circumferential shape of the bowl die.

The vacuum and die-releasing holes 123 communicate via a hollow passage provided in the bottom plate 122, a hollow passage provided in the bottom plate base 114, and control valves V101 and V102 with an external pressure controlling mechanism. The pressure controlling mechanism supplies negative pressure and compressed air as shown in FIGS. 25A to 25I. An indication, "VACUUM AND DIE-RELEASING HOLES (VACUUM) designates a timing for supply of negative pressure to the vacuum and die-releasing holes 123. An indication, "VACUUM AND DIE-RELEASING HOLES (DIE-RELEASING)," designates a timing for supply of die-releasing compressed air.

No vacuum and die-releasing holes 123 are formed in the open end of the main cavity 121. Instead, a hole communicating with the atmosphere is formed in a recess conforming to the open end. Accordingly, even when pressure is applied from the plug side during the forming, no air bubble is formed between the molding and the main cavity 121.

A knockout plate 115 is disposed at the lower base plate 131 side on the cavity holder 113 and is moved to and from the die by a predetermined stroke by a driving unit M104 during die-releasing. A plug base 132 is fixed by bolts (not shown) to the lower base plate 131 with a spacer 133 interposed therebetween, thereby forming a closed compressed air box. A plug 140 is fixed to the plug base 132 by bolts (not shown) so as to be opposed to the main cavity 121. The plug 140 has a communicating hole 132$a$ formed around a bedded portion thereof.

Figure 23:
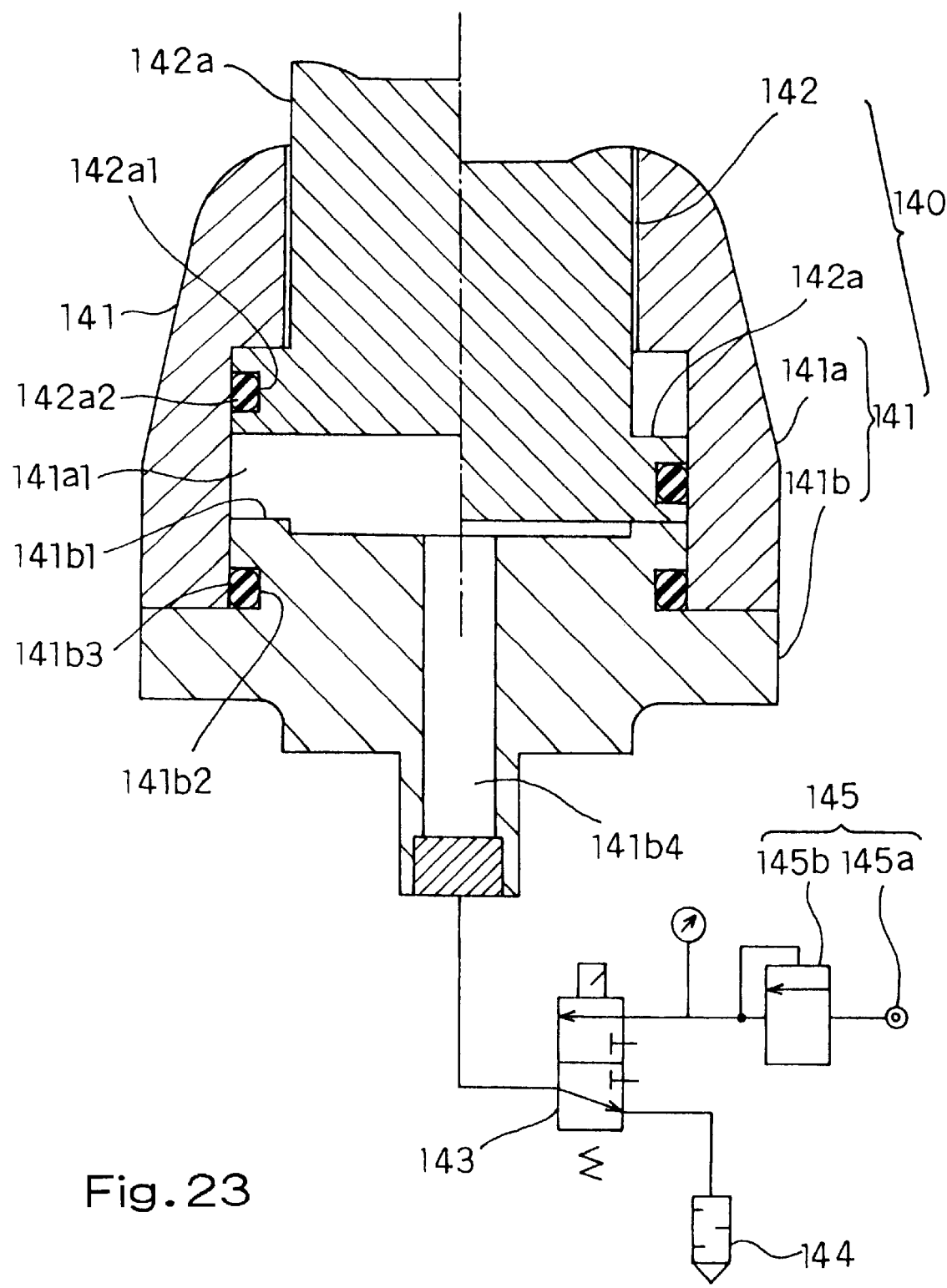
FIG. 23 is a schematic sectional view of a thermoforming plug in a third embodiment in accordance with the invention.

A generally upper half portion of the plug 140 is inserted into the thermoforming female die 120 in the die-closing. The plug 140 is formed into the shape of a mushroom and symmetrical about a vertical axis. FIG. 23 shows the sectional structure of the plug 140. The plug 140 comprises a plug body 141 serving as an outer frame and a sub plug 142 enclosed and supported in the plug body. The plug body 141 has an open top and a hollow interior 141$a$1 in which the sub plug 142 is accommodated. The plug body 141 comprises an upper plug body 141$a$ and a lower plug body 141$b$. The hollow interior 141$a$1 is cylindrical, and an upper portion thereof has a smaller diameter than a lower portion thereof. Accordingly, the sub plug 142 has an upper portion corresponding to the upper portion of the hollow interior 141$a$1 and a flange 142$a$ corresponding to the lower portion of the hollow interior 141$a$1. The flange 142$a$ has a circumferentially continuous annular groove 142$a$1 formed in an outer circumference thereof. A sealing O-ring 142$a$2 is provided in the groove 142$a$1. Accordingly, the plug body 141 serves as a cylinder and the sub plug 142 serves as a piston. Thus, the plug body 141 and sub plug 142 are constructed into a piston cylinder structure.

The upper plug body 141$a$ is cylindrical and has a lower end opening closed by the lower plug body 141$b$. The lower plug body 141$b$ has on the top thereof a short cylindrical convex portion 141$b$1 having such a diameter that the portion is allowed to enter the lower end opening of the upper plug body 141$a$. The lower plug body 141$b$ further has an annular groove 141$b$2 formed in an outer circumference thereof. An O-ring 141$b$3 is provided in the groove 141$b$2. The convex portion 141$b$1 is inserted into the upper plug body 141$a$ from below the upper plug body 141$a$, and the lower plug body 141$b$ is fixed by bolts (not shown) to the upper plug body 141$a$. The O-ring 142$a$2 of the sub plug 142 seals the upper side of the hollow interior 141$a$1, whereas the O-ring 141$b$3 of the convex portion 141$b$1 seals the lower side of the hollow interior 141$a$1, whereupon an airtight area is defined. The airtight area is connected via a preliminary chamber 141$b$4 communicating with the hollow interior 141$a$1 and a predetermined air passage to a plug AD143 which is an electromagnetic switching valve. The plug AD143 is connected to a silencer 144 or a predetermined pressure supply 145. This communication passage will be eliminated in the following description and the drawings.

The pressure supply 145 is connected via a pressure adjusting valve 145$b$ to a compressed air supply 145$a$ so that compressed air with set pressure can be supplied. When the airtight area is connected by the plug AD143 to the pressure supply 145, compressed air is supplied into the airtight area. When the airtight area is connected by the plug AD143 to the silencer 144, the compressed air in the airtight area is discharged to the atmosphere. Further, air discharge is carried out when the sub plug 142 is accommodated in the hollow interior 141$a$1. The airtight area is connected to the predetermined pressure supply 145 in order that the pressure therein is independently adjusted. FIG. 23 shows two states of the sub plug 142, that is, an uppermost projecting state in the left half and a lowermost located state in the right half, whereby a moving range of the sub plug 142 can be understood. The construction of the plug 140 is simplified in FIG. 24 and subsequent figures.

Referring to FIG. 24, a seal plate 134 formed with a through hole is disposed to surround the plug 140 so that the seal plate is opposed to the open end of the main cavity 121. When the upper and lower base plates 111 and 131 are in the vicinity of each other, the thermoplastic resin plate is held between the seal plate 134 and the main cavity 121, and a closed space communicating with the compressed air box is formed. The compressed air box is connected via control valves V103 and V104 to the pressure controlling mechanism. The pressure controlling mechanism carries out the control as shown in FIGS. 25A to 25I so that compressed air is supplied and discharged. The aforesaid driving units M101 to M104, control valves V101 to V104 and plug AD 143 are controlled by the drive control device C101 comprising a sequencer.

The operation of the thermoforming apparatus will be described with reference to FIGS. 25A to 25I. A heater and a feeder are provided in the previous stage of the thermoforming apparatus. Since they are well known in the art, the description of them will be eliminated. First, the upper table starts to move downward at time T101 and accordingly, the upper base plate 111 and the female die 120 fixed to the upper table also move downward. The descent of the upper table finishes at time T103. The lower table starts to move upward at time T102 which is earlier than time T103. After completion of descent of the upper table, the lower table finishes ascent at time T104 which is slightly later than the time of completion of descent of the upper table. When the lower table starts ascent, the plug AD 143 is switched to the constant pressure supply 145 so that the compressed air with the predetermined pressure is supplied to the airtight area. Since air around the plug 140 communicates with the atmosphere, an inner pressure of the airtight area is higher and accordingly, the sub plug 142 projects out of the hollow interior due to atmospheric pressure difference.

Figure 27:
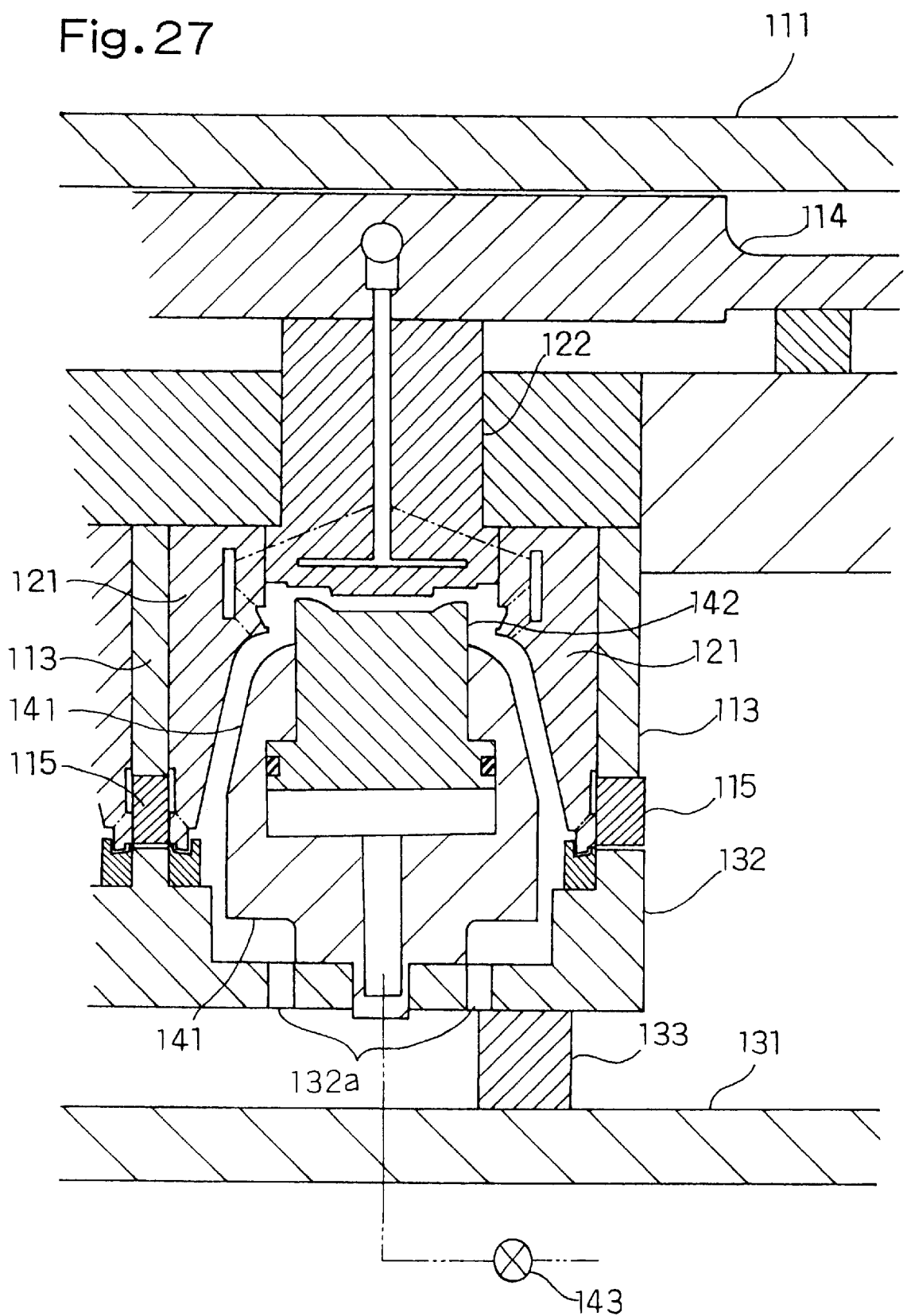
FIG. 27 is a partial sectional view of the thermoforming apparatus in the closed state.
Figure 28:
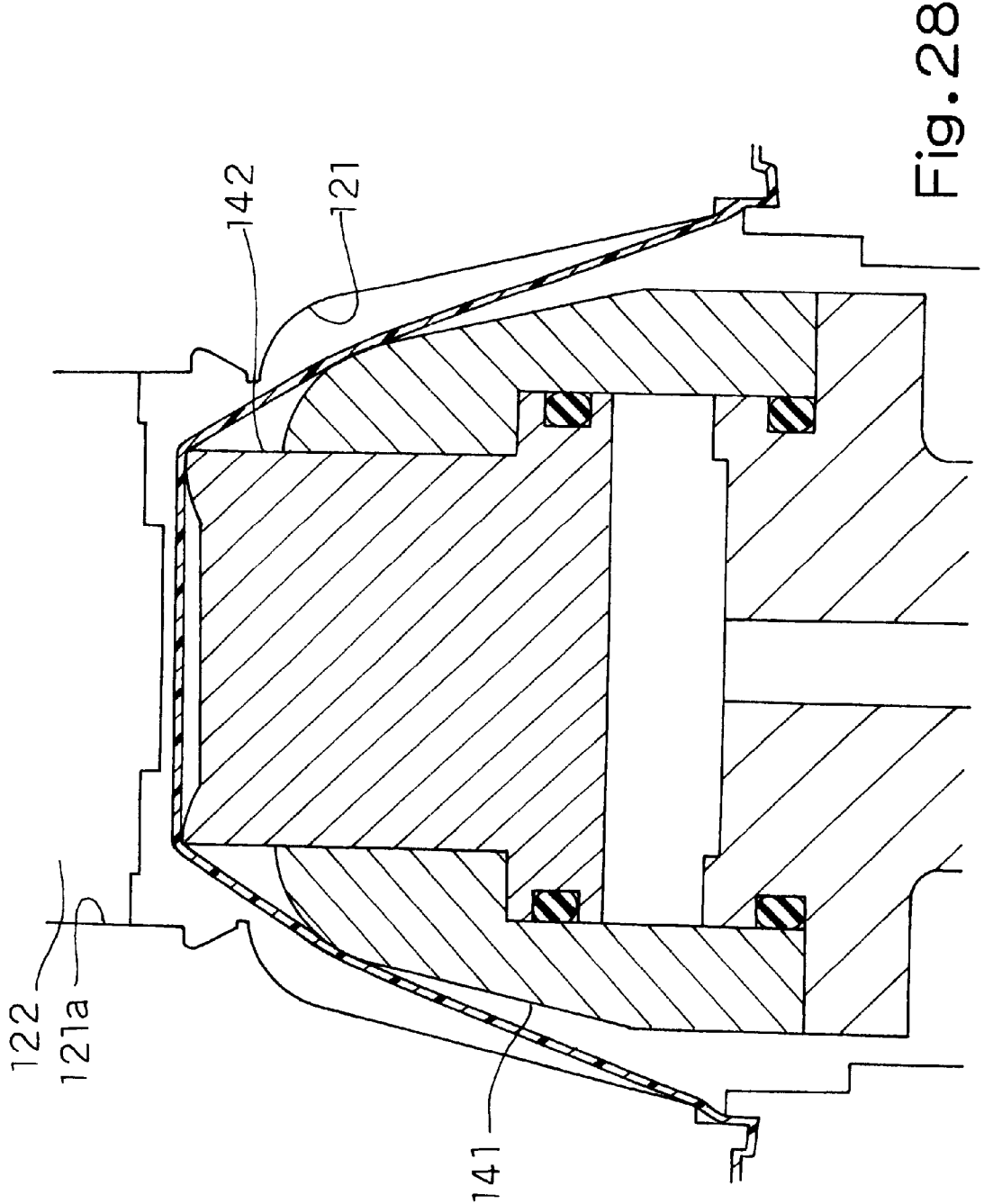
FIG. 28 is a sectional view showing the positional relationship between the thermoplastic resin plate and the plug immediately after the closing of the die.

FIG. 27 shows the closed state of the die at time T104. The thermoplastic resin plate is eliminated in FIG. 27. At this time, the bottom plate 122 is located inside the main cavity 121 (an ascended position). The thermoplastic resin plate is held between the open end of the main cavity 121 and the seal plate 134 as shown in FIG. 28. A central portion of the thermoplastic resin plate is extended by the plug 140 toward the inside of the main cavity 121. Since the bottom plate 122 is located inside the main cavity 121, the bottom plate assumes a position inward relative to the bowl bottom of the bowl-shaped recess, forming a cavity. However, since the sub plug 142 projects from the plug body 141, the sub plug enters the cavity. Of course, thermoplastic resin plate is extended to the top of the sub plug 142 and is near to the backside of the bottom plate 122.

The compressed air is supplied from the compressed air box at time T150 and simultaneously, negative pressure is supplied to the vacuum and die-releasing holes. The thermoplastic resin plate is pushed from the plug 140 side into the main cavity 121, sucked to the vacuum and die-releasing holes 123 such that a fine shape inside the inner circumferential surface of the female die is reliably formed. Further, a stepped portion is formed on a portion of the main cavity 121 near the opening. The vacuum and die-releasing holes are concentrated on the bowl bottom and are not formed in the stepped portion. The hole 124 communicating with the atmosphere is formed in the stepped portion, instead. In a case where the thermoplastic resin plate is pushed against the stepped portion when compressed air is supplied from the plug 140 side, remaining air is discharged through the communicating hole 124. As a result, the thermoplastic resin plate is brought into close contact with the inner circumferential surface of the main cavity 121 to be hardened.

Figure 29:
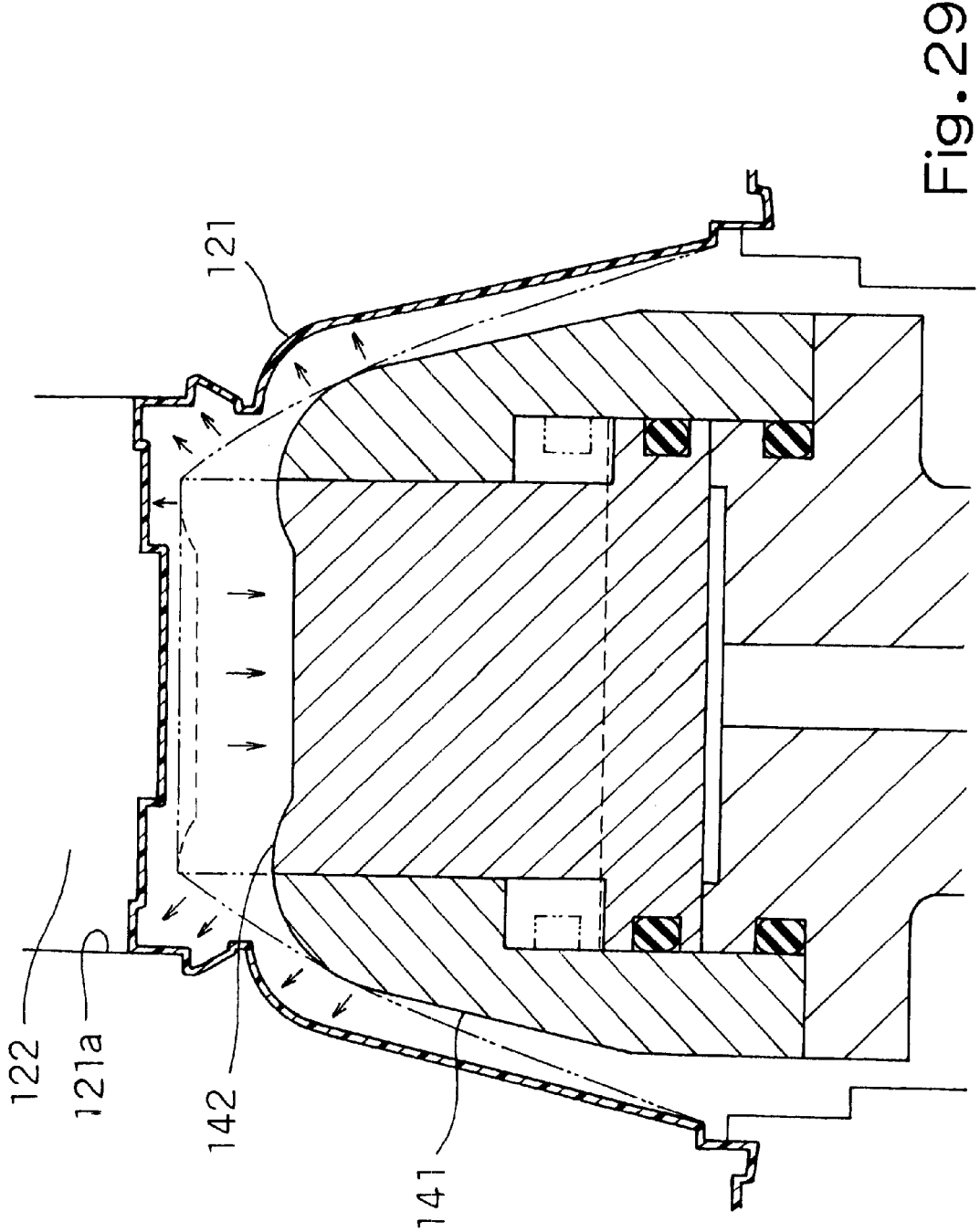
FIG. 29 is a schematic sectional view of the positional relationship between a molding and the plug immediately after start of forming.

The pressure of the supplied compressed air is set to be higher than the pressure of air supplied from the constant pressure supply 145 to the hollow portion 141$a$1. Accordingly, an outer pressure of the plug 140 becomes higher than an inner pressure thereof, so that the sub plug 142 is pushed into the hollow interior 141$a$1. FIG. 29 schematically shows the movement of the thermoplastic resin plate and the sub plug 142 in this state. Further, the upper end of the sub plug 142 is retreated to the main cavity 121 side.

The sub plug 142 is thus moved for the purpose of thickness adjustment. The conventional plug can just enter the inside of the main cavity 121 at the farthest as shown in FIG. 29. Even when a rim is formed at a location further inward from the bowl bottom of the main cavity 121 as the thermoforming female die 120, the thermoplastic resin plate needs to be extended farther such that the thickness thereof is reduced. Since the rim is subjected to an overall weight, the thickness of the rim needs to be increased. The conventional plug is disadvantageous in this respect.

Figure 30:
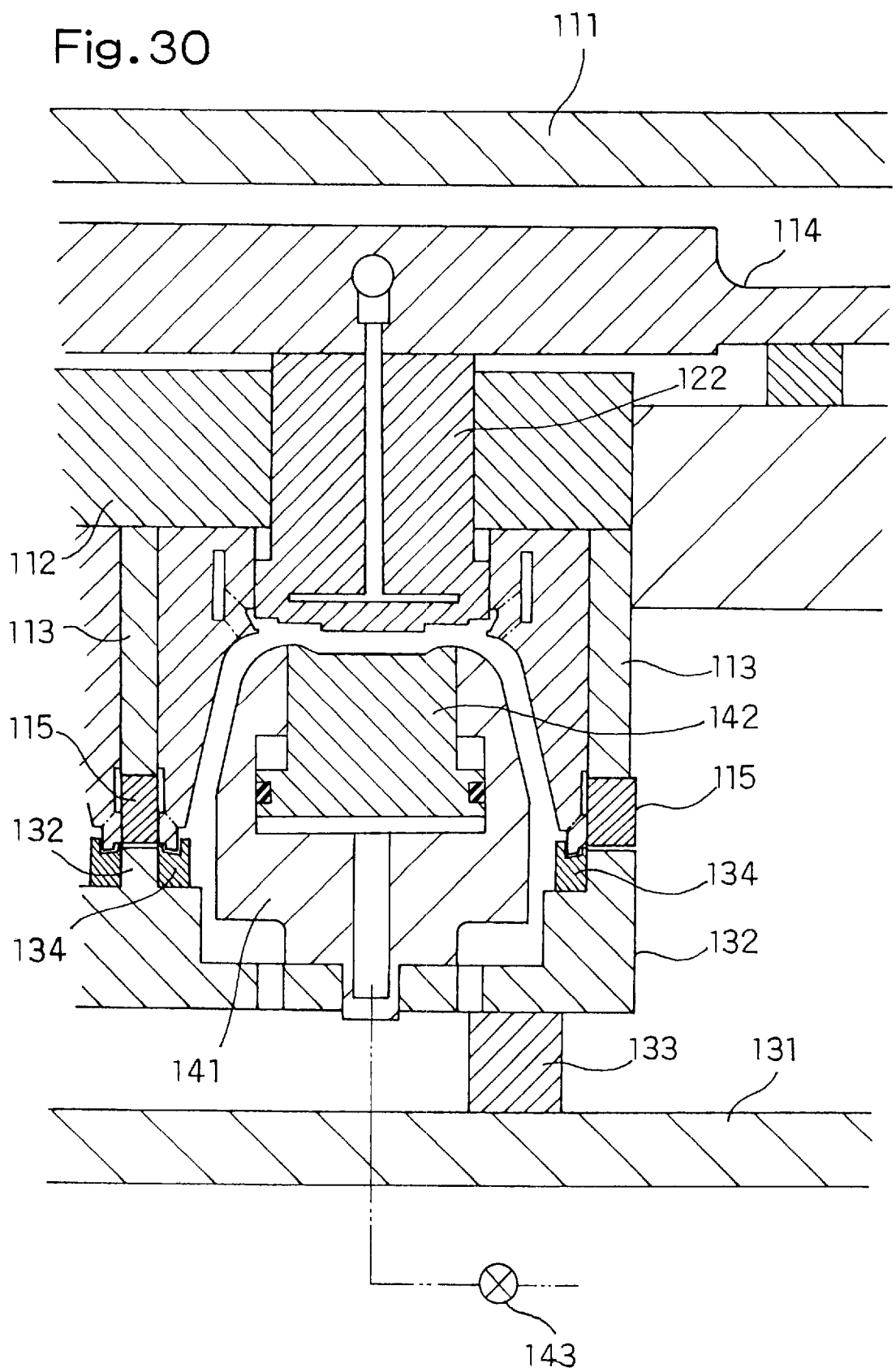
FIG. 30 is a sectional view of the thermoforming apparatus, showing the state where the bottom plate assumes a lowest position.
Figure 31:
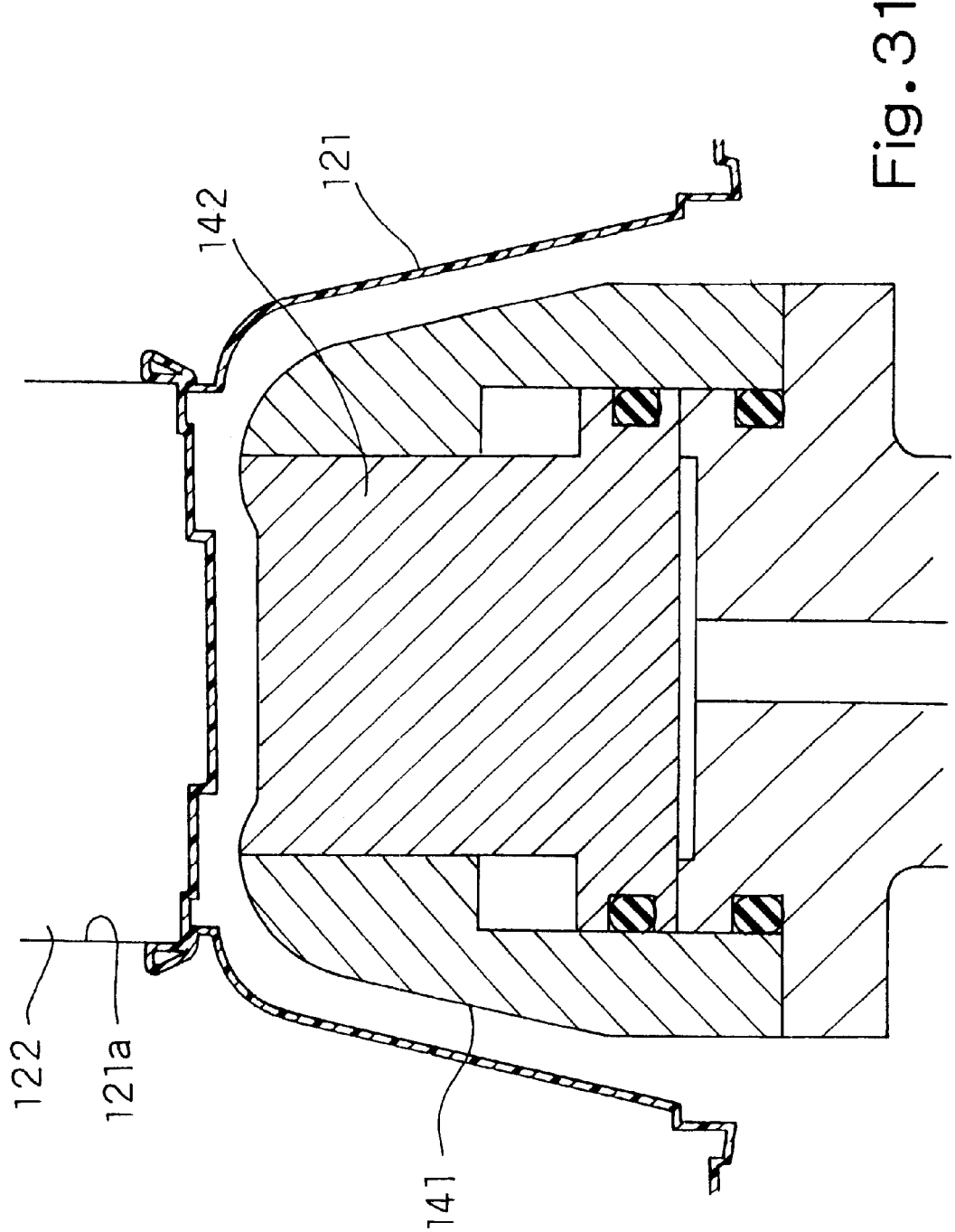
FIG. 31 is a schematic sectional view of the molding and the plug in the aforesaid state.

In the aforesaid state, an outline of the rim is formed on the bottom of the bowl. However, the bowl bottom is formed inward relative to the rim such that the rim takes an intermediate form. However, the bottom plate base 114 is moved downward by an actuator at time T151 which is slightly later than time T150 so that the bottom plate 122 is moved downward in the opening 121$a$ as shown in FIG. 30. AS the bottom plate 122 descends through the opening 121$a$, the original bowl bottom is moved to the open end side of the opening 121$a$ and a portion of the thermoplastic resin plate continuous from the termination of the rim via the inner circumferential surface of the opening 121$a$ to the bowl bottom is turned up, thereby forming an inner side wall surface of the rim. Further, since the bottom plate 122 is descended with a slight delay, the thermoplastic resin plate is still soft, and the lower end of the bottom plate 122 has a slightly larger diameter than that of the open end of the opening 121$a$. Accordingly, a portion of the thermoplastic resin plate corresponding to the circumferential edge of the soft bowl bottom and another portion thereof corresponding to the starting end of the rim are welded together such that no gaps are formed. FIG. 31 shows this state.

Figure 32:
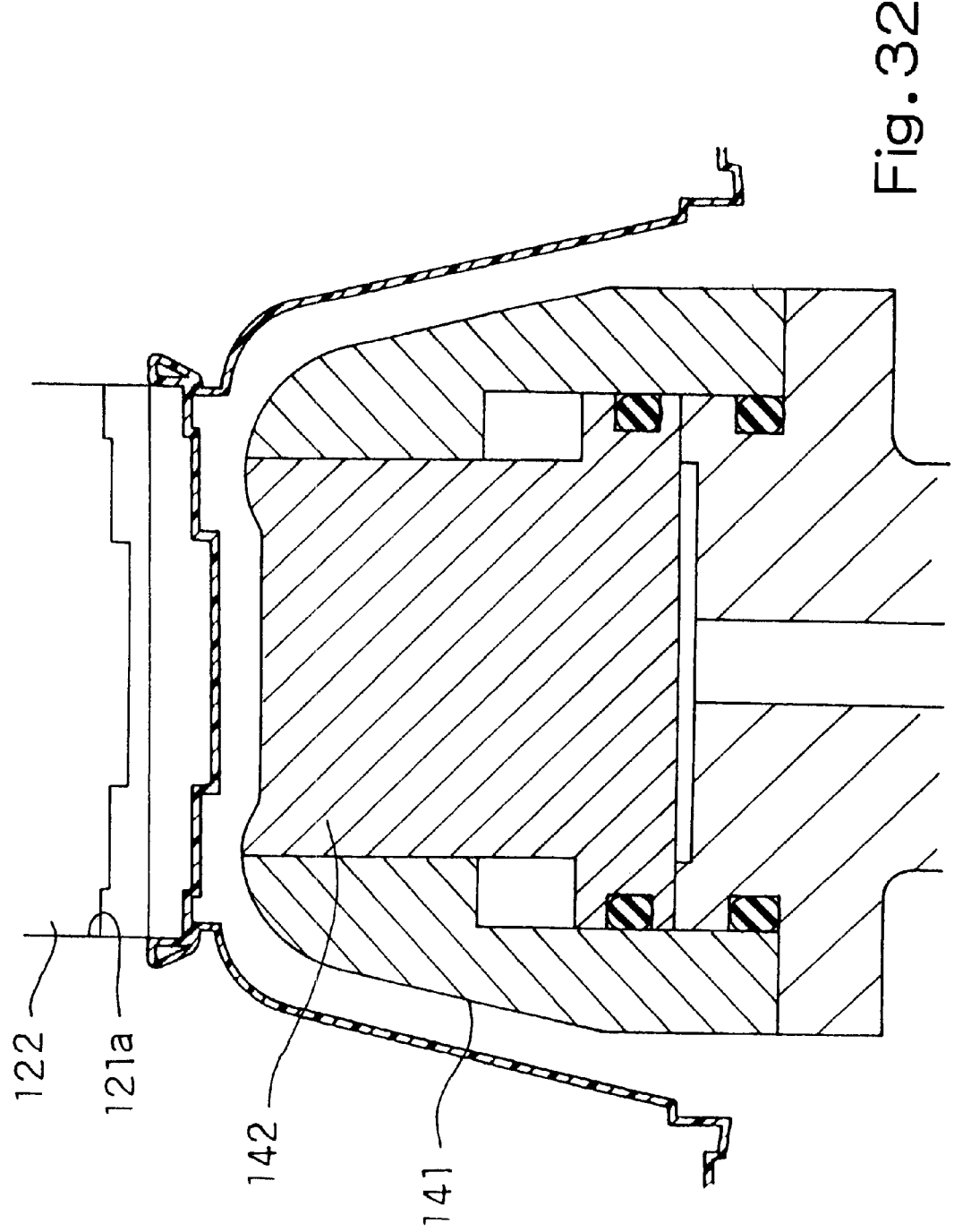
FIG. 32 is a sectional view of the molding in the state where the bottom plate has been moved up again.

The compressed air is still supplied in the aforesaid state. The sub plug 142 remains in the plug body 141 and does not interfere with the molding. The supply of compressed air from the compressed air box is stopped at time T106 which is a time after a predetermined hardening time and exhaust is performed. At the same time, the plug AD is switched to the silencer 144 side so that the hollow portion 141$a$1 of the plug 140 is opened to the atmosphere. The pressure in the exterior of the plug 140 and the pressure in the interior of the hollow portion 141$a$1 becomes equal to the atmosphere such that the sub plug 142 is held in the accommodated state. Further, the supply of negative pressure to the vacuum and die-releasing holes 123 is stopped and the bottom plate 122 is ascended. FIG. 32 shows the section of the molding immediately after the bottom plate 122 has been ascended. Since the rim is spread out in the hole 121$a$, it has reliably an undercut portion. In this case, the molding cannot always be removed from the die reliably even when the knockout is carried out. Even if only one molding cannot be removed from the die, all the moldings are damaged at the next feeding step.

Figure 33:
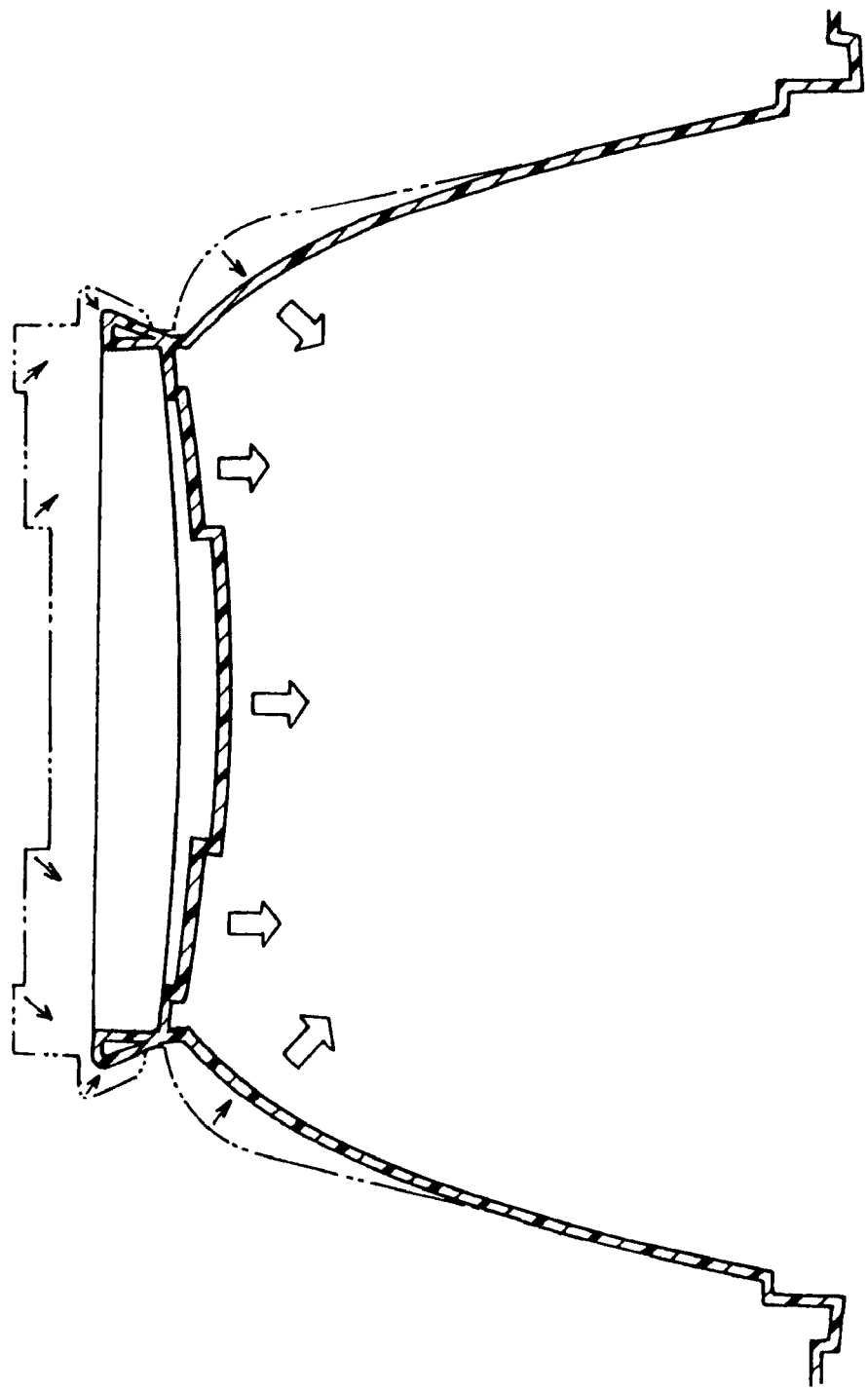
FIG. 33 is a schematic sectional view of the molding when compressed air is supplied through vacuum and die-releasing holes so that the bowl bottom is flexed.

In the foregoing embodiment, prior to the separation of the upper and lower tables, compressed air is supplied through the vacuum and die-releasing holes 123 at time T108. The open end of the bowl-shaped molding is pressed. When the compressed air is supplied to the bottom of the bowl in this state, the bowl bottom tends to flex inward. The lower table is moved downward at time T109 which is slightly later than time T108. FIG. 33 shows the state where the bowl bottom tends to flex. Even if the rim is undercut, the peripheral portion of bowl bottom is slightly drawn inside when the central portion thereof is pushed down. When the peripheral portion of the bowl bottom is drawn, the termination of the rim is also drawn inward to take a form allowing to pass through the undercut forming portion. When the lower table is descended, the seal plate 134 is moved downward such that the lower end of the molding is freed. At this time, the rim is almost removed. When the knockout plate 115 is also pushed down at time T110, the die-releasing is completed.

Figure 34:
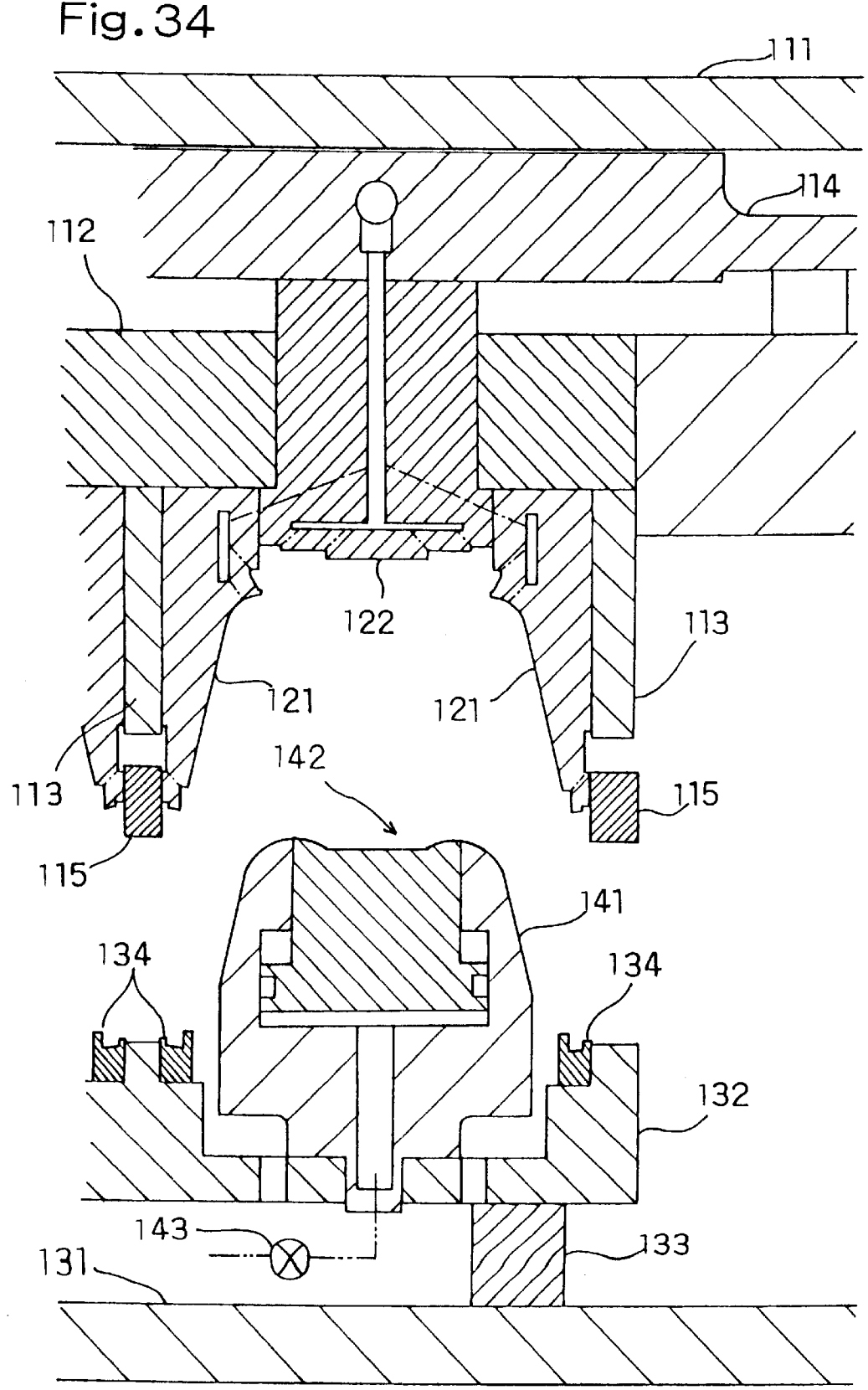
FIG. 34 is a partial sectional view of the thermoforming apparatus in the state where a knockout plate has been pushed downward.

The upper table starts to move upward when the knockout plate 115 is pushed down. The upper table first moves upward slowly and then increases the speed at time T111 at which the molding is considered to have completely been released from the die. With completion of die-releasing, the supply of compressed air from the vacuum and die-releasing holes 123 is stopped at time T112. The compressed air box does not need to communicate with the atmosphere when the lower table starts to descend with the lowering of the knockout plate 115. Accordingly, the exhaust is stopped at time T110. When the upper and lower tables are completely stopped, the knockout plate 115 is returned to its original position where it is near the cavity holder 113. FIG. 34 shows the state where the upper and lower tables are completely stopped and the knockout plate 115 has not been returned.

The foregoing is one cycle of thermoforming a bowl-shaped molding. When the rim spread out from the bowl bottom is formed, the quality of the bowl can be improved. Further, since the rim is formed by doubling the thermoplastic resin plate, it has a sufficient strength. Additionally, since no gaps communicating with the interior of the rim are formed in the inner circumferential surface of the bowl, the bowl has advantage in sanitation.

Figure 35A:
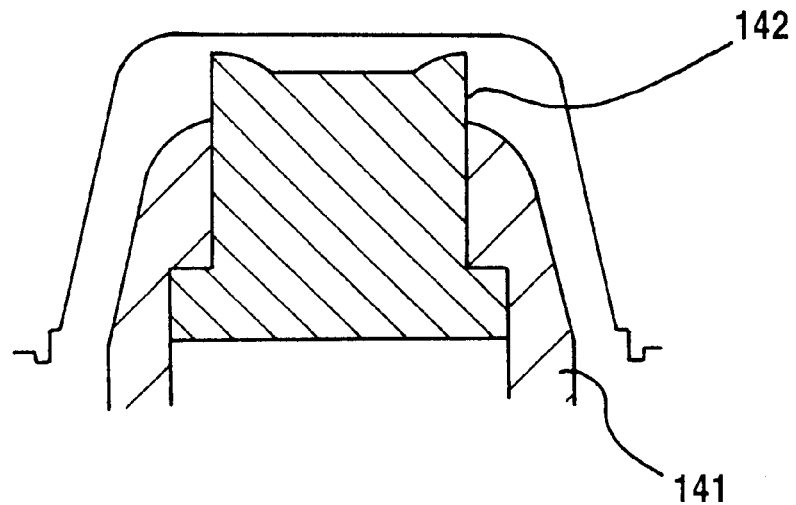
FIGS. 35A and 35B are partial sectional views of the thermoforming apparatus, showing a modified form for thickness adjustment.
Figure 35B:
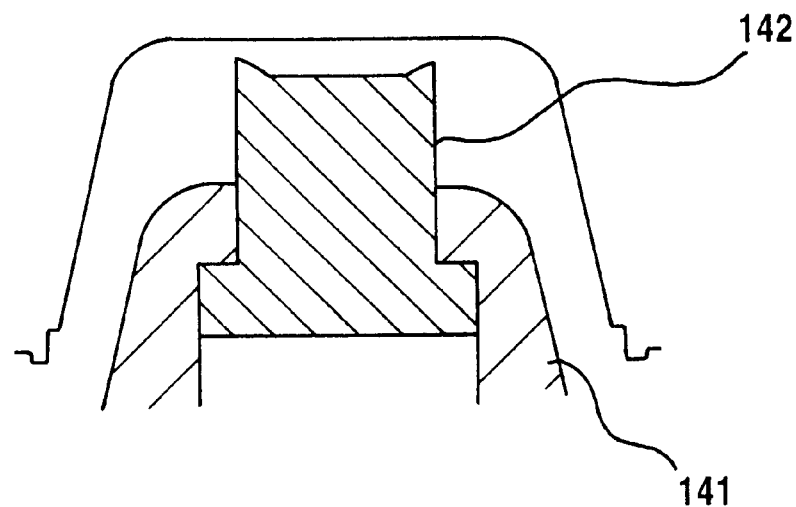

The rim is formed on the bowl bottom in the foregoing embodiment. The invention may be applied to a case where the thickness needs to be partially adjusted. FIGS. 35A and 35B show a modified form for this purpose. Referring to FIG. 35A, the bowl as the molding includes a thin circumferential wall, a medium lower corner and a thick bowl bottom. On the other hand, FIG. 35B shows another bowl including a portion of the circumferential wall near the opening, which portion has a medium thickness, a thin corner and a thick portion of the bottom near the center. In the latter, the diameter of the sub plug is reduced and its length of projection is increased as a basic principle.

Accordingly, the thickness of the bowl may be suitably adjusted in application of such a standpoint.

Although only the plug 140 has a doubled structure, the structure may not be limited to the doubled one. For example, when the bowl bottom has a large thickness and the thickness is reduced as it goes to the open edge, a trebled structure may be provided. As a result, an amount of drawing for each step can be adjusted. Further, the direction of projection should not be limited to the side of the bowl bottom. The sub plug may project so as to come close to the inner circumferential surface of the thermoforming female die 120 with respect to a portion whose thickness needs to be increased. Accordingly, the thickness maybe increased in the side so that a pattern is formed.

In order that the structure of the plug 140 may be simplified and the control manner may be rendered easy, only the external pressure is adjusted when the sub plug 142 is driven. Accordingly, by positively adjusting the pressure in the hollow portion 141a1, the timing for forward and backward movement of the sub plug may be controlled. The plug 140 comprises the plug body 141 and the sub plug 142, and the sub plug is moved forward and backward relative to the plug body. Consequently, the distance can be reduced between a portion whose thickness needs to be increased and the thermoforming female die 120. Further, the sub plug 142 does not interfere with the female die 120 even when the latter is in operation.

FIGS. 36 to 45 illustrate a fourth embodiment of the invention. The thermoforming apparatus comprises an upper base plate 211 and a lower base plate 231 fixed to the upper and lower tables (not shown) so as to be vertically moved at a predetermined stroke by driving units M201 and M202, respectively. A cavity base 212 is fixed to the upper base plate by bolts so as to be spaced from the latter. A cavity holder 213 is fixed to the cavity base 212 by bolts. Further, a plurality of main cavity 221 is attached to the cavity holder 213.

Figure 38:
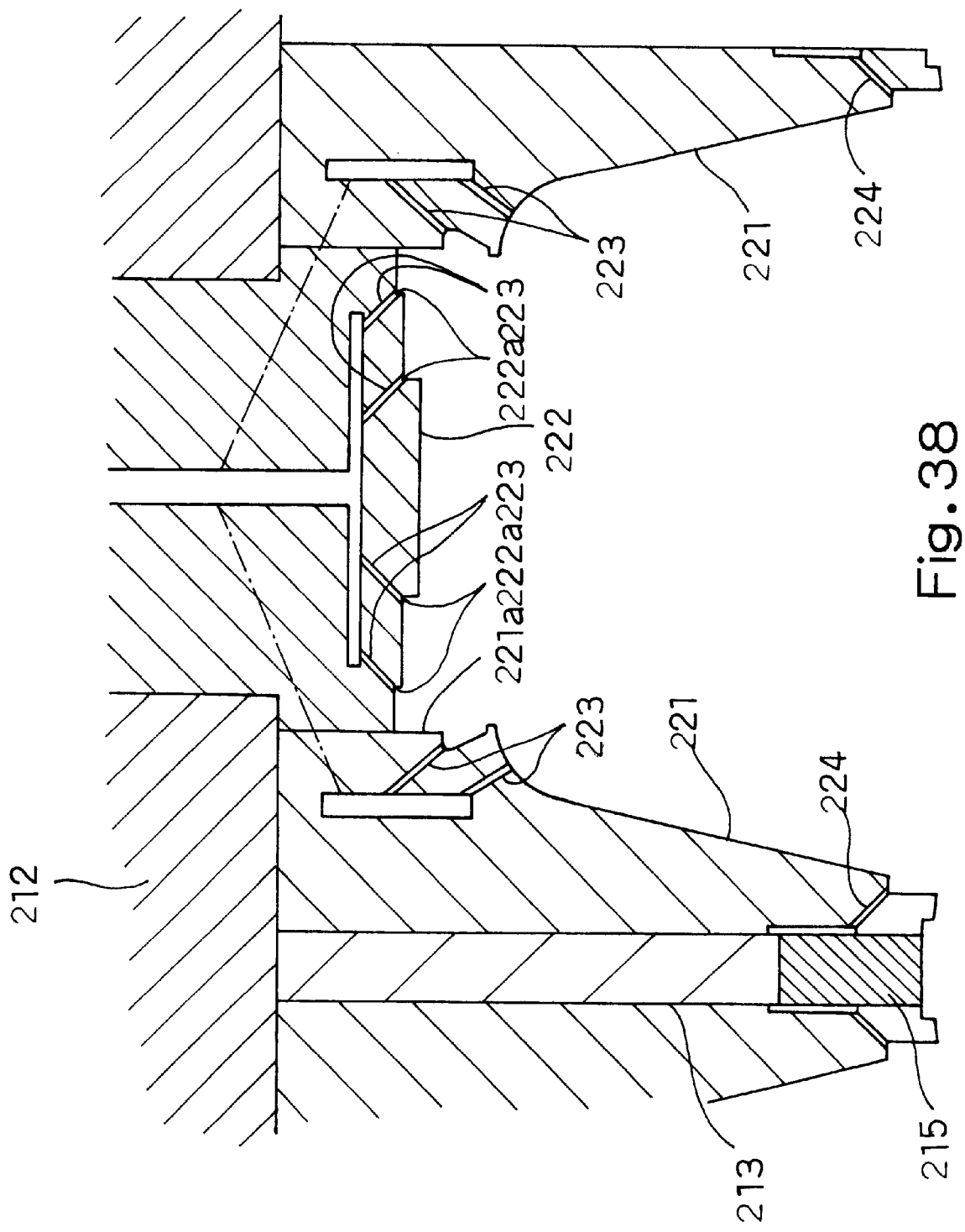
FIG. 38 is an enlarged sectional view of a male die used in the thermoforming apparatus.

The thermoforming female die 220 includes the main cavity 221 and the bottom plate 222 as shown in FIG. 38. The main cavity 221 is formed generally into a bowl-shaped recess and has a bottom with a through hole 221a. The generally cylindrical bottom plate 222 is vertically movably supported so as to close the hole 221a.

Regarding the shape of the bowl, an open edge is continuous through a circumferential wall surface to a bottom wall surface. The hole 221a is formed in the bottom wall. The diameter of the hole 221a is first reduced and then spread inward. The diameter of the hole 221a is thereafter reduced again to be the same as the first one. The diameter of the hole 221a is thereafter constant. The spreading portion corresponds to a portion forming an outer configuration of a rim formed on the bottom of the bowl. An undercut is formed in this portion relative to a direction in which the die is removed.

Figure 36:
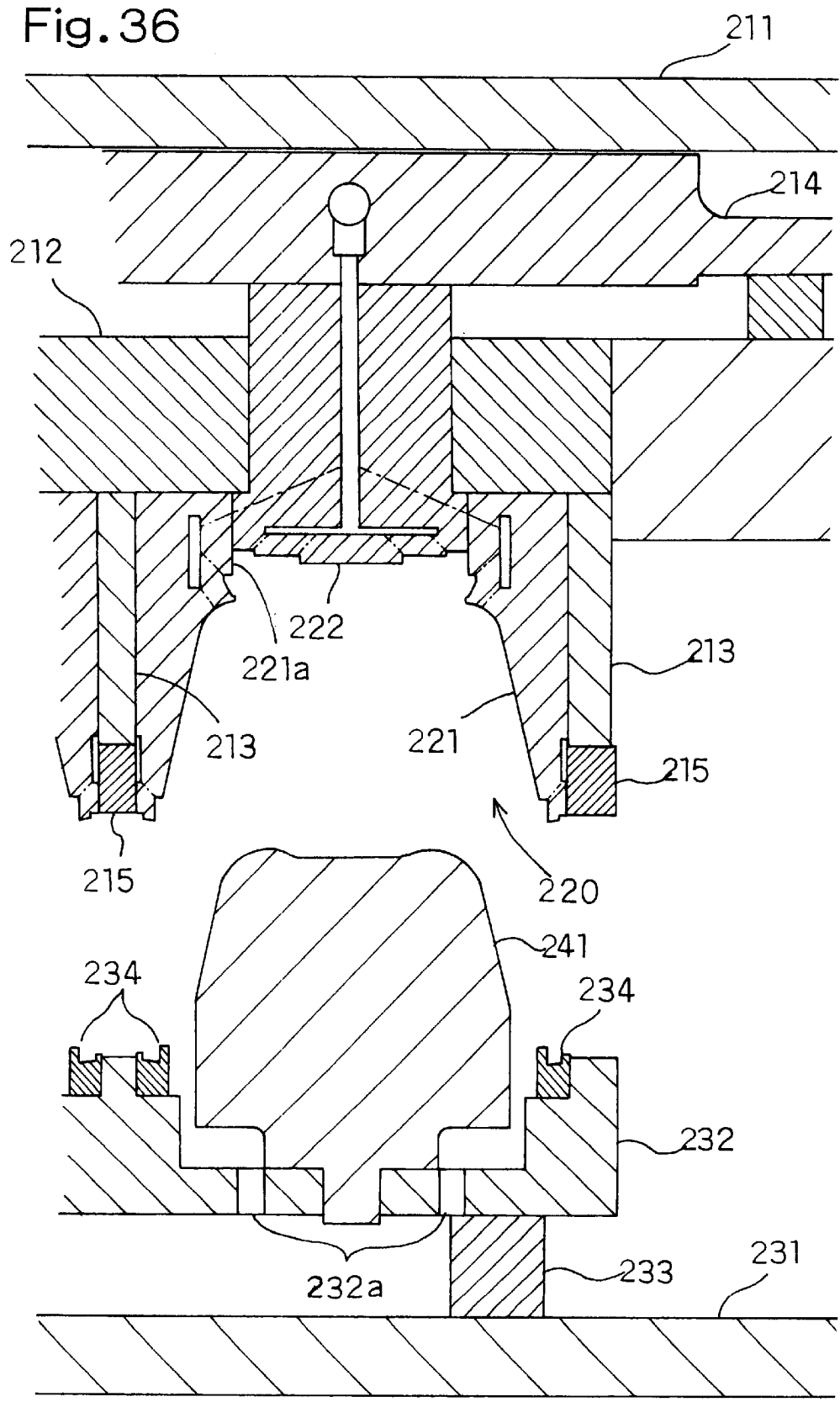
FIG. 36 is a partial sectional view of the thermoforming apparatus of a fourth embodiment in accordance with the invention.
Figure 37:
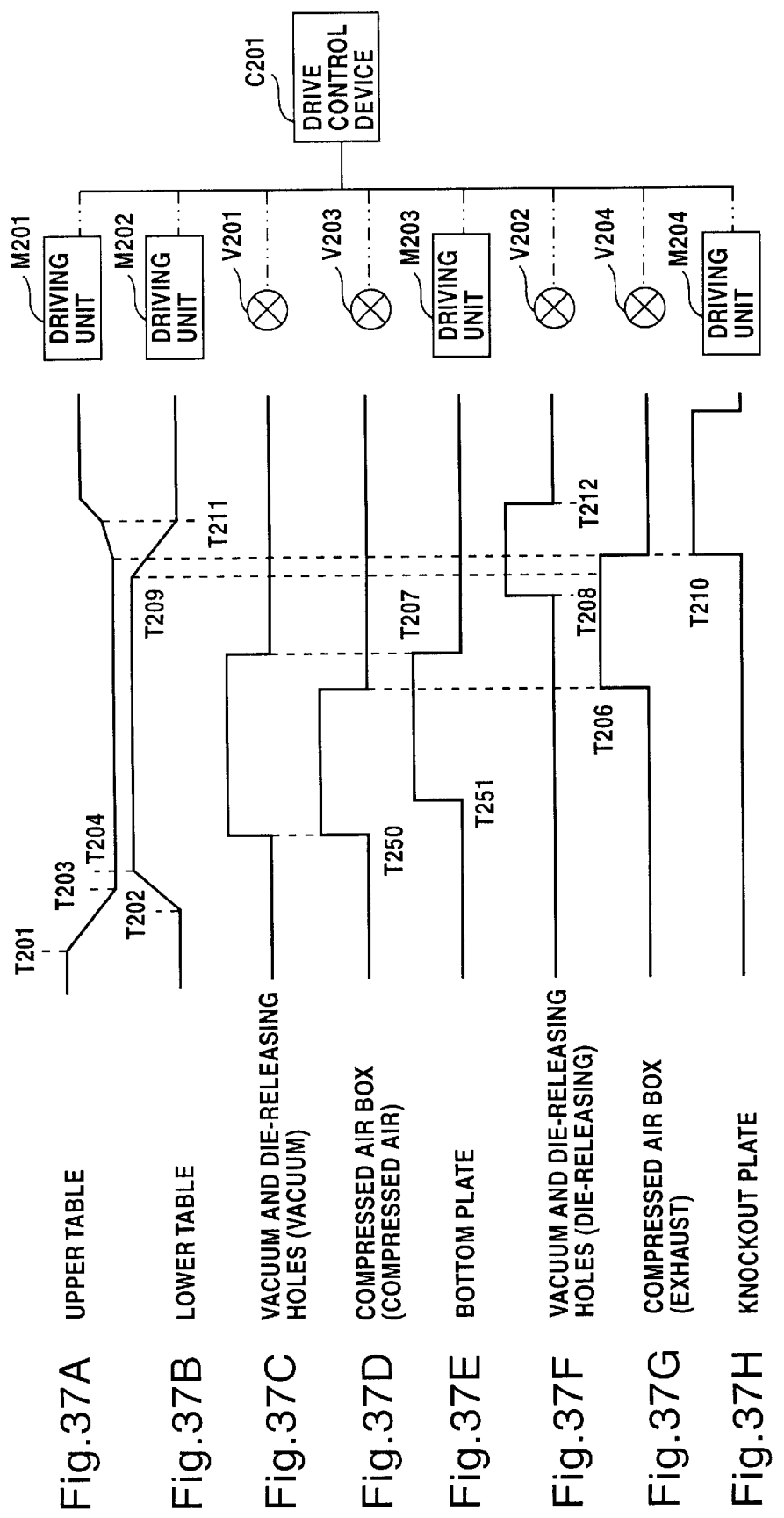
FIG. 37A to 37H are timing charts showing the operation sequence of the thermoforming apparatus.

The bottom plate 222 forms the bottom of the aforesaid recess. The bottom has concentric two-stage stepped portions 222a. The outer configuration of the bottom plate 222 agrees substantially with that of the constant diameter portion of the hole 221a. The hole 221a has a diameter of an open end thereof slightly smaller than the constant diameter portion. The bottom plate 222 extends through the cavity base 212 and is supported on a bottom plate base 214 held between the cavity base 212 and the upper base plate 211. The bottom plate base 214 is vertically moved at a predetermined stroke by a driving unit M203. The stroke is equal to a distance by which the bottom face of the bottom plate 222 reciprocates from a position retreated from an upper end of the rim by a height of the rim to a lower end of the rim as shown in FIG. 36.

A large number of vacuum and die-releasing holes 223 are provided in the inner circumferential surface of the female die 220. The holes 223 are concentrated particularly on the bowl bottom where the aforesaid undercut is formed. Referring to FIG. 38, the holes 223 are formed in a portion continuous from the circumferential wall surface to the bowl bottom, a portion of outermost circumferential end of the rim, and the two-stage stepped portions 222a. The number and the locations of the holes 223 are determined on such a condition that the bowl bottom of the molding can be flexed inward when compressed air is supplied through the holes 223 as will be described later, in addition to a minimum condition that the sheet is brought into close contact along the inner circumferential shape of the bowl die.

The vacuum and die-releasing holes 223 communicate via a hollow passage provided in the bottom plate 222, a hollow passage provided in the bottom plate base 214, and control valves V201 and V202 with an external pressure controlling mechanism. The pressure controlling mechanism supplies negative pressure and compressed air as shown in FIGS. 37A to 37H. An indication, "VACUUM AND DIE-RELEASING HOLES (VACUUM) designates a timing for supply of negative pressure to the vacuum and die-releasing holes 223. An indication, "VACUUM AND DIE-RELEASING HOLES (DIE-RELEASING)," designates a timing for supply of die-releasing compressed air.

No vacuum and die-releasing holes 223 are formed in the open end of the main cavity 221. Instead, a hole communicating with the atmosphere is formed in a recess conforming to the open end. Accordingly, even when pressure is applied from the plug side during the forming, no air bubble is formed between the molding and the main cavity 221.

A knockout plate 215 is disposed at the lower base plate 231 side on the cavity holder 213 and is moved to and from the die by a predetermined stroke by a driving unit M204 during die-releasing. A plug base 232 is fixed by bolts (not shown) to the lower base plate 231 with a spacer 233 interposed therebetween, thereby forming a closed compressed air box. A plug 241 is fixed to the plug base 232 by bolts (not shown) so as to be opposed to the main cavity 221. The plug 241 has a communicating hole 232a formed around a bedded portion thereof. Further, a seal plate 234 formed with a through hole is disposed to surround the plug 241 so that the seal plate is opposed to the open end of the main cavity 221. When the upper and lower base plates 211 and 231 are in the vicinity of each other, the thermoplastic resin plate is held between the seal plate 234 and the main cavity 221, and a closed space communicating with the compressed air box is formed. The compressed air box is connected via control valves V203 and V204 to the pressure controlling mechanism. The pressure controlling mechanism carries out the control as shown in FIGS. 37A to 37H so that compressed air is supplied and discharged. The aforesaid driving units M201 to M204 and control valves V201 to V204 are controlled by the drive control device C201 comprising a microcomputer.

The operation of the thermoforming apparatus will be described with reference to FIGS. 37A to 37H. A heater and a feeder are provided in the previous stage of the thermoforming apparatus. Since they are well known in the art, the description of them will be eliminated. First, the upper table starts to move downward at time T201 and accordingly, the upper base plate 211 and the female die 220 fixed to the upper table also move downward. The descent of the upper table finishes at time T203. The lower table starts to move upward at time T202 which is earlier than time T203. After completion of descent of the upper table, the lower table finishes ascent at time T204 which is slightly later than the time of completion of descent of the upper table.

Figure 39:
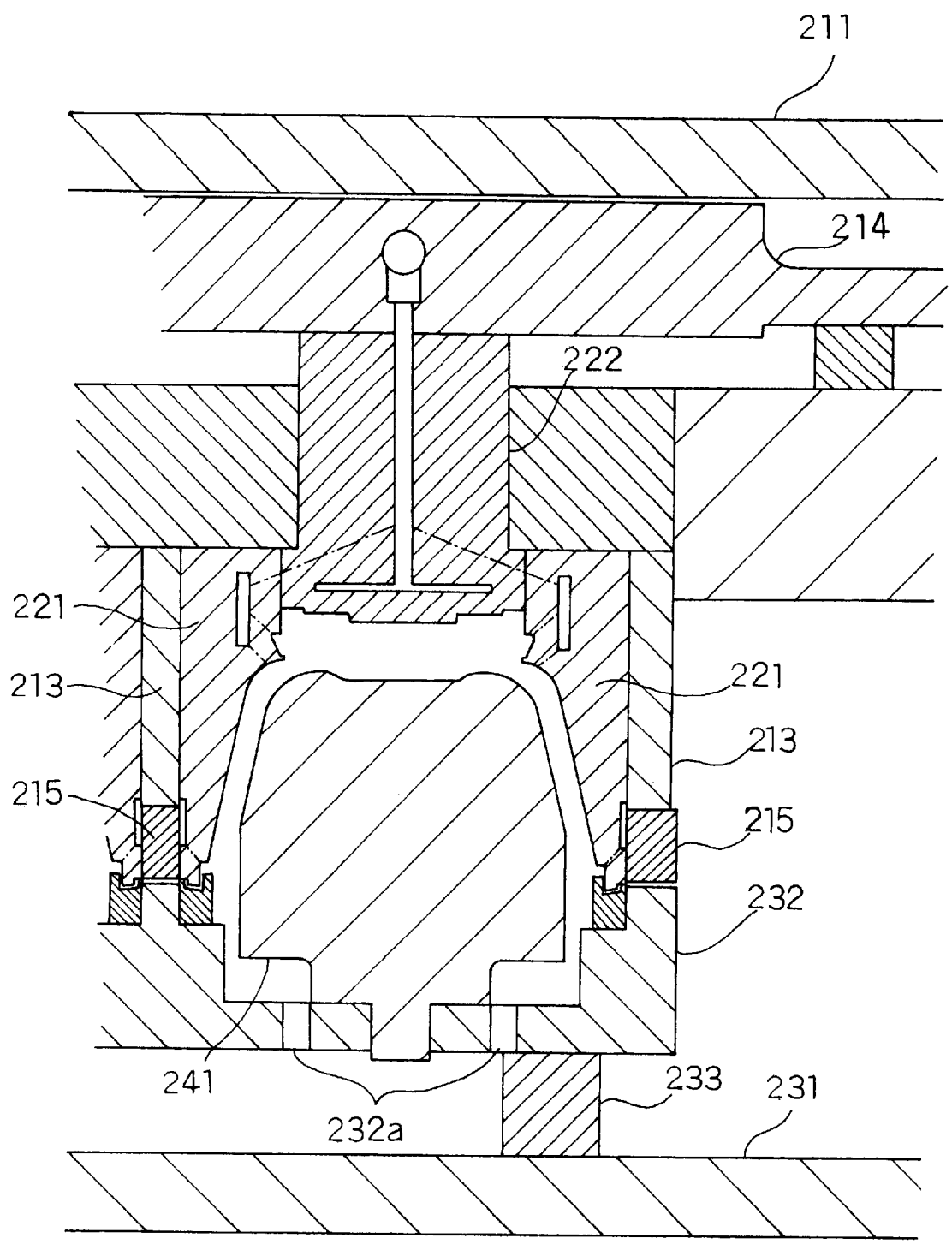
FIG. 39 is a partial sectional view of the thermoforming apparatus in the closed state.

FIG. 39 shows the closed state of the die at time T204. The thermoplastic resin plate is eliminated in FIG. 39. At this time, the bottom plate 222 is located inside the main cavity 221 (an ascended position). The thermoplastic resin plate is held between the open end of the main cavity 221 and the seal plate 234. A central portion of the thermoplastic resin plate is extended by the plug 241 toward the inside of the main cavity 221.

Figure 40:
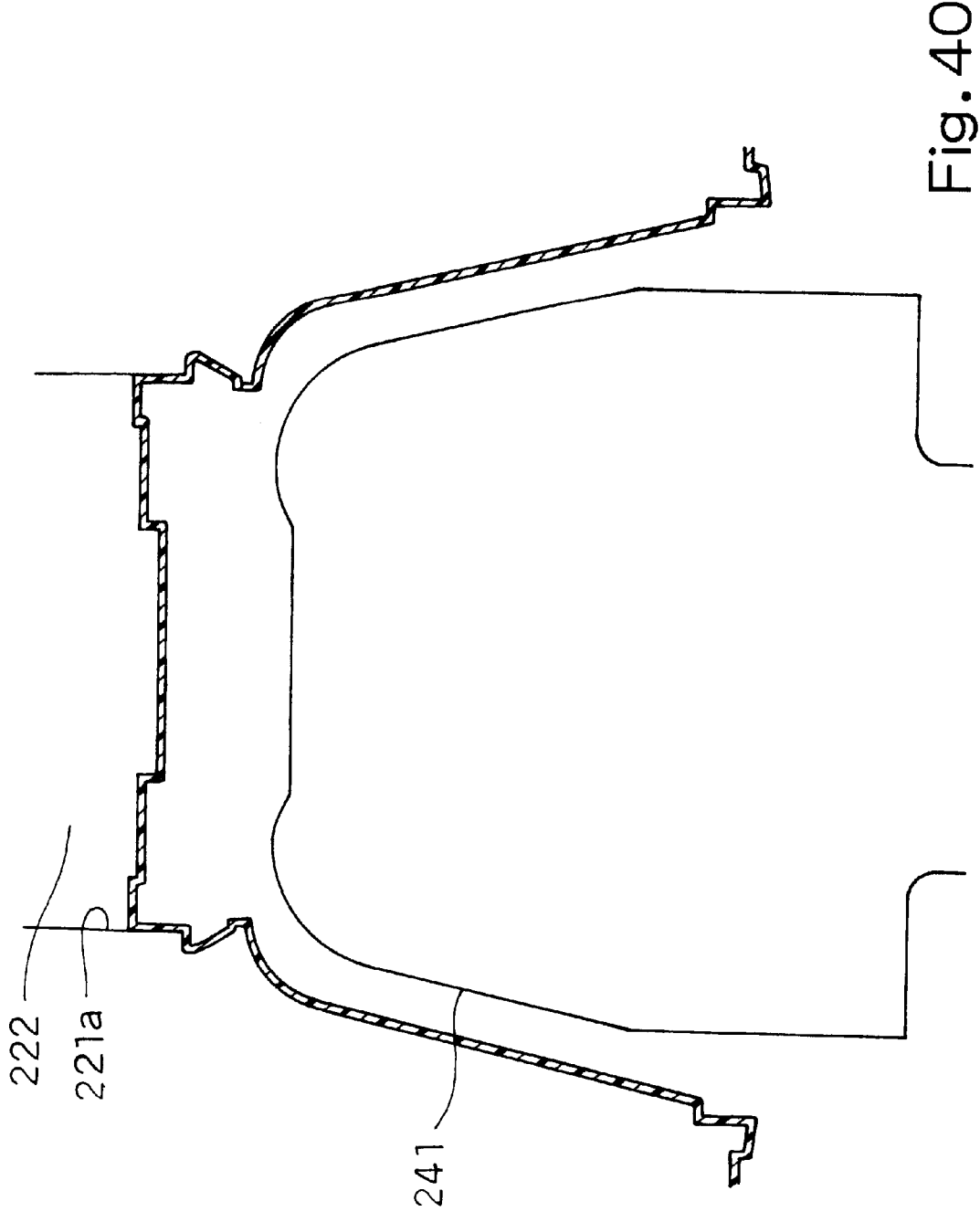
FIG. 40 is a schematic sectional view of the molding immediately after start of forming.

The compressed air is supplied from the compressed air box at time T250 and simultaneously, negative pressure is supplied to the vacuum and die-releasing holes 223. The thermoplastic resin plate is pushed from the plug 241 side into the main cavity 221, sucked to the vacuum and die-releasing holes 223 such that a fine shape inside the inner circumferential surface of the female die is reliably formed. FIG. 40 shows a section of the thermoplastic resin plate formed as described above. In the aforesaid state, an outline of the rim is formed on the bottom of the bowl. However, the bowl bottom is formed in ward relative to the rim such that the rim takes an intermediate form.

Figure 41:
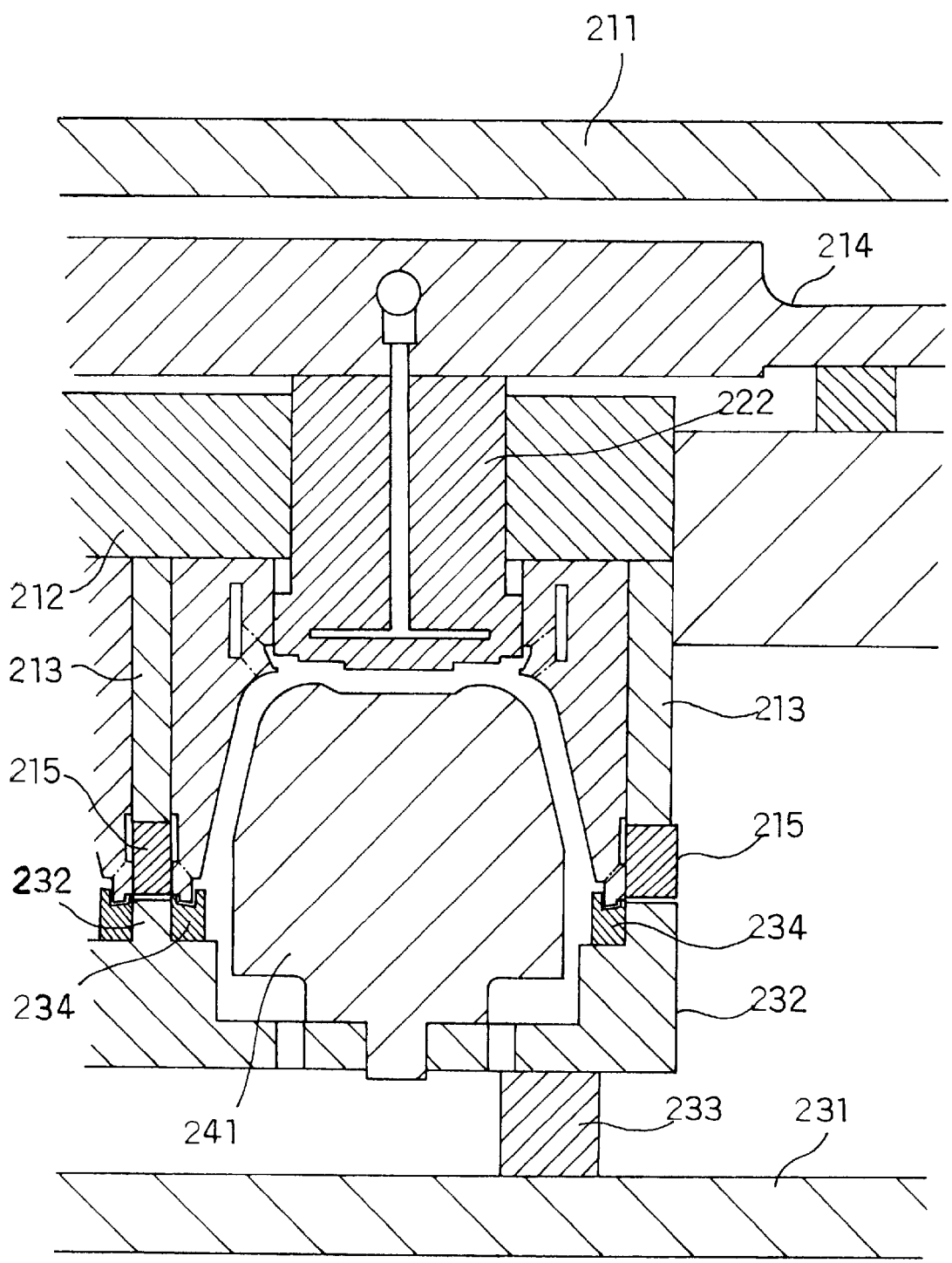
FIG. 41 is a sectional view of the thermoforming apparatus, showing the state where the bottom plate assumes a lowest position.
Figure 42:
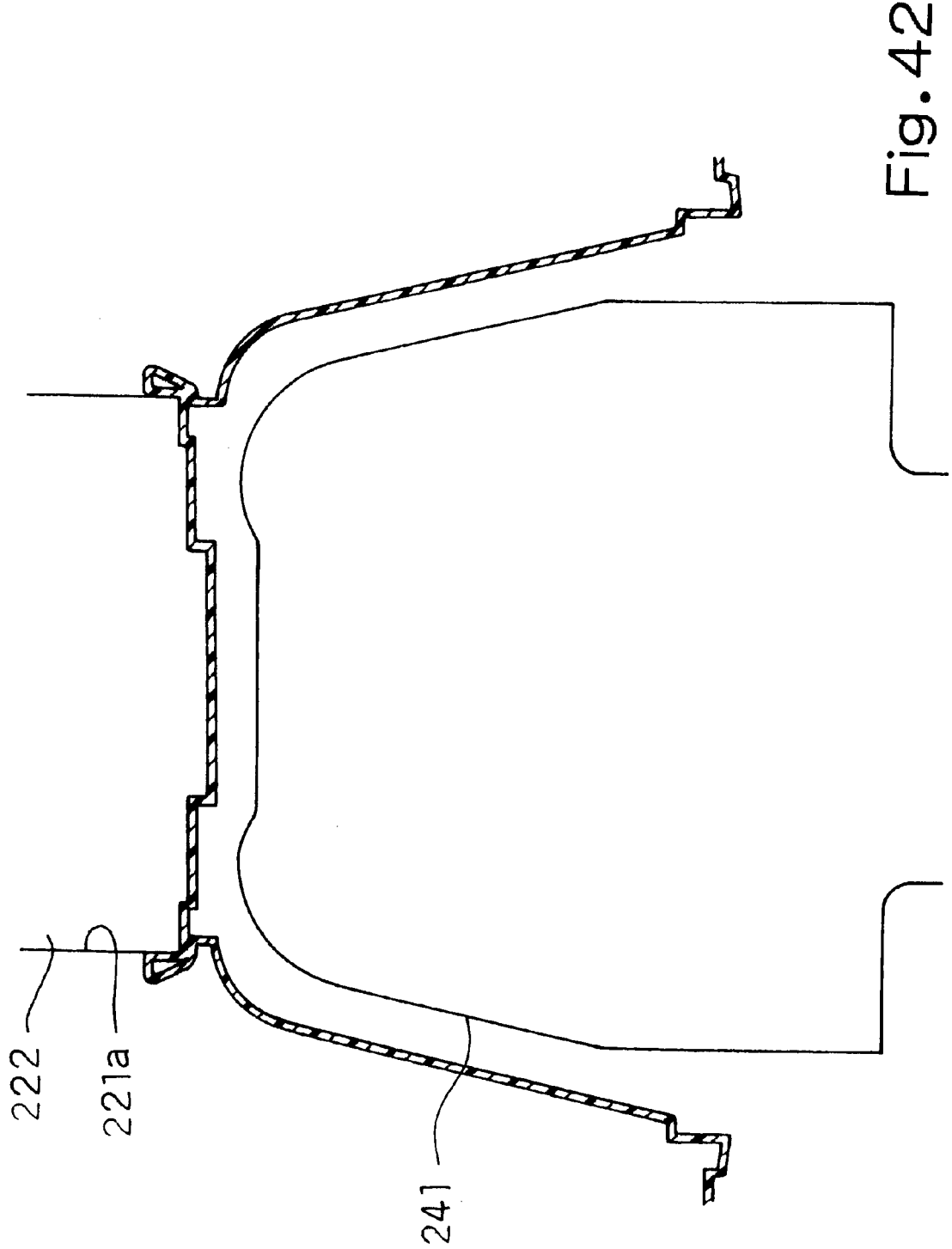
FIG. 42 is a schematic sectional view of the molding in the aforesaid state.

However, the bottom plate base 214 is moved downward by an actuator at time T251 which is slightly later than time T250 so that the bottom plate 222 is moved downward in the opening 221a as shown in FIG. 41. As the bottom plate 222 descends through the opening 221a, the original bowl bottom is moved to the open end side of the opening 221a and a portion of the thermoplastic resin plate continuous from the termination of the rim via the inner circumferential surface of the opening 221a to the bowl bottom is turned up, thereby forming an inner side wall surface of the rim. Further, since the bottom plate 222 is descended with a slight delay, the thermoplastic resin plate is still soft, and the lower end of the bottom plate 222 has a slightly larger diameter than that of the open end of the opening 221a. Accordingly, a portion of the thermoplastic resin plate corresponding to the circumferential edge of the soft bowl bottom and another portion there of corresponding to the starting end of the rim are welded together such that no gaps are formed. FIG. 42 shows this state.

Further, a stepped portion is formed on a portion of the main cavity 221 near the opening. The vacuum and die-releasing holes 223 are concentrated on the bowl bottom and are not formed in the stepped portion. The hole 224 communicating with the atmosphere is formed in the stepped portion, instead. In a case where the thermoplastic resin plate is pushed against the stepped portion when compressed air is supplied from the plug 241 side, remaining air is discharged through the communicating hole 224. As a result, the thermoplastic resin plate is brought into close contact with the inner circumferential surface of the main cavity 221 to be hardened.

Figure 43:
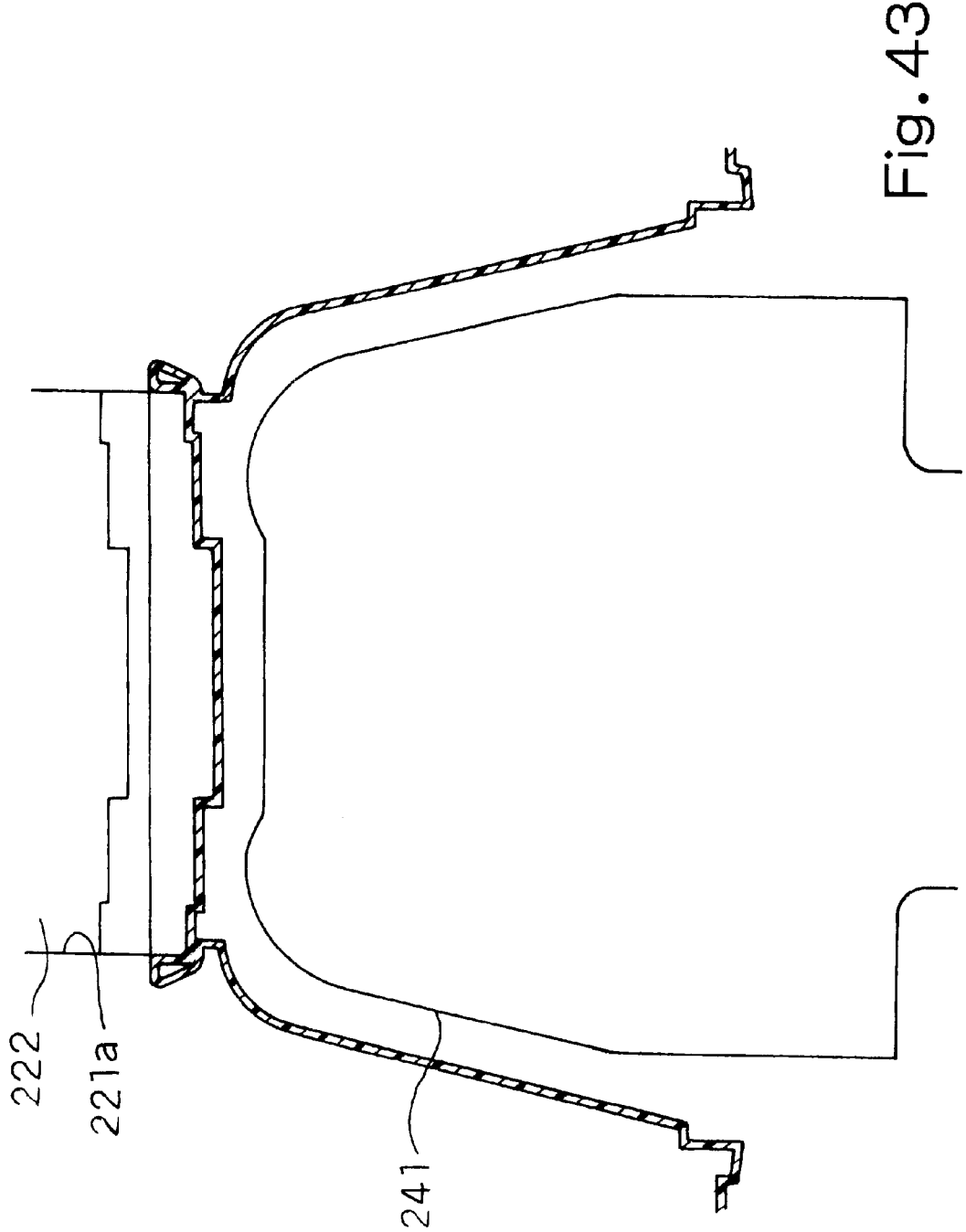
FIG. 43 is a sectional view of the molding in the state where the bottom plate has been moved up again.

The supply of compressed air from the compressed air box is stopped at time T206 which is a time after a predetermined hardening time and exhaust is performed. Further, the supply of negative pressure to the vacuum and die-releasing holes 223 is stopped and the bottom plate 222 is ascended. FIG. 43 shows the section of the molding immediately after the bottom plate 122 has been ascended. Since the rim is spread out in the hole 121a, it has reliably an undercut portion. In this case, the molding cannot always be removed from the die reliably even when the knockout is carried out. Even if only one molding cannot be removed from the die, all the moldings are damaged at the next feeding step.

Figure 44:
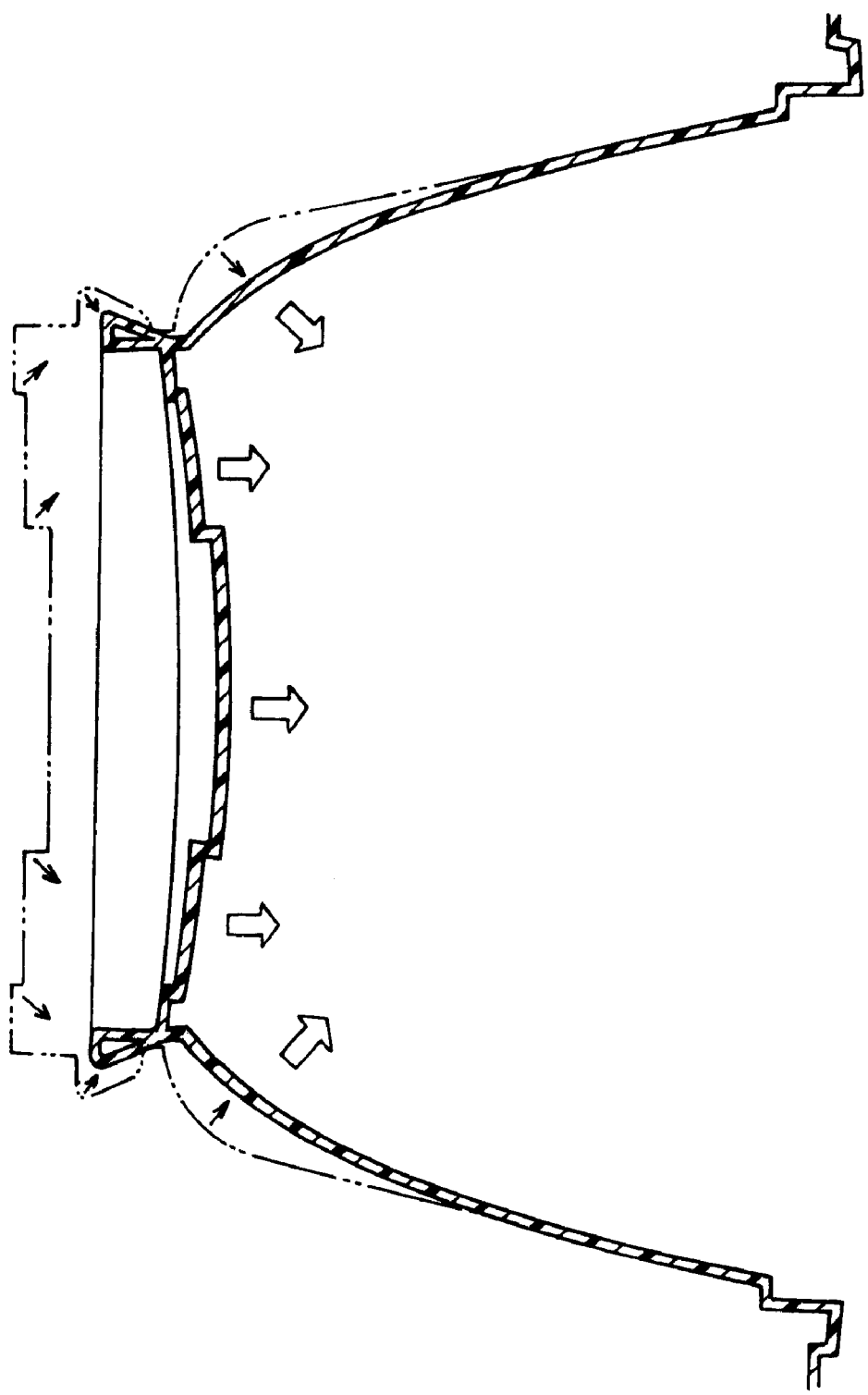
FIG. 44 is a schematic sectional view of the molding when compressed air is supplied through vacuum and die-releasing holes so that the bowl bottom is flexed.

In the foregoing embodiment, prior to the separation of the upper and lower tables, compressed air is supplied through the vacuum and die-releasing holes 223 at time T208. The open end of the bowl-shaped molding is pressed. When the compressed air is supplied to the bottom of the bowl in this state, the bowl bottom tends to flex inward. The lower table is moved downward at time T209 which is slightly later than time T208. FIG. 44 shows the state where the bowl bottom tends to flex. Even if the rim is undercut, the peripheral portion of bowl bottom is slightly drawn inside when the central portion thereof is pushed down. When the peripheral portion of the bowl bottom is drawn, the termination of the rim is also drawn inward to take a form allowing to pass through the undercut forming portion. When the lower table is descended, the seal plate 234 is moved downward such that the lower end of the molding is freed. At this time, the rim is almost removed. When the knockout plate 215 is also pushed down at time T210, the die-releasing is completed.

Figure 45:
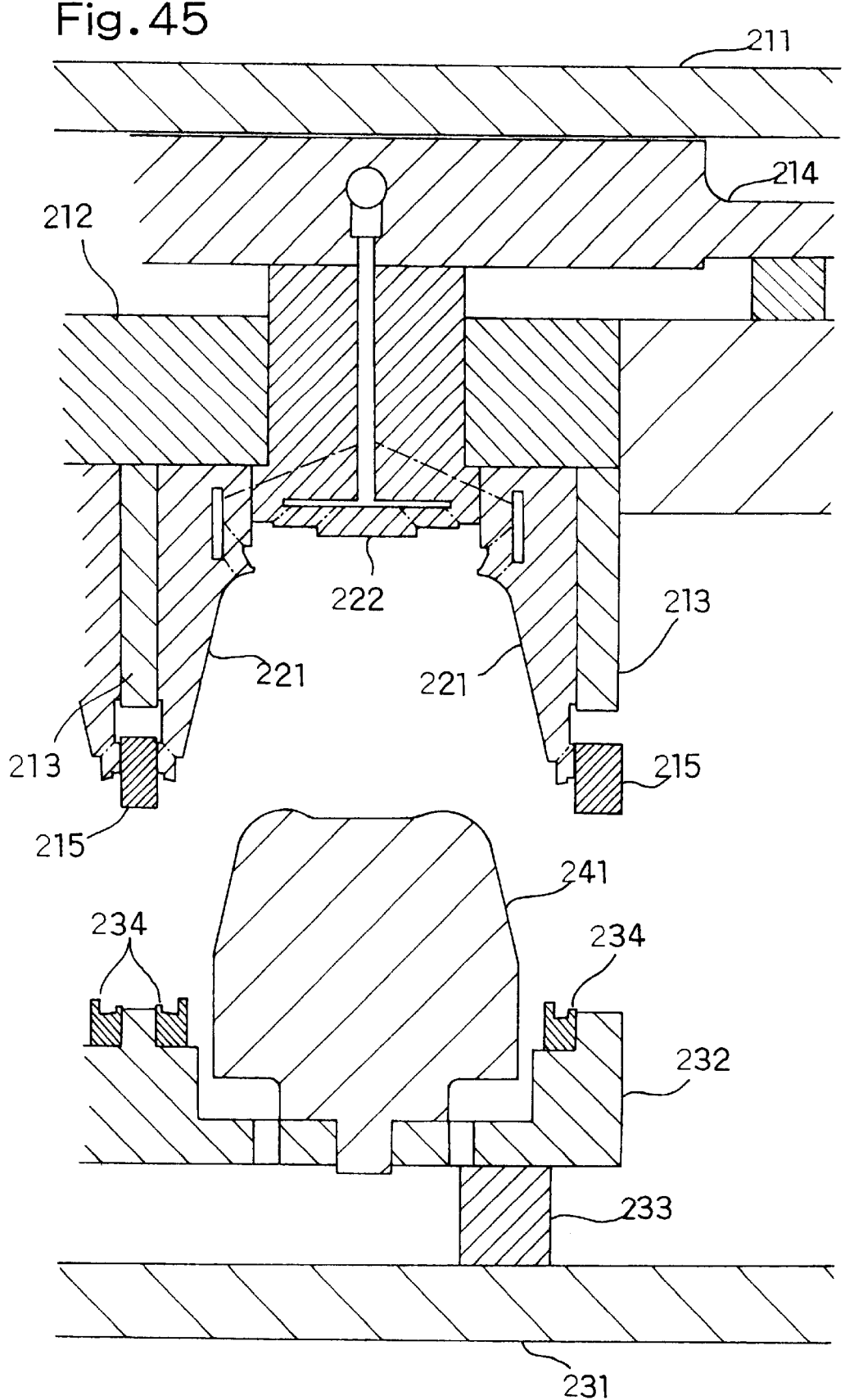
FIG. 45 is a partial sectional view of the thermoforming apparatus in the state where a knockout plate has been pushed downward.

The upper table starts to move upward when the knockout plate 215 is pushed down. The upper table first moves upward slowly and then increases the speed at time T211 at which the molding is considered to have completely been released from the die. With completion of die-releasing, the supply of compressed air from the vacuum and die-releasing holes 223 is stopped at time T212. The compressed air box does not need to communicate with the atmosphere when the lower table starts to descend with the lowering of the knockout plate 215. Accordingly, the exhaust is stopped at time T110. When the upper and lower tables are completely stopped, the knockout plate 215 is returned to its original position where it is near the cavity holder 213. FIG. 45 shows the state where the upper and lower tables are completely stopped and the knockout plate 215 has not been returned.

The foregoing is one cycle of thermoforming a bowl-shaped molding. When the rim spread out from the bowl bottom is formed, the quality of the bowl can be improved. Further, since the rim is formed by doubling the thermoplastic resin plate, it has a sufficient strength. Additionally, since no gaps communicating with the interior of the rim are formed in the inner circumferential surface of the bowl, the bowl has advantage in sanitation.

To flex the bowl bottom enhances the die-releasing. Accordingly, only supply holes for the die-releasing may be concentrically disposed in the bowl bottom. However, since the compressed air leaks out through the vacuum holes when these holes are separately formed, it is best to provide the holes common to vacuum and die-releasing.

In the foregoing embodiment, the rim is formed by means of the undercut. A technique for causing the undercut to pass through the undercut forming portion by flexing the bowl should not be limited to the above-described one. For example, the bowl is flexed in such a direction that it departs from the die when a male die is used and compressed air is supplied from near the undercut. The undercut tends to pass through the undercut forming portion in this flexing direction.

Although the molding with the undercut is formed in the foregoing embodiment, the effect of enhancing die-releasing can be achieved even when the bowl has no undercut. In this case, the molding is released from the die after the bottom of the bowl hasbeenflexed. Accordingly, the molding can easily be released in the subsequent releasing step.

Thus, in the case where the rim becoming the undercut is formed on the bowl bottom, the vacuum and die-releasing holes for supplying compressed air are disposed concentrically in the bowl bottom. When compressed air is supplied from the vacuum and die-releasing holes at the time of die-releasing, the bowl bottom is flexed inward such that the undercut of the molding is released from the undercut forming portion. Consequently, the molding can reliably be released from the die.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A method of thermoforming in which a thermoplastic resin sheet heated to be softened is brought into contact with an inner circumferential surface of thermoforming female die formed generally into a bowl-shaped recess, comprising the steps of:

communicating a rim forming recess formed generally into a shape of a bowl-shaped recess with a bottom opening and forming a bottom wall of the bowl, an outer wall, a bottom wall and an inner wall of a rim of the bottom, wherein the rim forming recess includes a first portion spread outward so as to be continuous from the bowl bottom and a second portion continuous from the first portion and having a reduced inner diameter, the first and second portions forming the outer wall and the bottom wall;

supporting a bottom plate inside the rim forming recess so that the bottom plate is moved forward and rear ward relative to the rim forming recess;

bringing the thermoplastic resin sheet heated to be softened into contact with an inner circumferential surface of the bowl-shaped recess and immediately thereafter, moving the bottom plate to the second stop position so that a rim is formed;

spreading the rim out from the bowl bottom opening and reducing its inner diameter to form a spread rim outer side wall surface and at the same time forming a bottom wall of the rim formed by a flat portion where the inner diameter is reduced;

welding the rim inner wall surface turned up in the bowl bottom opening such that the rim forming recess has a generally triangular section and a cavity is formed inside the rim; and retreating the bottom plate to the first stop position.

2. A method of thermoforming in which a thermoplastic resin sheet heated to be softened is brought into contact with an inner circumferential surface of thermoforming female die formed generally into a bowl-shaped recess, the method comprising the steps of:

communicating a rim forming recess formed generally into a shape of a bowl-shaped recess with a bottom opening and forming a bottom wall of the bowl, an outer wall, a bottom wall and an inner wall of a rim of the bottom, wherein the rim forming recess includes a first portion spread outward so as to be continuous from the bowl bottom and a second portion continuous from the first portion and having a reduced inner diameter, the first and second portions forming the outer wall and the bottom wall;

supporting a bottom plate inside the rim forming recess so that the bottom plate is moved forward and rearward relative to the rim forming recess;

bringing the thermoplastic resin sheet heated to be softened into contact with an inner circumferential surface of the bowl-shaped recess and immediately thereafter, moving the bottom plate to the second stop position so that a rim is formed;

spreading the rim out from the bowl bottom opening and reducing its inner diameter to form a spread rim outer side wall surface and at the same time forming a bottom wall of the rim formed by a flat portion where the inner diameter is reduced;

welding the rim inner wall surface turned up in the bowl bottom opening such that the rim forming recess has a generally triangular section and a cavity is formed inside the rim; and retreating the bottom plate to the first stop position.

3. The method of claim 1, wherein the rim forming recess extends inward substantially by a length of the rim from the first and second portions forming the outer wall and the bottom wall.

4. The method of claim 3, wherein the thermoforming female die has a heater disposed near a rim forming recess so that a temperature near the rim forming recess is higher than in an other portion of the female die.

5. The method of claim 2, wherein the rim forming recess extends inward substantially by a length of the rim from the first and second portions forming the outer wall and the bottom wall.

6. The method of claim 5, wherein the thermoforming female die has a heater disposed near a rim forming recess so that a temperature near the rim forming recess is higher than a temperature in an other portion of the female die.

* * * * *